United States Patent
Craddock et al.

(10) Patent No.: US 8,626,970 B2
(45) Date of Patent: Jan. 7, 2014

(54) CONTROLLING ACCESS BY A CONFIGURATION TO AN ADAPTER FUNCTION

(75) Inventors: David Craddock, New Paltz, NY (US); Mark S. Farrell, Pleasant Valley, NY (US); Beth A. Glendening, Poughkeepsie, NY (US); Thomas A. Gregg, Highland, NY (US); Dan F. Greiner, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 385 days.

(21) Appl. No.: 12/821,184

(22) Filed: Jun. 23, 2010

(65) Prior Publication Data

US 2011/0320652 A1 Dec. 29, 2011

(51) Int. Cl.
*G06F 3/00* (2006.01)
*G06F 5/00* (2006.01)
*G06F 13/12* (2006.01)
*G06F 13/38* (2006.01)

(52) U.S. Cl.
USPC .............................................. 710/64; 710/36

(58) Field of Classification Search
None
See application file for complete search history.

(56) References Cited

U.S. PATENT DOCUMENTS

| | | |
|---|---|---|
| 3,976,979 A | 8/1976 | Parkinson et al. |
| 4,028,668 A | 6/1977 | Riikonen |
| 4,271,468 A | 6/1981 | Christensen et al. |
| 4,323,963 A | 4/1982 | Wu |
| 5,053,952 A | 10/1991 | Koopman, Jr. et al. |
| 5,170,472 A | 12/1992 | Cwiakala et al. |
| 5,265,240 A | 11/1993 | Galbraith et al. |
| 5,282,274 A | 1/1994 | Liu |
| 5,430,856 A | 7/1995 | Kinoshita |
| 5,465,332 A | 11/1995 | Deloye et al. |
| 5,465,355 A | 11/1995 | Cook et al. |
| 5,535,352 A | 7/1996 | Bridges et al. |
| 5,551,013 A | 8/1996 | Beausoleil et al. |
| 5,574,873 A | 11/1996 | Davidian |
| 5,586,268 A | 12/1996 | Chen et al. |
| 5,600,805 A | 2/1997 | Fredericks et al. |

(Continued)

FOREIGN PATENT DOCUMENTS

| | | |
|---|---|---|
| EP | 0076921 A2 | 4/1983 |
| EP | 0552873 A1 | 7/1993 |

(Continued)

OTHER PUBLICATIONS

U.S. Appl. No. 12/708,284, "Load Pair Disjoint Facility and Instruction Therefore," filed Jun. 24, 2010.

(Continued)

*Primary Examiner* — Kris Rhu
(74) *Attorney, Agent, or Firm* — John E. Campbell; Blanche E. Schiller, Esq.; Heslin Rothenberg Farley & Mesiti P.C.

(57) ABSTRACT

Access to an input/output adapter by a configuration is controlled. For each requested access to an adapter, checks are made to determine whether the configuration is authorized to access the adapter. If it is not authorized, then access is denied. If it is authorized, but access should be temporarily blocked, then instruction execution is altered to indicate such. If access is permitted, but should be blocked for another reason (other than temporarily), then access is denied.

21 Claims, 29 Drawing Sheets

(56) References Cited

U.S. PATENT DOCUMENTS

| | | | |
|---|---|---|---|
| 5,617,554 A | 4/1997 | Alpert et al. |
| 5,742,785 A | 4/1998 | Stone et al. |
| 5,761,448 A | 6/1998 | Adamson et al. |
| 5,790,825 A | 8/1998 | Traut |
| 5,802,590 A | 9/1998 | Draves |
| 5,819,053 A | 10/1998 | Goodrum et al. |
| 5,822,616 A | 10/1998 | Hirooka |
| 5,826,084 A | 10/1998 | Brooks et al. |
| 5,838,960 A | 11/1998 | Harriman, Jr. |
| 5,870,598 A | 2/1999 | White et al. |
| 5,875,343 A | 2/1999 | Binford et al. |
| 5,875,463 A | 2/1999 | Crump et al. |
| 5,901,312 A | 5/1999 | Radko |
| 5,960,213 A | 9/1999 | Wilson |
| 5,974,440 A | 10/1999 | Brooks et al. |
| 5,995,745 A | 11/1999 | Yodaiken |
| 6,009,261 A | 12/1999 | Scalzi et al. |
| 6,023,736 A | 2/2000 | Lambeth et al. |
| 6,067,595 A | 5/2000 | Lindenstruth |
| 6,078,970 A | 6/2000 | Nordstrom et al. |
| 6,205,530 B1 | 3/2001 | Kang |
| 6,308,255 B1 | 10/2001 | Gorishek, IV et al. |
| 6,330,647 B1 | 12/2001 | Jeddeloh et al. |
| 6,330,656 B1 | 12/2001 | Bealkowski et al. |
| 6,349,380 B1 | 2/2002 | Shahidzadeh et al. |
| 6,397,350 B1 | 5/2002 | Baskey et al. |
| 6,408,347 B1 | 6/2002 | Smith et al. |
| 6,463,582 B1 | 10/2002 | Lethin et al. |
| 6,493,741 B1 | 12/2002 | Emer et al. |
| 6,519,645 B2 | 2/2003 | Markos et al. |
| 6,529,978 B1 | 3/2003 | Eide et al. |
| 6,557,035 B1 | 4/2003 | McKnight |
| 6,578,191 B1 | 6/2003 | Boehme et al. |
| 6,581,130 B1 | 6/2003 | Brinkmann, Jr. et al. |
| 6,615,305 B1 | 9/2003 | Olesen et al. |
| 6,629,175 B1 | 9/2003 | Manning et al. |
| 6,654,818 B1 | 11/2003 | Thurber |
| 6,658,521 B1 | 12/2003 | Biran et al. |
| 6,704,831 B1 | 3/2004 | Avery |
| 6,715,011 B1 | 3/2004 | Buckland et al. |
| 6,721,839 B1 | 4/2004 | Bauman et al. |
| 6,772,097 B1 | 8/2004 | Kromenaker et al. |
| 6,772,264 B1 | 8/2004 | Dayan et al. |
| 6,792,492 B1 | 9/2004 | Griffin |
| 6,820,164 B2 | 11/2004 | Holm et al. |
| 6,901,537 B2 | 5/2005 | Dawkins et al. |
| 6,907,510 B2 | 6/2005 | Bennett et al. |
| 6,963,940 B1 | 11/2005 | Glassen et al. |
| 6,968,446 B1 | 11/2005 | McGrath |
| 6,970,992 B2 | 11/2005 | Gurumoorthy et al. |
| 6,978,338 B2 | 12/2005 | Wang et al. |
| 6,996,638 B2 | 2/2006 | Brice, Jr. et al. |
| 7,065,598 B2 | 6/2006 | Connor et al. |
| 7,107,384 B1 | 9/2006 | Chen et al. |
| 7,127,599 B2 | 10/2006 | Brice, Jr. et al. |
| 7,130,938 B2 | 10/2006 | Brice, Jr. et al. |
| 7,139,940 B2 | 11/2006 | Arbeitman et al. |
| 7,174,550 B2 | 2/2007 | Brice, Jr. et al. |
| 7,177,961 B2 | 2/2007 | Brice, Jr. et al. |
| 7,200,704 B2 | 4/2007 | Njoku et al. |
| 7,209,994 B1 | 4/2007 | Klaiber et al. |
| 7,225,287 B2 | 5/2007 | Wooten |
| 7,260,664 B2 | 8/2007 | Arndt et al. |
| 7,277,968 B2 | 10/2007 | Brice, Jr. et al. |
| 7,296,120 B2 | 11/2007 | Corrigan et al. |
| 7,302,692 B2 | 11/2007 | Bae et al. |
| 7,328,296 B1 | 2/2008 | Marmash et al. |
| 7,334,107 B2 | 2/2008 | Schoinas et al. |
| 7,340,582 B2 | 3/2008 | Madukkarumukumana |
| 7,380,041 B2 | 5/2008 | Belmar et al. |
| 7,398,343 B1 | 7/2008 | Marmash et al. |
| 7,412,488 B2 | 8/2008 | Jha et al. |
| 7,418,572 B2 | 8/2008 | Hepkin |
| 7,420,931 B2 | 9/2008 | Nanda et al. |
| 7,444,493 B2 | 10/2008 | Schoinas et al. |
| 7,454,548 B2 | 11/2008 | Belmar et al. |
| 7,464,191 B2* | 12/2008 | Arndt et al. .................. 710/10 |
| 7,464,209 B2 | 12/2008 | Armstrong et al. |
| 7,475,183 B2 | 1/2009 | Traut et al. |
| 7,493,425 B2 | 2/2009 | Arndt et al. |
| 7,496,706 B2 | 2/2009 | Nguyen et al. |
| 7,496,707 B2 | 2/2009 | Freking et al. |
| 7,502,872 B2 | 3/2009 | Boyd et al. |
| 7,506,087 B2 | 3/2009 | Ho et al. |
| 7,516,252 B2 | 4/2009 | Krithivas |
| 7,526,592 B2 | 4/2009 | Tsuruta |
| 7,529,860 B2 | 5/2009 | Freimuth et al. |
| 7,530,071 B2 | 5/2009 | Billau et al. |
| 7,546,406 B2 | 6/2009 | Armstrong et al. |
| 7,546,487 B2 | 6/2009 | Marisetty et al. |
| 7,549,090 B2 | 6/2009 | Bailey et al. |
| 7,552,298 B2 | 6/2009 | Bestler |
| 7,562,366 B2 | 7/2009 | Pope et al. |
| 7,567,567 B2 | 7/2009 | Muller et al. |
| 7,587,531 B2 | 9/2009 | Brice, Jr. et al. |
| 7,600,053 B2 | 10/2009 | Carlson et al. |
| 7,606,965 B2 | 10/2009 | Njoku et al. |
| 7,613,847 B2 | 11/2009 | Kjos et al. |
| 7,617,340 B2 | 11/2009 | Gregg |
| 7,617,345 B2 | 11/2009 | Clark et al. |
| 7,623,460 B2 | 11/2009 | Miyazaki |
| 7,624,235 B2 | 11/2009 | Wadhawan et al. |
| 7,627,723 B1 | 12/2009 | Buck et al. |
| 7,631,097 B2 | 12/2009 | Moch et al. |
| 7,886,086 B2 | 2/2011 | Sharma et al. |
| 8,112,556 B2 | 2/2012 | Hanson et al. |
| 8,504,754 B2 | 8/2013 | Craddock et al. |
| 2001/0021971 A1 | 9/2001 | Gibson et al. |
| 2002/0152334 A1 | 10/2002 | Holm et al. |
| 2002/0161907 A1 | 10/2002 | Moon |
| 2003/0056155 A1 | 3/2003 | Austen et al. |
| 2003/0074541 A1 | 4/2003 | Plambeck |
| 2004/0015622 A1 | 1/2004 | Avery |
| 2004/0025166 A1 | 2/2004 | Adlung et al. |
| 2004/0049600 A1 | 3/2004 | Boyd et al. |
| 2004/0064618 A1 | 4/2004 | Farrell et al. |
| 2004/0073905 A1 | 4/2004 | Emer et al. |
| 2004/0093452 A1 | 5/2004 | Easton et al. |
| 2004/0117534 A1 | 6/2004 | Parry et al. |
| 2004/0122988 A1 | 6/2004 | Han et al. |
| 2004/0139304 A1 | 7/2004 | Arimilli et al. |
| 2004/0139305 A1 | 7/2004 | Arimilli et al. |
| 2004/0199700 A1 | 10/2004 | Clayton |
| 2004/0236880 A1 | 11/2004 | Barrett |
| 2005/0033895 A1 | 2/2005 | Lueck et al. |
| 2005/0071472 A1 | 3/2005 | Arndt et al. |
| 2005/0114586 A1 | 5/2005 | Brice, Jr. et al. |
| 2005/0114623 A1 | 5/2005 | Craddock et al. |
| 2005/0289271 A1 | 12/2005 | Martinez et al. |
| 2006/0005083 A1 | 1/2006 | Genden et al. |
| 2006/0064618 A1 | 3/2006 | Wu et al. |
| 2006/0101181 A1 | 5/2006 | Post et al. |
| 2006/0130071 A1 | 6/2006 | Martin et al. |
| 2006/0195617 A1 | 8/2006 | Arndt et al. |
| 2006/0195644 A1 | 8/2006 | Arndt et al. |
| 2006/0230208 A1 | 10/2006 | Gregg et al. |
| 2006/0253619 A1 | 11/2006 | Torudbakken et al. |
| 2006/0281630 A1 | 12/2006 | Bailey et al. |
| 2006/0288130 A1 | 12/2006 | Madukkarumukumana |
| 2007/0028087 A1 | 2/2007 | Yu et al. |
| 2007/0073955 A1 | 3/2007 | Murray et al. |
| 2007/0136554 A1 | 6/2007 | Biran et al. |
| 2007/0168636 A1 | 7/2007 | Hummel et al. |
| 2007/0168643 A1 | 7/2007 | Hummel et al. |
| 2007/0168644 A1 | 7/2007 | Hummel et al. |
| 2007/0168934 A1 | 7/2007 | Chandrasekharan et al. |
| 2007/0186074 A1 | 8/2007 | Bradford et al. |
| 2007/0226386 A1 | 9/2007 | Sharp et al. |
| 2007/0234018 A1 | 10/2007 | Feiste |
| 2007/0245041 A1 | 10/2007 | Hua et al. |
| 2007/0260768 A1 | 11/2007 | Bender et al. |
| 2007/0271559 A1 | 11/2007 | Easton et al. |
| 2008/0091851 A1 | 4/2008 | Sierra |
| 2008/0091868 A1 | 4/2008 | Mizrachi et al. |

(56) References Cited

U.S. PATENT DOCUMENTS

| | | |
|---|---|---|
| 2008/0091915 A1 | 4/2008 | Moertl et al. |
| 2008/0098197 A1 | 4/2008 | Craddock et al. |
| 2008/0114734 A1 | 5/2008 | Suwabe |
| 2008/0114906 A1 | 5/2008 | Hummel et al. |
| 2008/0126648 A1 | 5/2008 | Brownlow et al. |
| 2008/0126652 A1 | 5/2008 | Vembu et al. |
| 2008/0148295 A1 | 6/2008 | Freimuth et al. |
| 2008/0168208 A1 | 7/2008 | Gregg |
| 2008/0222406 A1 | 9/2008 | Tabuchi |
| 2008/0235425 A1 | 9/2008 | Belmar et al. |
| 2009/0024823 A1 | 1/2009 | Ko et al. |
| 2009/0049220 A1 | 2/2009 | Conti et al. |
| 2009/0070760 A1 | 3/2009 | Khatri et al. |
| 2009/0089780 A1 | 4/2009 | Johnson et al. |
| 2009/0125666 A1 | 5/2009 | Freking et al. |
| 2009/0144462 A1 | 6/2009 | Arndt et al. |
| 2009/0144731 A1 | 6/2009 | Brown et al. |
| 2009/0172211 A1 | 7/2009 | Perry et al. |
| 2009/0182966 A1 | 7/2009 | Greiner et al. |
| 2009/0182969 A1 | 7/2009 | Norgaard et al. |
| 2009/0210646 A1 | 8/2009 | Bauman et al. |
| 2009/0222814 A1 | 9/2009 | Astrand |
| 2009/0240849 A1 | 9/2009 | Corneli et al. |
| 2009/0249039 A1 | 10/2009 | Hook et al. |
| 2009/0276774 A1 | 11/2009 | Kinoshita |
| 2009/0276775 A1 | 11/2009 | Brown et al. |
| 2009/0328035 A1 | 12/2009 | Ganguly |
| 2010/0005234 A1 | 1/2010 | Ganga et al. |
| 2010/0082855 A1 | 4/2010 | Accapadi et al. |
| 2010/0169528 A1 | 7/2010 | Kumar et al. |
| 2011/0153893 A1 | 6/2011 | Foong et al. |
| 2011/0321061 A1 | 12/2011 | Craddock et al. |
| 2013/0067194 A1 | 3/2013 | Craddock et al. |

FOREIGN PATENT DOCUMENTS

| | | |
|---|---|---|
| EP | 0902355 A2 | 3/1999 |
| EP | 0955585 A2 | 11/1999 |
| EP | 1096376 A2 | 2/2001 |
| EP | 1489491 A1 | 12/2004 |
| JP | 57191826 A | 11/1982 |
| JP | 359081724 A | 5/1984 |
| JP | 362079557 A | 4/1987 |
| JP | 405053973 A | 3/1993 |
| JP | 510996 A | 4/1993 |
| WO | WO9600940 A1 | 1/1996 |
| WO | WO9938074 A1 | 7/1999 |
| WO | WO 02/41157 A2 | 5/2002 |

OTHER PUBLICATIONS

U.S. Appl. No. 12/820,735, "High-Word Facility for Extending the Number of General Purpose Registers Available to Instructions," filed Jun. 22, 2010.

U.S. Appl. No. 12/820,768, "Instructions for Performing an Operation on Two Operands and Subsequently Storing an Original Value of Operand," filed Jun. 22, 2010.

U.S. Appl. No. 12/821,224, "Associating Input/Output Device Requests With Memory Associated With a Logical Partition," filed Jun. 21, 2010.

U.S. Appl. No. 12/821,239, "Input/Output (I/O) Expansion Response Processing in a Peripheral Component Interconnect Express (PCIE) Environment," filed Jun. 23, 2010.

U.S. Appl. No. 12/821,242, "A System and Method for Downbound I/O Expansion Request and Response Processing in a PCIe Architecture," filed Jun. 23, 2010.

U.S. Appl. No. 12/821,243, "Upbound Input/Output Expansion Request and Response Processing in a PCIE Architecture," filed Jun. 23, 2010.

U.S. Appl. No. 12/821,245, "A System and Method for Routing I/O Expansion Requests and Responses in a PCIE Architecture," filed Jun. 23, 2010.

U.S. Appl. No. 12/821,247, "Scalable I/O Adapter Function Level Error Detection, Isolation, and Reporting," filed Jun. 23, 2010.

U.S. Appl. No. 12/821,248, "Connected Input/Output HUB Management," filed Jun. 23, 2010.

U.S. Appl. No. 12/821,256, "Switch Failover Control in a Multiprocessor Computer System," filed Jun. 23, 2010.

U.S. Appl. No. 12/821,271, "Memory Error Isolation and Recovery in a Multiprocessor Computer System," filed Jun. 23, 2010.

U.S. Appl. No. 12/822,358, "Function Virtualization Facility for Function Query of a Processor," filed Jun. 24, 2010.

U.S. Appl. No. 12/822,368, "Function Virtualization Facility for Blocking Instruction Function of a Multi-Function Instruction of a Virtual Processor," filed Jun. 24, 2010.

Craddock et al., U.S. Appl. No. 12/821,170, "Translation of Input/Output Address to Memory Addresses" filed Jun. 23, 2010.

Craddock et al., U.S. Appl. No. 12/821,171, "Runtime Determination of Translation Formats for Adapter Functions," filed Jun. 23, 2010.

Craddock et al., U.S. Appl. No. 12/821,172, "Resizing Address Spaces Concurrent to Accessing the Address Spaces," filed Jun. 23, 2010.

Craddock et al., U.S. Appl. No. 12/821,174, "Multiple Address Spaces Per Adapter," filed Jun. 23, 2010.

Craddock et al., U.S. Appl. No. 12/821,175, "Converting a Message Signaled Interruption Into an I/O Adapter Event Notification," filed Jun. 23, 2010.

Brice et al., U.S. Appl. No. 12/821,177, "Converting a Message Signaled Interruption Into an I/O Adapter Event Notification to a Guest Operating System," filed Jun. 23, 2010.

Craddock et al., U.S. Appl. No. 12/821,178, "Identification of Types of Sources of Adapter Interruptions," filed Jun. 23, 2010.

Belmar et al., U.S. Appl. No. 12/821,179, "Controlling a Rate at Which Adapter Interruption Requests Are Processed," filed Jun. 23, 2010.

Craddock et al., U.S. Appl. No. 12/821,181, "Controlling the Selectively Setting of Operational Parameters for an Adapter," filed Jun. 23, 2010.

Craddock et al., U.S. Appl. No. 12/821,182, "Load Instruction for Communicating With Adapters," filed Jun. 23, 2010.

Coneski et al., U.S. Appl. No. 12/821,185, "Discovery by Operating System of Information Relating to Adapter Functions Accessible to the Operating System," filed Jun. 23, 2010.

Coneski et al., U.S. Appl. No. 12/821,187, "Enable/Disable Adapters of a Computing Environment," filed Jun. 23, 2010.

Craddock et al., U.S. Appl. No. 12/821,190, "Guest Access to Address Spaces of Adapter," filed Jun. 23, 2010.

Coneski et al., U.S. Appl. No. 12/821,191, "Managing Processing Associated With Hardware Events," filed Jun. 23, 2010.

Craddock et al., U.S. Appl. No. 12/821,192, "Operating System Notification of Actions to Be Taken Responsive to Adapter Events," filed Jun. 23, 2010.

Brice et al., U.S. Appl. No. 12/821,193, "Measurement Facility for Adapter Functions," filed Jun. 23, 2010.

Craddock et al., U.S. Appl. No. 12/821,194, "Store/Store Block Instructions for Communicating With Adapters," filed Jun. 23, 2010.

Paulsen, Eric; "Local Memory Coaxes Top Speed from SCSI Masters," Electronic Design, v. 41, Apr. 15, 1993, pp. 76-6+.

Ganapathy, Narayanan; "General Purpose Operating System Support for Multiple Page Sizes," USENIX Annual Technical Conference (No. 98), 1998, pp. 91-104.

Talluri et al., "A New Page Table for 64-bit Address Spaces," ACM SIGOPS Operating Systems Review, vol. 29, Issue 5 (Dec. 1995), pp. 194-200.

"Large Page Support in the Linux Kernel," http://lwn.net/Articles/6969/ <retrieved on Jan. 26, 2010>.

Crawford, Catherine H. et al., "Accelerating Computing with the Cell Broadband Engine Processor," May 2008, CF '08, May 5-7, 2008, Ischia, Italy, pp. 3-11.

Baumann, Andrew, et al., "The Multikernel: A New OS Architecture for Scalable Multicore Systems," Oct. 2009, SOSP '09, Oct. 11-14, 2009, Big Sky, Montana, USA, pp. 29-43.

Swift, Michael M. et al., "Improving the Reliability of Commodity Operating Systems," ACM Transactions on Computer Systems, vol. 23, No. 1, Feb. 2005, pp. 77-110.

(56) References Cited

OTHER PUBLICATIONS

Xu, Min et al., "Towards a VMM-based Usage Control Framework for OS Kernel Integrity Protection," SACMAT '07, Jun. 20-22, 2007, Sophia Antipolis, France, pp. 71-80.
Huang, Wei et al., "A Case for High Performance Computing with Virtual Machines," ISC '06, Jun. 3 28 30, Carins, Queensland, Australia, pp. 125-134, Jun. 3, 2006.
Mysore, Shashidhar et al., "Understanding and Visualizing Full Systems with Data Flow Tomography," SPOLOS '08, Mar. 1-5, 2008, Seattle, Washington, USA, pp. 211-221.
"DMA Engines Bring Multicast to PCI Express Systems," http://electronicdesign.com, Aug. 13, 2009, 3 pages.
"Xen Wiki," http://wiki.xensource.com/xenwiki/VTdHowTo, 5 pages, Apr. 16, 2010.
Vaidyanathan, K., et al., "Exploiting RDMA Operations for Providing Efficient Fine-Grained Resource Monitoring in Cluster-based Servers," 1-4244-0328—Jun. 2006, 10 pages.
"IBM Enhances the IBM eServer zSeries 990 Family of Servers," Hardware Announcement, Oct. 7, 2003, pp. 1-11.
"Intel® Virtualization Technology for Directed I/O," Intel® Technology Journal, vol. 10, Issue 3, Aug. 10, 2006.
"I/O Virtualization and AMD's IOMMU," AMD Developer Central, http://developer.amd.com/documentation/articles/pages/892006101.aspx, Aug. 9, 2006.
"z/Architecture Principles of Operation," IBM Publication No. SA22-7832-07, Feb. 2009.
"z/VM: Running Guest Operating Systems," IBM Publication No. SC24-5997-02, Oct. 2001.
"z/VM: General Information Manual," IBM Publication No. GC24-5991-05, May 2003.
Winwood, Simon, et al., "Multiple Page Size Support in the Linux Kernel", Proceedings of Ottawa Linux Symposium, 2002.
"z/Architecture Principles of Operation," Chapter 17, pp. 17-1-17-30, IBM Publication No. SA22-7832-07, Feb. 2009.
"Intel® Itanium® Architecture Software Developer's Manual," vol. 2, Rev. 2.2, Jan. 2006.
International Search Report and Written Opinion for PCT/EP2010/067039 dated Feb. 25, 2011.
International Search Report and Written Opinion for PCT/EP2010/067036 dated Feb. 14, 2011.
International Search Report and Written Opinion for PCT/EP2010/067030 dated Feb. 7, 2011.
International Search Report and Written Opinion for PCT/EP2010/067020 dated Apr. 5, 2011.
International Search Report and Written Opinion for PCT/EP2010/067025 dated Apr. 13, 2011.
International Search Report and Written Opinion for PCT/EP2010/067024 dated Apr. 27, 2011.
International Search Report and Written Opinion for PCT/EP2010/067019 dated Apr. 26, 2011.
International Search Report and Written Opinion for PCT/EP2010/067021 dated Apr. 28, 2011.
International Search Report and Written Opinion for PCT/EP2010/067043 dated Apr. 21, 2011.
International Search Report and Written Opinion for PCT/EP2010/067041 dated Apr. 26, 2011.
International Search Report and Written Opinion for PCT/EP2010/067031 dated Apr. 26, 2011.
International Search Report and Written Opinion for PCT/EP2010/067034 dated May 18, 2011.
International Search Report and Written Opinion for PCT/EP2010/067023 dated Jun. 15, 2011.
International Search Report and Written Opinion for PCT/EP2010/067032 dated May 27, 2011.
International Search Report and Written Opinion for PCT/EP2010/067038 dated Jun. 15, 2011.
"Chapter 6: Configuration Space" in PCI-SIG: "PCI Local Bus Specification Revision 3.0", Feb. 2004, pp. 213-254.
Hennet, P. et al., "Programmable Interrupt Vectors in Processors," IBM Technical Disclosure Bulletin, vol. 25, No. 5, Oct. 1, 1982, pp. 2641-2642.
Plambeck et al., "Development and Attributes of z/Architecture," IBM Journal of Research and Development, IBM Corporation, vol. 46, No. 4/05, Jul. 1, 2002, pp. 367-379.
"z/Architecture Principles of Operation, Chapter 3", Feb. 2008, pp. 1-71.
Gehringer, E. F., et al., "Virtual Memory Systems," CSC-506—Architecture of Parallel Computers Computer Science Department, College of Engineering, North Carolina, Dec. 31, 1999, XP002631523.
"z/Architecture—Principles of Operation," IBM Publication No. SA22-7832-05, Sixth Edition, Apr. 2007, Chapter 10, 10-1-10-138.
"PCI Local Bus Specification," Mar. 29, 2002, pp. 1-328.
McGee, H.T., "Technique for Resetting a Single Channel Path Under Operator Control in IBM System/370XA," IBM Technical Disclosure Bulletin, vol. 26, No. 10B, Mar. 1984.
"Decreased Latency Across PCI Express With I/O Virtualization Via a Hint Interface," IPCOM000185226D, Jul. 16, 2009, pp. 1-2.
Office Action for U.S. Appl. No. 12/821,171 dated Oct. 7, 2011.
Office Action for U.S. Appl. No. 12/821,182 dated Oct. 13, 2011.
Office Action for U.S. Appl. No. 12/821,179 dated Apr. 24, 2012.
Office Action for U.S. Appl. No. 12/821,177 dated May 2, 2012.
Final Office Action for U.S. Appl. No. 12/821,185 dated Jun. 6, 2012.
"Atari PCI BIOS and Device Drive Specification 1.13," Chapters 2, 3, 4 and 6; [online], internet archive dates Dec. 12, 2007 and Feb. 8, 2007; retrieved on May 24, 2012, 13 pages <URL:http://kunden.wvnet.at/fichti/docs/pcibios-2.htm; pcibios-3.htm; pcibios-4.htm, pcibios-6.htm>.
"PCI Device Access Under 32-bit PM DOS from Open Watcom," [online], internet archive date Jul. 19, 2006; retrieved May 26, 2012, 14 pages <URL:http://www.openwatcom.org/index.php/PCI_Device_access_under_32-Bit_PM_DOS>.
Device Identification Strings from OSR online; [online], internet archive date Mar. 13, 2005; retrieved May 26, 2012, 3 pages <URL:http//www.osronline.com/ddkx/install/idstrings_8tt3.htm>.
Office Action for U.S. Appl. No. 12/821,190 dated Jun. 12, 2012.
Office Action for U.S. Appl. No. 12/821,174 dated Jun. 15, 2012.
International Search Report and Written Opinion for PCT/EP2010/067035 dated Mar. 8, 2011.
Final Office Action for U.S. Appl. No. 12/821,187 dated Jul. 16, 2012.
Office Action for U.S. Appl. No. 12/821,178 dated Jul. 16, 2012.
Office Action for U.S. Appl. No. 12/821,171 dated Jul. 19, 2012.
Communication Pursuant to Article 94(3) EPC for Application No. 10 776 350.0-2212 dated Oct. 31, 2012, pp. 1-6.
Final Office Action for U.S. Appl. No. 12/821,174 dated Nov. 13, 2012, pp. 1-29.
Office Action for U.S. Appl. No. 12/821,170 dated Feb. 1, 2013, pp. 1-28.
Office Action for U.S. Appl. No. 13/672,028 dated Feb. 1, 2013, pp. 1-20.
Communication Pursuant to Article 94(3) EPC for Application No. 10 784 272.6-1243 dated Feb. 6, 2013, pp. 1-7.
Final Office Action for U.S. Appl. No. 12/821,171 dated Mar. 18, 2013, pp. 1-11.
Office Action for U.S. Appl. No. 12/821,181 dated Mar. 26, 2013, pp. 1-37.
Notice of Allowance for U.S. Appl. No. 12/821,172 dated Apr. 30, 2013, pp. 1-30.
Communication Pursuant to Article 94(3) EPC for Application No. 10 776 345.0-1956, dated May 31, 2013, pp. 1-6.
Notice of Allowance for U.S. Appl. No. 13/462,152 dated Jun. 7, 2013, pp. 1-13.
Notice of Allowance for U.S. Appl. No. 12/821,175 dated Jun. 20, 2013, pp. 1-14.
Communication Pursuant to Article 94(3) EPC for Application No. 10 778 994.3-1960, dated Jul. 3, 2013, pp. 1-7.
Office Action for U.S. Appl. No. 12/821,174 dated Jan. 19, 2012.
Office Action for U.S. Appl. No. 12/821,193 dated Feb. 24, 2012.

(56) References Cited

OTHER PUBLICATIONS

"PCI Local Bus Specification Revision 3.0," Aug. 2002, pp. 39,44, 28,49,58.
Final Office Action for U.S. Appl. No. 12/821,171 dated Mar. 29, 2012.
Office Action for U.S. Appl. No. 12/821,175 dated Sep. 17, 2012.
International Search Report and Written Opinion for PCT/EP2010/067029 dated Mar. 2, 2011.
"IBM System/390 I/O Call Reporting Process," IBM Technical Disclosure Bulletin, vol. 36, No. 1, Jan. 1993, pp. 164-169, XP000222812.
"Means for Channel Subsystem-Initiated Communication," IBM Technical Disclosure Bulletin, vol. 33, No. 12, May 1991, p. 169, XP000121623.
International Search Report and Written Opinion for PCT/EP2010/067028 dated Mar. 8, 2011.
International Search Report and Written Opinion for PCT/EP2010/067042 dated Apr. 28, 2011.
Office Action for U.S. Appl. No. 12/821,190 dated Sep. 4, 2013, pp. 1-6.
Office Action for U.S. Appl. No. 12/821,174 dated Nov. 19, 2013, pp. 1-35.

* cited by examiner

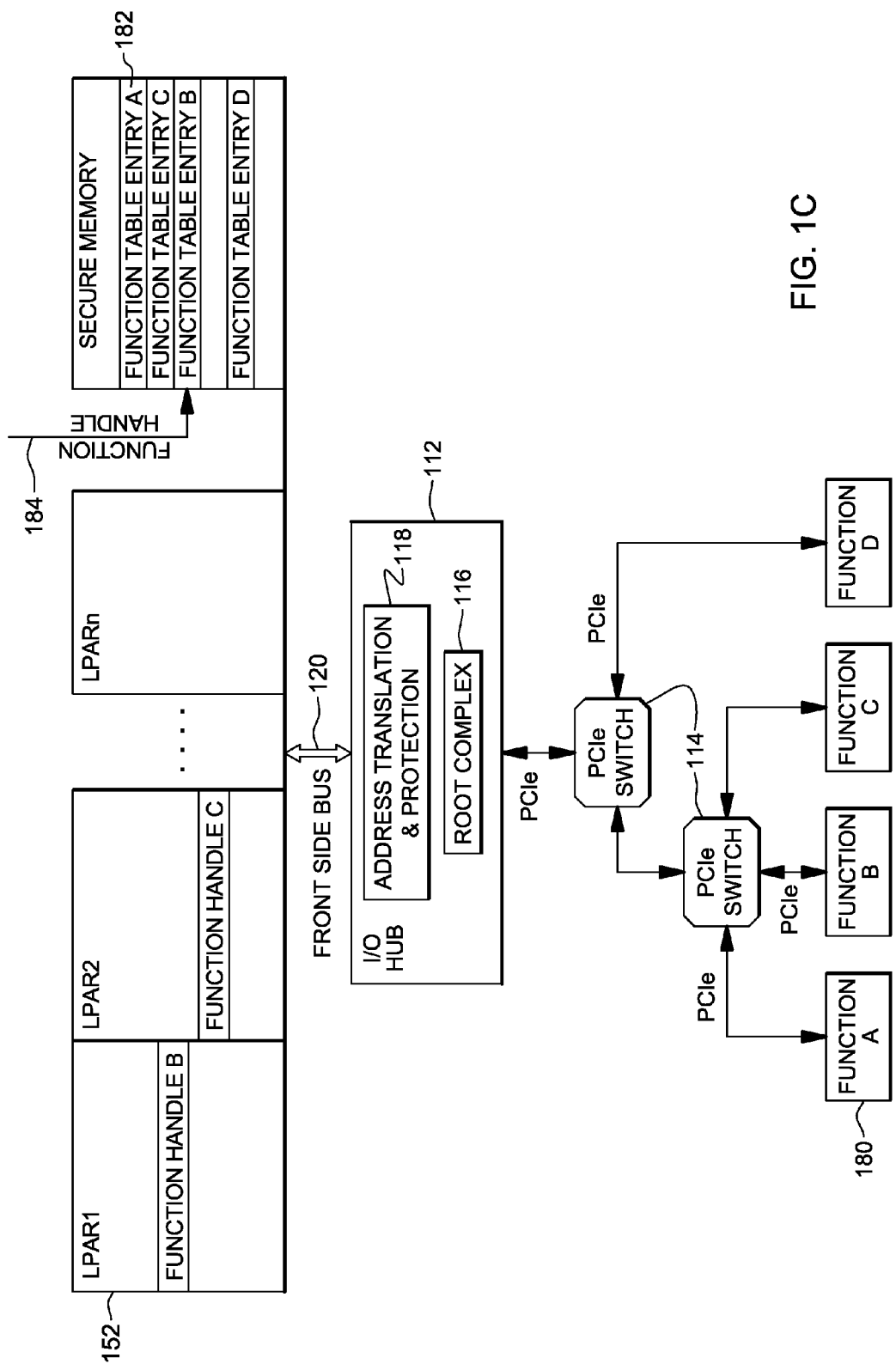

CONTROLLING ACCESS BY A CONFIGURATION TO AN ADAPTER FUNCTION

BACKGROUND

This invention relates, in general, to input/output (I/O) processing, and in particular, to controlling access to input/output adapters of a computing environment.

Many system architectures that use input/output adapters control access to those adapters by using central processing unit (CPU) based address translation mechanisms. In such systems, memory mapped input/output (MMIO) is used, and the hardware knows, based on the manner in which the memory is set up, whether an instruction executed by a processor is pointing to real memory or whether it is actually pointing to memory in one of the adapters. The hardware is then able to steer it accordingly.

Some systems, however, may not use the traditional memory mapped I/O.

BRIEF SUMMARY

In accordance with an aspect of the present invention, access to I/O adapters is controlled such that only an authorized configuration can access a given I/O adapter (e.g., adapter function). In one example, it is controlled in those computing environments that are not using, for instance, memory mapped I/O.

The shortcomings of the prior art are overcome and advantages are provided through the provision of a computer program product for controlling access to adapters of a computing environment. The computer program product includes a computer readable storage medium readable by a processing circuit and storing instructions for execution by the processing circuit for performing a method. The method includes, for instance, executing an instruction including a request by a configuration to access an adapter, the adapter identified by a function handle provided with the request, the executing including using, by the processor, the function handle to obtain a function table entry for the adapter, the function table entry including information associated with the adapter; determining based on information in the function table entry whether the configuration is permitted access to the adapter; and allowing access to the adapter, responsive to determining the configuration is permitted access to the adapter.

Methods and systems relating to one or more aspects of the present invention are also described and claimed herein. Further, services relating to one or more aspects of the present invention are also described and may be claimed herein.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 1C depicts one example of a computing environment in which each adapter function of a plurality of adapter functions has associated therewith a function table entry, in accordance with an aspect of the present invention;

DETAILED DESCRIPTION

In accordance with an aspect of the present invention, access to an adapter by a configuration is controlled. In particular, a capability is provided to control access such that only an authorized configuration can access a given adapter, such as a given adapter function (e.g., a PCI function). A configuration is, for instance, an operating system, a processor, a logical partition, an operating system executing in a logical partition, a pageable storage mode guest (e.g., a guest operating system), etc. As used herein, the term operating system includes device drivers.

In one example, in the z/Architecture®, a pageable guest is interpretively executed via the Start Interpretive Execution (SIE) instruction, at level 2 of interpretation. For instance, the logical partition (LPAR) hypervisor executes the SIE instruction to begin the logical partition in physical, fixed memory. If z/VM® is the operating system in that logical partition, it issues the SIE instruction to execute its guests (virtual) machines in its V=V (virtual) storage. Therefore, the LPAR hypervisor uses level-1 SIE, and the z/VM® hypervisor uses level-2 SIE.

Further, as used herein, the term adapter includes any type of adapter (e.g., storage adapter, processing adapter, network adapter, cryptographic adapter, PCI adapter, other type of input/output adapters, etc.). In one embodiment, an adapter includes one adapter function. However, in other embodiments, an adapter may include a plurality of adapter functions. One or more aspects of the present invention are applicable whether an adapter includes one adapter function or a plurality of adapter functions. In one embodiment, if an adapter includes a plurality of adapter functions, then the control capability herein applies to each adapter function, in accordance with an aspect of the present invention. In the examples presented herein, adapter is used interchangeably with adapter function (e.g., PCI function) unless otherwise noted.

Moreover, the term firmware, used further below, includes, e.g., the microcode, millicode and/or macrocode of the processor. It includes, for instance, the hardware-level instructions and/or data structures used in implementation of higher-level machine code. In one embodiment, it includes, for instance, proprietary code that is typically delivered as microcode that includes trusted software or microcode specific to the underlying hardware and controls operating system access to the system hardware.

Figure 1A:
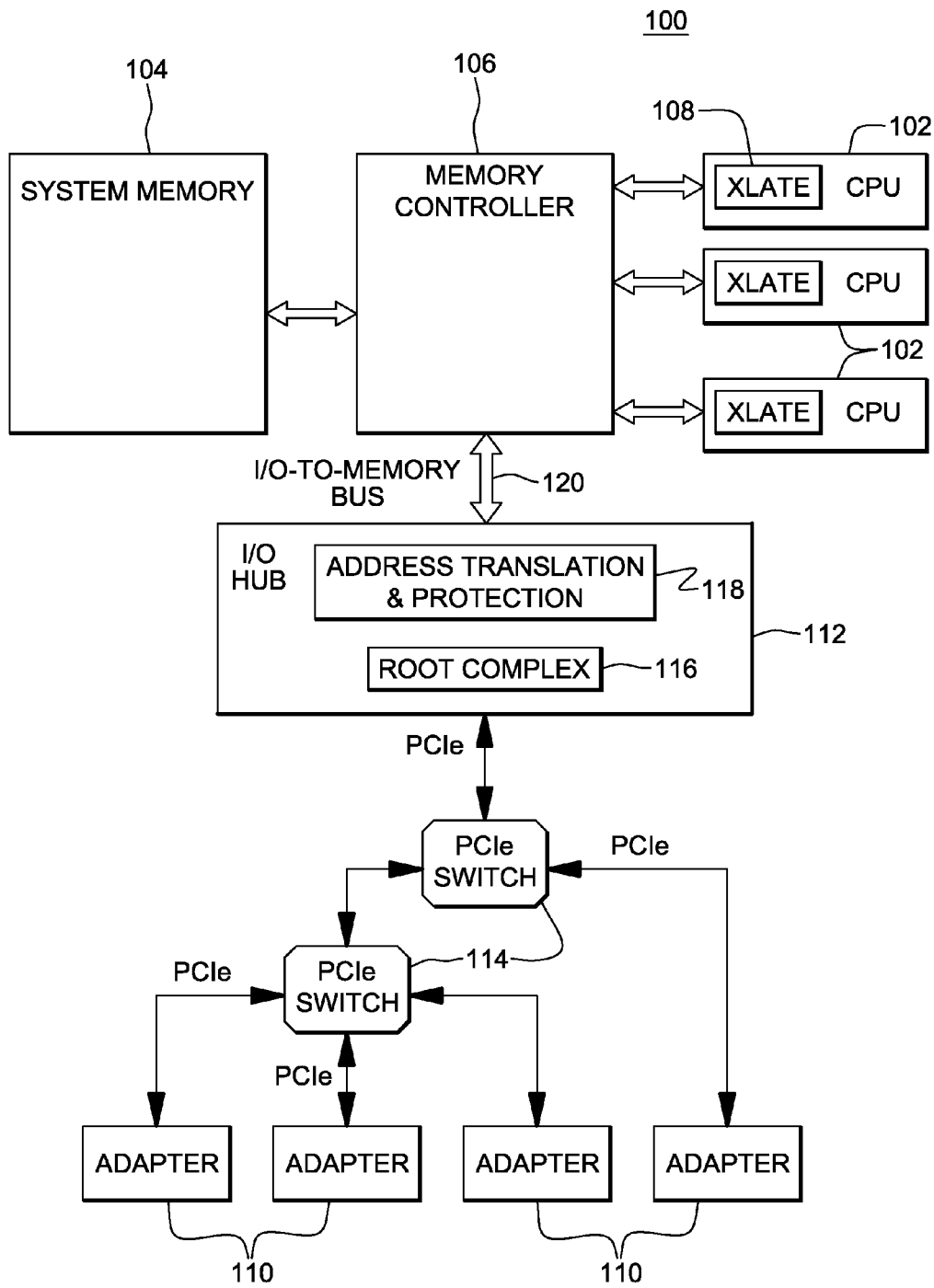
FIG. 1A depicts one embodiment of a computing environment to incorporate and use one or more aspects of the present invention.

One embodiment of a computing environment to incorporate and use one or more aspects of the present invention is described with reference to FIG. 1A. In one example, a computing environment 100 is a System z® server offered by International Business Machines Corporation. System z® is based on the z/Architecture® offered by International Business Machines Corporation. Details regarding the z/Architecture® are described in an IBM® publication entitled, "z/Architecture Principles of Operation," IBM Publication No. SA22-7832-07, February 2009, which is hereby incorporated herein by reference in its entirety. IBM®, System z® and z/Architecture® are registered trademarks of International Business Machines Corporation, Armonk, N.Y. Other names used herein may be registered trademarks, trademarks or product names of International Business Machines Corporation or other companies.

In one example, computing environment 100 includes one or more central processing units (CPUs) 102 coupled to a system memory 104 (a.k.a., main memory) via a memory controller 106. To access system memory 104, a central processing unit 102 issues a read or write request that includes an address used to access system memory. The address included in the request is typically not directly usable to access system memory, and therefore, it is translated to an address that is directly usable in accessing system memory. The address is translated via a translation mechanism (XLATE) 108. For example, the address is translated from a virtual address to a real or absolute address using, for instance, dynamic address translation (DAT).

The request, including the address (translated, if necessary), is received by memory controller 106. In one example, memory controller 106 is comprised of hardware and is used to arbitrate for access to the system memory and to maintain the memory's consistency. This arbitration is performed for requests received from CPUs 102, as well as for requests received from one or more adapters 110. Like the central processing units, the adapters issue requests to system memory 104 to gain access to the system memory.

In one example, adapter 110 is a Peripheral Component Interconnect (PCI) or PCI Express (PCIe) adapter that includes one or more PCI functions. A PCI function issues a request that is routed to an input/output hub 112 (e.g., a PCI hub) via one or more switches (e.g., PCIe switches) 114. In one example, the input/output hub is comprised of hardware, including one or more state machines, and is coupled to memory controller 106 via an I/O-to-memory bus 120.

The input/output hub includes, for instance, a root complex 116 that receives the request from a switch. The request includes an input/output address that is provided to an address translation and protection unit 118 which accesses information used for the request. As examples, the request may include an input/output address used to perform a direct memory access (DMA) operation or to request a message signaled interruption (MSI). Address translation and protection unit 118 accesses information used for the DMA or MSI request. As a particular example, for a DMA operation, information may be obtained to translate the address. The translated address is then forwarded to the memory controller to access system memory.

In one example, information used for the DMA or MSI request issued by an adapter is obtained from a device table entry located in the I/O hub (e.g., in the address translation and protection unit). The device table entry includes information for the adapter, and each adapter has at least one device table entry associated therewith. For instance, there is one device table entry per address space assigned to the adapter. For requests issued from adapters, a device table entry is located using a requestor id provided in the request.

Figure 1B:
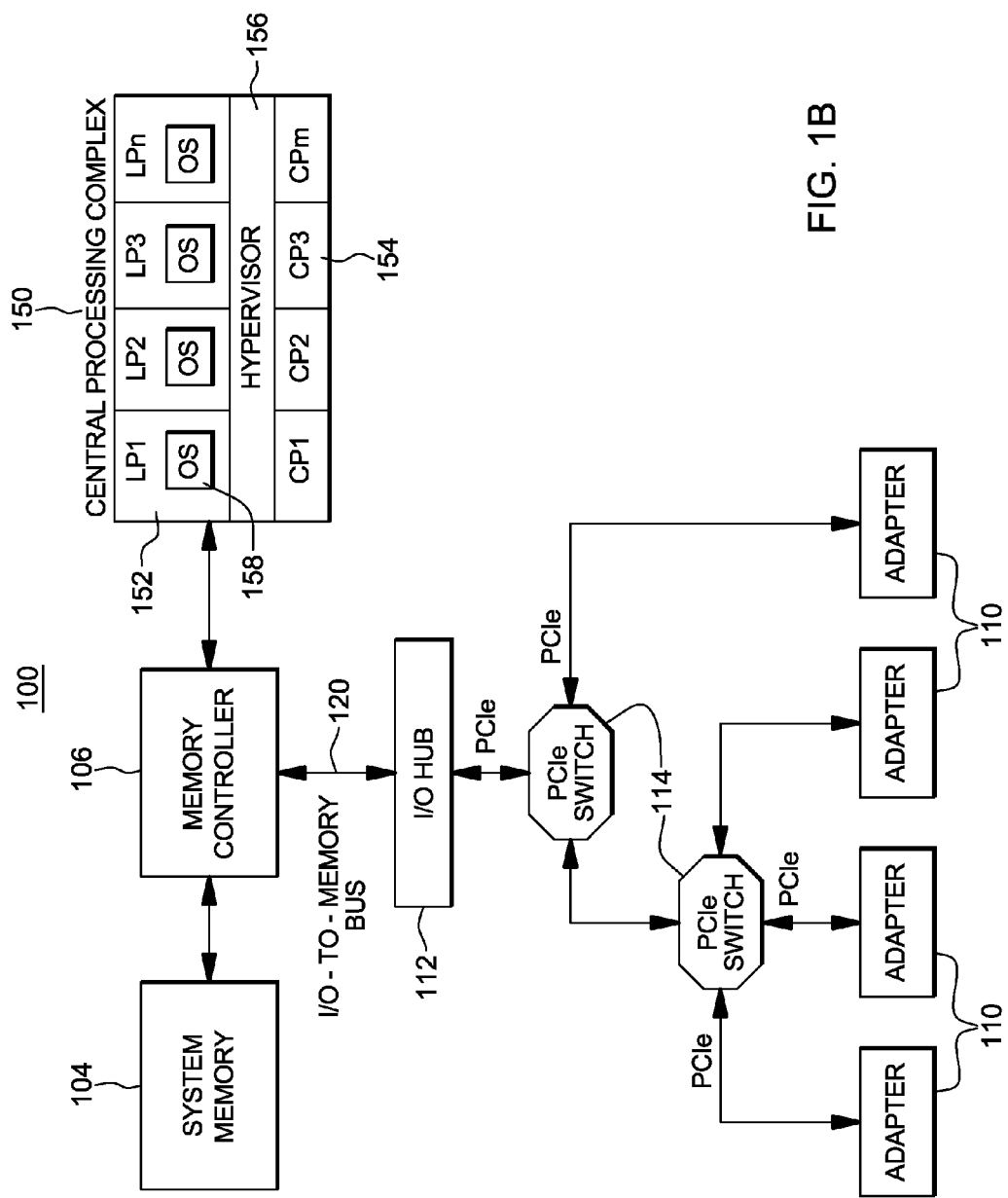
FIG. 1B depicts another embodiment of a computing environment to incorporate and use one or more aspects of the present invention.

In a further embodiment of a computing environment, in addition to or instead of one or more CPUs 102, a central processing complex is coupled to memory controller 106, as shown in FIG. 1B. In this example, a central processing complex 150 includes, for instance, one or more partitions or zones 152 (e.g., logical partitions LP1-LPn), one or more central processors (e.g., CP1-CPm) 154, and a hypervisor 156 (e.g., a logical partition manager), each of which is described below.

Each logical partition 152 is capable of functioning as a separate system. That is, each logical partition can be independently reset, initially loaded with an operating system or a hypervisor (such as z/VM® offered by International Business Machines Corporation, Armonk, N.Y.), if desired, and operate with different programs. An operating system, a hypervisor, or an application program running in a logical partition appears to have access to a full and complete system, but only a portion of it is available. A combination of hardware and Licensed Internal Code (also referred to as microcode or millicode) keeps a program in a logical partition from interfering with the program in a different logical partition. This allows several different logical partitions to operate on a single or multiple physical processor in a time slice manner. In this particular example, each logical partition has a resident operating system 158, which may differ for one or more logical partitions. In one embodiment, operating system 158 is a z/OS® or zLinux operating system, offered by International Business Machines Corporation, Armonk, N.Y. z/OS® and z/VM® are registered trademarks of International Business Machines Corporation, Armonk, N.Y.

Central processors 154 are physical processor resources that are allocated to the logical partitions. For instance, a logical partition 152 includes one or more logical processors, each of which represents all or a share of the physical processor resource 154 allocated to the partition. The underlying processor resource may either be dedicated to that partition or shared with another partition.

Logical partitions 152 are managed by hypervisor 156 implemented by firmware running on processors 154. Logical partitions 152 and hypervisor 156 each comprise one or more programs residing in respective portions of central storage associated with the central processors. One example of hypervisor 156 is the Processor Resource/Systems Manager (PR/SM), offered by International Business Machines Corporation, Armonk, N.Y.

Although, in this example, a central processing complex having logical partitions is described, one or more aspects of the present invention may be incorporated in and used by other processing units, including single or multi-processor processing units that are not partitioned, among others. The central processing complex described herein is only one example.

As described above, an adapter may include one or more adapter functions. Further details regarding adapter functions are described with reference to FIG. 1C. As shown in FIG. 1C, each adapter function 180 is coupled to I/O hub 112 via one or more PCI switches 114. I/O hub 112 is coupled to logical partitions 152 via I/O-to-memory bus 120. In this example, the memory controller is not shown, but may be used. The I/O hub may be coupled to the logical partitions directly or via a memory controller.

Figure 2A:
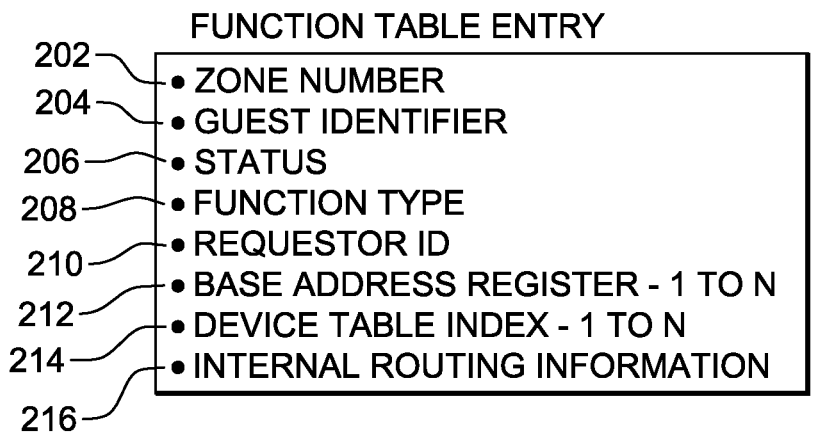
FIG. 2A depicts one embodiment of a function table entry used in accordance with an aspect of the present invention.

Each adapter function 180 has associated therewith a function table entry 182 that includes information regarding its associated adapter function. For instance, as shown in FIG. 2A, function table entry 182 has a plurality of fields including, for example:

Zone Number 202: This field includes a value that is used in a logical partition environment to designate a zone or logical partition. The value of this field indicates which zone (e.g., operating system within the zone) owns or has access to the adapter function associated with this function table entry.

In a further embodiment, zone number may be used to identify the configuration regardless if it is a logical partition environment. For instance, it may be an operating system identifier or an identifier of another configuration.

Guest Identifier 204: This field is used when the system is in a pageable storage mode to identify a guest that is allowed access to this adapter function;

Status Indicator 206: This provides an indication of whether the function table entry itself is valid, whether the function is enabled, and/or whether the function is in error state, etc.;

Function Type 208: This provides an indication of a type of the adapter function (e.g., one function per adapter; multiple functions per adapter, etc.);

Requestor ID (RID) 210: This is an identifier of the adapter function that may include an adapter bus number, device number and function number. This field is used for accesses by the configuration of a configuration space of an adapter function.

Figure 3A:
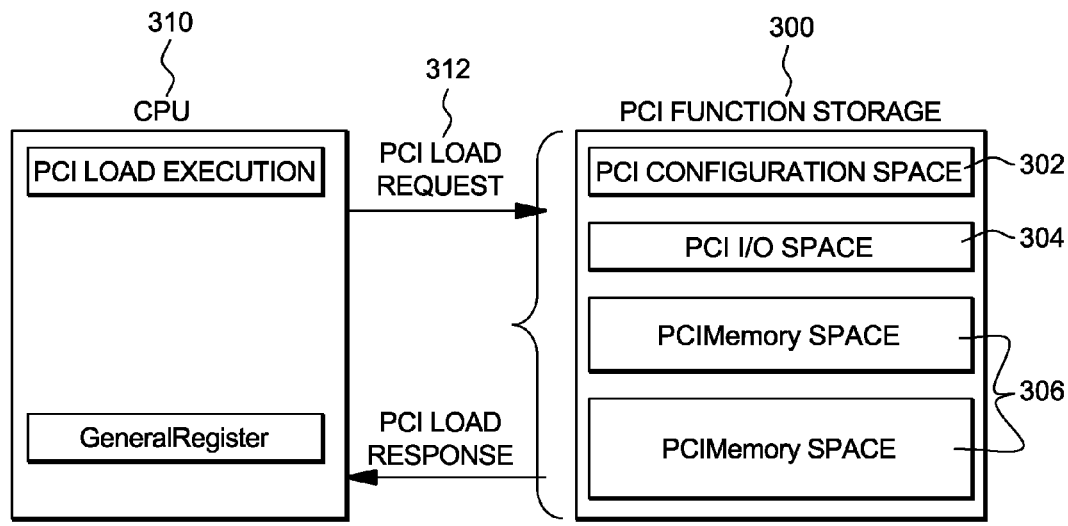
FIG. 3A depicts one example of an operating system executing a PCI load instruction to access a particular PCI function, in accordance with an aspect of the present invention.
Figure 3B:
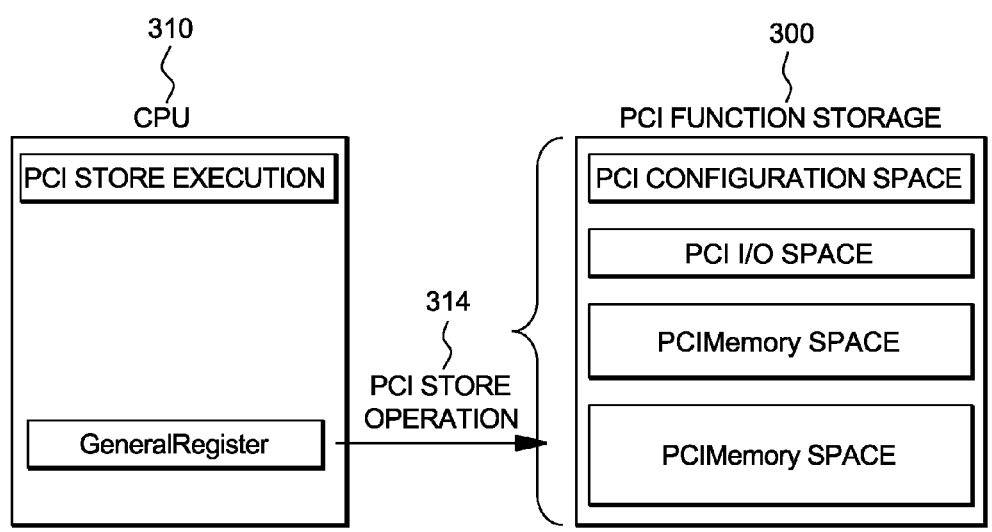
FIG. 3B depicts one example of an operating system issuing a PCI store instruction against a particular PCI function, in accordance with an aspect of the present invention.

As shown in FIG. 3A, an adapter function includes storage 300, which has a plurality of address spaces, including, for instance, a configuration space (e.g., PCI configuration space for a PCI function), an I/O space (e.g., PCI I/O space), and one or more memory spaces (e.g., PCI memory space).

The configuration space may be accessed by specifying the configuration space in an instruction issued by the configuration to the adapter function. Also specified in the instruction is an offset into the configuration space and a function handle used to locate the appropriate function table entry that includes the RID. The firmware receives the instruction and determines it is for a configuration space. Therefore, it uses the RID to generate a request to the I/O hub, and the I/O hub creates a request to access the adapter. The location of the adapter is based on the RID and the offset specifies the offset into the configuration space of the adapter. For instance, the offset specifies an offset into a register number in the configuration space.

Base Address Register (1 to n) 212: There may be one or more base address registers and each is used to indicate the base address of an I/O address space or a memory space within the adapter function. It is used for accesses to memory space and/or I/O space of the adapter function.

For instance, the offset provided in an instruction to access the adapter function is added to the value in the base address register associated with the address space designated in the instruction to obtain the address to be used to access the adapter function. The address identifier provided in the instruction identifies the address space within the adapter function to be accessed and the corresponding BAR to be used.

Device Table Index (1 to n) 214 (FIG. 2A): There may be one or more device table indices, and each index is an index into a device table to locate a device table entry (DTE). There are one or more device table entries per adapter function, and each entry includes information associated with its adapter function, including information used to process requests of the adapter function (e.g., DMA requests, MSI requests) and information relating to requests to the adapter function (e.g., PCI instructions). Each device table entry is associated with one address space within system memory assigned to the adapter function. The information included in the DTE may depend on the operations supported by or enabled for the adapter function (described more fully below); and Internal Routing Information 216: This information is used to perform particular routing to the adapter. It includes, for instance, node, processor chip, and hub addressing information, as examples.

The function table entry may include more, less or different information. The information included may depend on the operations supported by or enabled for the adapter function (described more fully below).

Figure 2B:
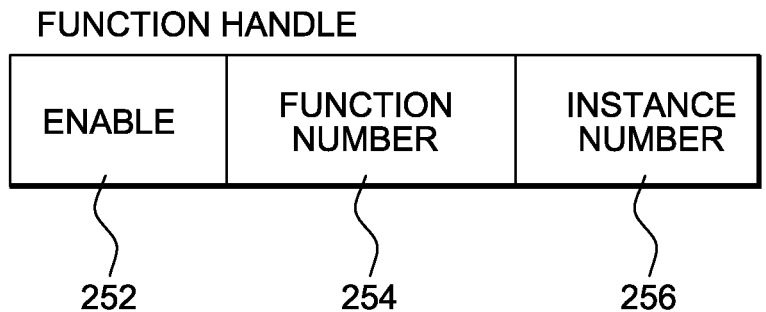
FIG. 2B depicts one embodiment of a function handle used to locate a function table entry, in accordance with an aspect of the present invention.

To access a particular function table entry for a given adapter function, a function handle 184 (FIG. 1C) is used. In one example, one or more bits of the function handle are used as an index into the function table to locate a particular function table entry. There is a function handle 184 for each adapter function. In one particular example, a function handle includes a plurality of parameters. As shown in FIG. 2B, function handle 184 includes, for instance, an enable indicator 252 indicating whether the handle is enabled; a function number 254 that identifies the function (this is a static identifier and may be used to index into the function table); and an instance number 256 specifying the particular instance of this function handle.

As described above, adapter functions can issue requests, such as memory access requests, interrupt requests, etc. Further, a configuration can issue requests to an adapter function. In accordance with an aspect of the present invention, these configuration requests are via specific instructions, which access the adapter or modify control parameters associated with the adapter. Example instructions include PCI Load, PCI Store, and Modify PCI Function Controls, to name a few. These instructions are specific to the I/O infrastructure architecture (e.g., PCI).

In one example, as shown in FIG. 3A, an operating system executing within a CPU 310 issues a load instruction 312 (e.g., PCI Load) to access one of the address spaces of the function's storage 300. There may be multiple adapter functions within a system and only one operating system may be allowed access to a given adapter. When an operating system issues a PCI Load instruction, access restrictions are enforced by, for example, firmware to ensure that the operating system issuing the instruction is permitted to access the address space within the adapter function.

In a further example, the operating system executing in CPU 310 issues a store instruction 314 (e.g., PCI store), which also accesses one of the address spaces. There are other adapter instructions that also need to be controlled such that the operating system (or other configuration) only accesses the adapter function, assigned to it.

One embodiment of controlling access of an operating system to an adapter function is described with reference to FIG. 4. Although this example describes operating system access, it may also be used by other configurations.

Figure 4:
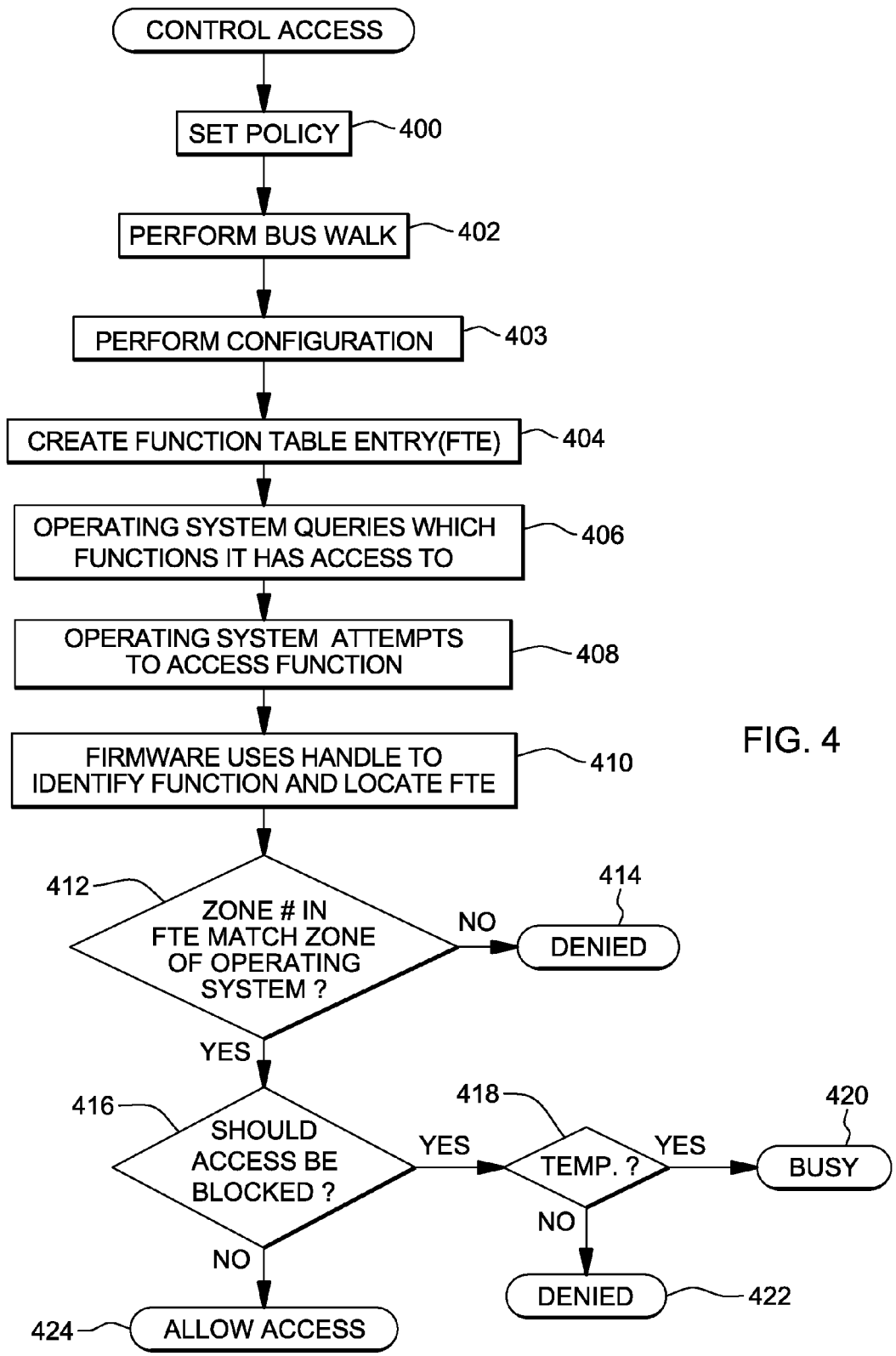
FIG. 4 depicts one embodiment of the logic to control access by an operating system to a particular adapter function, in accordance with an aspect of the present invention.

Referring to FIG. 4, initially, a policy is set by a system administrator or customer that associates each PCI function with a particular configuration (e.g., a particular operating system, a particular logical partition, etc.) that is allowed to access that adapter function, STEP 400. This policy is, for instance, reconfigurable, and is maintained in an I/O configuration data set located in secure memory.

At system initialization time, the firmware (i.e., trusted firmware) performs a bus walk of the I/O infrastructure to determine which adapter functions are included in (e.g., plugged into) the infrastructure, STEP 402. The firmware will not consider an adapter to be part of the infrastructure, if the adapter as identified by its vital product data is not supported by the platform. During this bus walk, the firmware performs a certain amount of configuration, STEP 403. This configuration includes initializing the PCIe switches 114 with routing information (e.g., bus numbers and address information) that will allow successful routing of packets to and from the adapter functions. At this time, the configuration spaces of the supported adapters are also initialized with their requestor IDs and BAR information that is also consistent with the routing information configured in the switches. Subsequent to this a function table entry is created for each supported adapter function, and populating the function table entry with some information, STEP 404. For instance, the firmware places the previously configured BAR information and that requestor ID in the function table entry.

Based on the policy, a zone number is set in each function table entry that indicates which logical partition, and therefore, which operating system, has access to the adapter function corresponding to the function table entry. In a further embodiment, in which the computing environment is not logically partitioned, the zone number may be replaced by another indicator that specifies an operating system, rather than a logical partition. Other indicators may also be used for other types of configuration.

Thereafter, the operating system issues a query to determine the adapter functions to which is has access (e.g., those assigned and may possibly be assigned), STEP 406. Responsive to this query, the firmware returns a list of one or more adapter functions. As an example, the firmware scans the function table looking for all function table entries with a zone number matching the zone number of the requesting operating system; and returns a list of the adapter functions in which the zone numbers match. (In another embodiment, a partial list may be returned.) For each adapter function included in the list, a function handle is provided in the list.

At some point, the operating system attempts to access an adapter function (e.g., query an adapter function; access an address space of the function; or set up or modify a device table entry for the adapter function; etc.), via, for instance, an instruction, STEP 408. The operating system specifies in the instruction the adapter function to access via the function handle. The firmware then uses this function handle to locate the function table entry corresponding to the adapter function, STEP 410. The zone number in the function table entry is compared with the zone number in which the operating system resides, INQUIRY 412. If they do not match, then access is denied (e.g., the instruction is prevented from executing), STEP 414. However, if they do match, then a further determination is made, in one example, as to whether access should be blocked for a different reason, INQUIRY 416. For instance, the status stored in the function table entry is used to determine if the operating system issued an instruction that is to be blocked while firmware privileged operations are being performed that impact the adapter function, such as recovery, firmware download, etc.

If there is an indication that access should be blocked, a further determination is made as to whether that block is temporary, INQUIRY 418. That is, if the adapter function is only temporarily unavailable as indicated by, for instance, status in the function table entry, then the instruction can be completed with a busy signal, STEP 420, and it can be attempted again. If, however, the adapter function is not just temporarily blocked, then access is denied, STEP 422.

Returning to INQUIRY 416, if access should not be blocked, then access is allowed, STEP 424. For instance, the instruction is allowed to execute. This concludes processing.

In addition to the above, in a further example, if it is determined that the zone number in the function table entry matches the zone number of the operating system, an additional validation can be performed to allow a guest (e.g., VM guest) direct access to an adapter the guest owns. In this example, a check is performed to see if the guest has access to the adapter. For instance, the function table entry is checked for the guest id. If it is stored in the entry, then processing continues; if not, the request is denied.

The above access control capability is employed for instructions issued to the adapter function by the configuration, such as PCI Load, PCI Store, PCI Store Block, Modify PCI Function Controls and various call logical processor CLP instructions used, for instance, to query or enable/disable the adapter function. In this example, the instructions are PCI instructions, since the adapter functions are PCI adapter functions. However, in other examples, other I/O architecture specific instructions may be used depending on the architecture of the adapter functions.

Figure 5A:
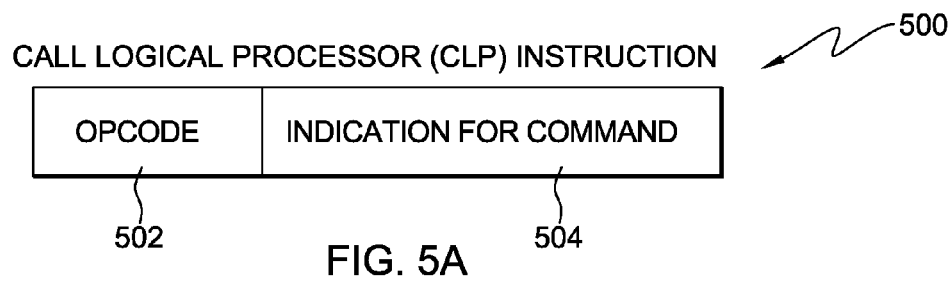
FIG. 5A depicts one embodiment of a Call Logical Processor instruction used in accordance with an aspect of the present invention.

Further details regarding some of the instructions are described below. For instance, in order to use a PCI function, it is to be enabled. For example, the operating system that would like to use a PCI function performs a query to determine the one or more functions that it is eligible to use (based on I/O configuration), and selects one of those functions to be enabled. In one example, the function is enabled using a set PCI function command of a Call Logical Processor instruction. One embodiment of this instruction is depicted in FIG. 5A. As shown, in one example, a Call Logical Processor instruction 500 includes an operation code 502 indicating that it is the Call Logical Processor instruction; and an indication for a command 504. In one example, this indication is an address of a request block that describes the command to be performed. One embodiment of such a request block is depicted in FIG. 5B.

Figure 5B:
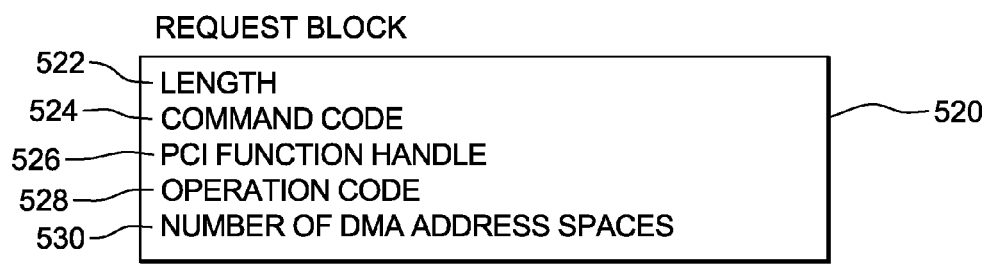
FIG. 5B depicts one embodiment of a request block used by the Call Logical Processor instruction of FIG. 5A, in accordance with an aspect of the present invention.

As shown in FIG. 5B, in one example, a request block 520 includes a number of parameters, such as, for instance, a length field 522 indicating the length of the request block; a command field 524 indicating the set PCI function command; a PCI function handle 526, which is the handle to be provided to either the enable or disable function; an operation code 528, which is used to designate either an enable or disable operation; and a number of DMA address spaces (DMAAS) 530, which indicates the requested number of address spaces to be associated with the particular PCI function. More, less or different information may be included in other embodiments. For instance, in a virtual environment in which the instruction is issued by a host of a pageable storage mode guest, a guest identity is provided. Other variations are also possible.

Figure 5C:
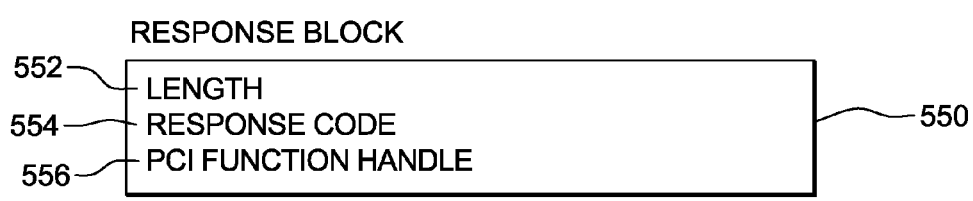
FIG. 5C depicts one embodiment of a response block provided by the Call Logical Processor instruction of FIG. 5A, in accordance with an aspect of the present invention.

Responsive to issuing and processing the Call Logical Processor instruction, a response block is returned and the information included in the response block is dependent on the operation to be performed. One embodiment of the response block is depicted in FIG. 5C. In one example, response block 550 includes a length field 552 indicating the length of the response block; a response code 554 indicating a status of the command; and a PCI function handle 556 that identifies the PCI function. Responsive to the enable command, the PCI function handle is an enabled handle of the PCI function. Further, upon completion of the disable operation, the PCI function handle is a general handle that can be enabled by an enable function in the future.

One embodiment of the logic to enable a PCI function is described with reference to FIG. 6. In one example, this logic is initiated responsive to issuing a Call Logical Processor instruction in which the command is set to the set PCI function command and the operation code is set to the enable function. This logic is performed by, for instance, a processor responsive to the operating system or a device driver of the operating system authorized to perform this logic issuing the instruction. In other embodiments, the logic may be performed without the use of the Call Logical Processor instruction.

Figure 6:
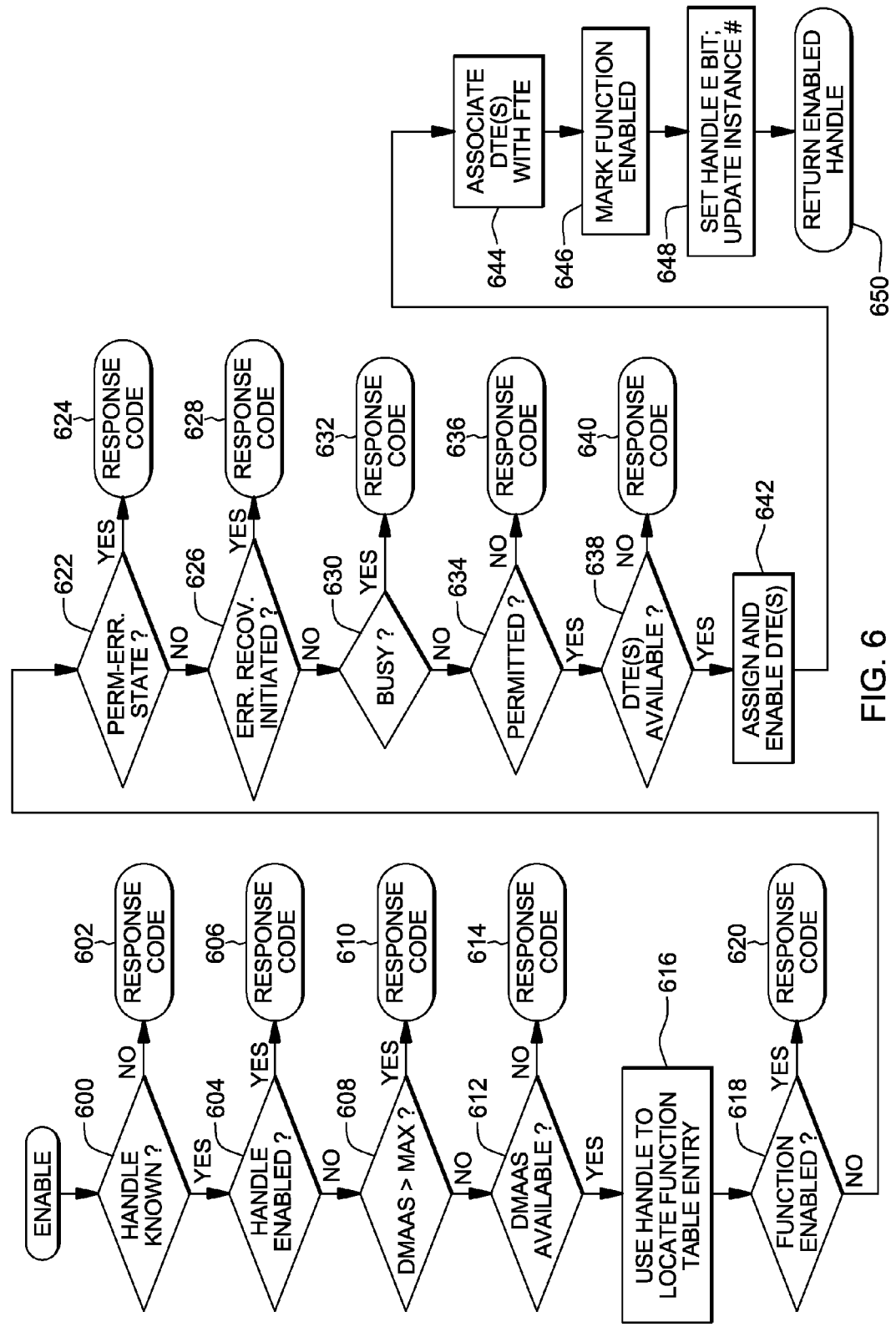
FIG. 6 depicts one embodiment of the logic to enable a PCI function, in accordance with an aspect of the present invention.

Referring to FIG. 6, initially, a determination is made as to whether a handle provided in the request block of the Call Logical Processor instruction is a valid handle, INQUIRY 600. That is, does the handle point to a valid entry in the function table or is it outside the range of valid entries (e.g., does function number portion of handle designate an installed function). If the handle is not known, then a corresponding response code is provided indicating that the handle is not recognized, STEP 602. However, if the handle is known, then a further inquiry is made as to whether the handle is enabled, INQUIRY 604. This determination is made by checking the enable indicator in the PCI function handle. If the indication is set indicating the handle is enabled, then a response code is returned indicating such, STEP 606.

However, if the handle is known and not enabled (i.e., valid for enablement), then a further determination is made as to whether the requested number of address spaces to be assigned to the PCI function is greater than a maximum value, INQUIRY 608. To make this determination, the number of DMA address spaces as specified in the request block is compared against a maximum value (provided based on policy, in one example). If the number of address spaces is greater than the maximum value, then a response code is provided indicating an invalid value for DMA address spaces, STEP 610. Otherwise, a determination is made as to whether the number of requested address spaces is available, INQUIRY 612. This determination is made by checking whether there are device table entries available for the requested number of address spaces. If the number of requested address spaces is not available, then a response code is returned indicating that there are insufficient resources, STEP 614. Otherwise, processing continues to enable the PCI function.

The provided handle is used to locate a function table entry, STEP 616. For instance, one or more designated bits of the handle are used as an index into the function table to locate a particular function table entry. Responsive to locating the appropriate function table entry, a determination is made as to whether the function is enabled, INQUIRY 618. This determination is made by checking the enable indicator in the function table entry. If the function is already enabled (i.e., the indicator is set to one), then a response code is returned indicating that the PCI function is already in the requested state, STEP 620.

If the function is not already enabled, then processing continues with determining whether the function is in a permanent error state, INQUIRY 622. If the permanent error state indicator in the function table entry indicates it is in a permanent error state, then a response code is returned indicating such, STEP 624. However, if the function is not in a permanent error state, a further determination is made as to whether error recovery has been initiated for the function, INQUIRY 626. If the recovery initiated indicator in the function table entry is set, then a response code indicating recovery has been initiated is provided, STEP 628. Otherwise, a further inquiry is made as to whether the PCI function is busy, INQUIRY 630. Again, if a check of the busy indicator in the function table entry indicates the PCI function is busy, then such an indication is provided, STEP 632. However, if the PCI function is not in the permanent error state, recovery is not initiated and it is not busy, then a further inquiry is made as to whether the operating system is permitted to enable this PCI function, STEP 634.

In one example, the permission checking includes validating the zone number in the FTE to that of the operating system issuing the instruction. If they are not equal, then the operating system is not permitted. If they are equal, then a permission indicator in the function table entry is checked. If it is not permitted based on the permission indicator of the function table entry, then a response code indicating an unauthorized action is provided, STEP 636. However, if all the tests are successfully passed, then a further determination is made as to whether there are any DTEs available for this PCI function, INQUIRY 638. As examples, the determination of DTEs being available can be based on the DTEs that are not currently enabled in the I/O hub. Additionally, policy could be applied to further limit the number of DTEs available to a given operating system or logical partition. Any available DTE that is accessible to the adapter may be assigned. If there are no available DTEs, then a response code is returned indicating that one or more of the requested DTEs are unavailable, STEP 640.

If the DTEs are available, then a number of DTEs corresponding to the requested number of address spaces are assigned and enabled, STEP 642. In one example, the enabling includes setting the enable indicator in each DTE to be enabled. Further, the enabling includes, in this example, setting up a contents addressable memory (CAM) to provide an index to each DTE. For instance, for each DTE, an entry in the CAM is loaded with the index, and the CAM facilitates location of a DTE.

Further, the DTEs are associated with the function table entry, STEP 644. This includes, for instance, including each DTE index in the function table entry. The function is then marked as enabled by setting the enable indicator in the function table entry, STEP 646. Moreover, the enable bit in the handle is set, and the instance number is updated, STEP 648. This enabled handle is then returned, STEP 650, allowing use of the PCI adapter. For instance, responsive to enabling the function, registration for address translations and interruptions may be performed, DMA operations may be performed by the PCI function, and/or load, store and store block instructions may be issued to the function.

As indicated above, after enabling the function, various operational parameters are set in the DTE and/or FTE via, the Modify PCI Function Controls instruction. One example of the Modify PCI Function Controls instruction is described with reference to FIGS. 7A-7D.

Figure 7A:
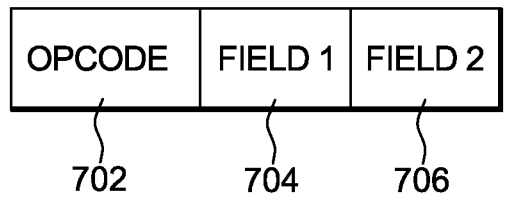
FIG. 7A depicts one embodiment of a Modify PCI Function Controls instruction used in accordance with an aspect of the present invention.

Referring to FIG. 7A, a Modify PCI Function Controls instruction 700 includes, for instance, an op code 702 indicating the Modify PCI Function Controls instruction; a first field 704 specifying a location at which various information is included regarding the adapter function for which the operational parameters are being established; and a second field 706 specifying a location from which a PCI function information block (FIB) is fetched. The contents of the locations designated by Fields 1 and 2 are further described below.

Figure 7B:
FIG. 7B depicts one embodiment of a field used by the Modify PCI Function Controls instruction of FIG. 7A, in accordance with an aspect of the present invention.

In one embodiment, Field 1 designates a general register that includes various information. As shown in FIG. 7B, the contents of the register include, for instance, a function handle 710 that identifies the handle of the adapter function on behalf of which the modify instruction is being performed; an address space 712 designating an address space in system memory associated with the adapter function designated by the function handle; an operation control 714 which specifies the operation to be performed for the adapter function; and status 716 which provides status regarding the instruction when the instruction completes with a predefined code.

Figure 7C:
FIG. 7C depicts one embodiment of another field used by the Modify PCI Function Controls instruction of FIG. 7A, in accordance with an aspect of the present invention.

In one example, as shown in FIG. 7C, Field 2 designates a logical address 720 of a PCI function information block (FIB), which includes information regarding an associated adapter function. The function information block is used, in accordance with an aspect of the present invention, to update a device table entry and/or function table entry (or other location) associated with the adapter function. The information is stored in the FIB during initialization and/or configuration of the adapter, and/or responsive to a particular event.

Figure 7D:
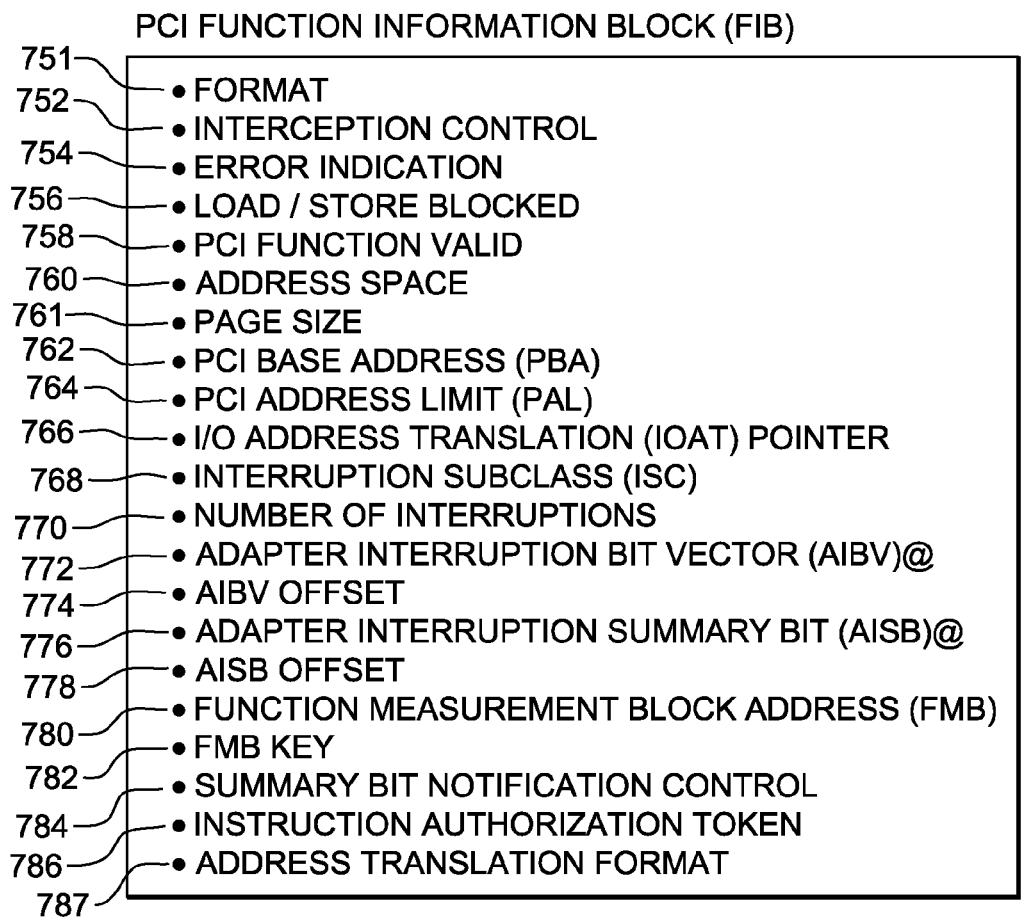
FIG. 7D depicts one embodiment of the contents of a function information block (FIB), used in accordance with an aspect of the present invention.

Further details regarding a function information block are described with reference to FIG. 7D. In one embodiment, a function information block 750 includes the following fields:

Format 751: This field specifies the format of the FIB.

Interception Control 752: This field is used to indicate whether guest execution of specific instructions by a pageable mode guest results in instruction interception;

Error Indication 754: This field includes the error state indication for direct memory access and adapter interruptions. When the bit is set (e.g., 1), one or more errors have been detected while performing direct memory access or adapter interruption for the adapter function;

Load/Store Blocked 756: This field indicates whether load/store operations are blocked;

PCI Function Valid 758: This field includes an enablement control for the adapter function. When the bit is set (e.g., 1), the adapter function is considered to be enabled for I/O operations;

Address Space Registered 760: This field includes a direct memory access enablement control for an adapter function. When the field is set (e.g., 1) direct memory access is enabled;

Page Size 761: This field indicates the size of the page or other unit of memory to be accessed by a DMA memory access;

PCI Base Address (PBA) 762: This field is a base address for an address space in system memory assigned to the adapter function. It represents the lowest virtual address that an adapter function is allowed to use for direct memory access to the specified DMA address space;

PCI Address Limit (PAL) 764: This field represents the highest virtual address that an adapter function is allowed to access within the specified DMA address space;

Input/Output Address Translation Pointer (IOAT) 766: The input/output address translation pointer designates the first of any translation tables used by a PCI virtual address translation, or it may directly designate the absolute address of a frame of storage that is the result of translation;

Interruption Subclass (ISC) 768: This field includes the interruption subclass used to present adapter interruptions for the adapter function;

Number of Interruptions (NOI) 770: This field designates the number of distinct interruption codes accepted for an adapter function. This field also defines the size, in bits, of the adapter interruption bit vector designated by an adapter interruption bit vector address and adapter interruption bit vector offset fields;

Adapter Interruption Bit Vector Address (AIBV) 772: This field specifies an address of the adapter interruption bit vector for the adapter function. This vector is used in interrupt processing;

Adapter Interruption Bit Vector Offset 774: This field specifies the offset of the first adapter interruption bit vector bit for the adapter function;

Adapter Interruption Summary Bit Address (AISB) 776: This field provides an address designating the adapter interruption summary bit, which is optionally used in interrupt processing;

Adapter Interruption Summary Bit Offset 778: This field provides the offset into the adapter interruption summary bit vector;

Function Measurement Block (FMB) Address 780: This field provides an address of a function measurement block used to collect measurements regarding the adapter function;

Function Measurement Block Key 782: This field includes an access key to access the function measurement block;

Summary Bit Notification Control 784: This field indicates whether there is a summary bit vector being used;

Instruction Authorization Token 786: This field is used to determine whether a pageable storage mode guest (e.g., V=V guest) is authorized to execute PCI instructions without host intervention; and Address Translation Format 787: This field indicates a selected format for address translation of the highest level translation table to be used in translation (e.g., segment table, region 3rd, etc.).

The information in the function information block is obtained during configuration, initialization, and/or occurrence of a particular event.

The function information block designated in the Modify PCI Function Controls instruction is used, in accordance with an aspect of the present invention, to modify a selected device table entry, a function table entry and/or other firmware controls associated with the adapter function designated in the instruction. By modifying the device table entry, function table entry and/or other firmware controls, certain services are provided for the adapter. These services include, for instance, adapter interruptions; address translations; reset error state; reset load/store blocked; set function measurement parameters; and set interception control.

One embodiment of the logic associated with the Modify PCI Function Controls instruction is described with reference to FIG. 8. In one example, the instruction is issued by an operating system (or other configuration) and executed by the processor (e.g., firmware) executing the operating system. In the examples herein, the instruction and adapter functions are PCI based. However, in other examples, a different adapter architecture and corresponding instructions may be used.

In one example, the operating system provides the following operands to the instruction (e.g., in one or more registers designated by the instruction): the PCI function handle; the DMA address space identifier; an operation control; and an address of the function information block.

Figure 8:
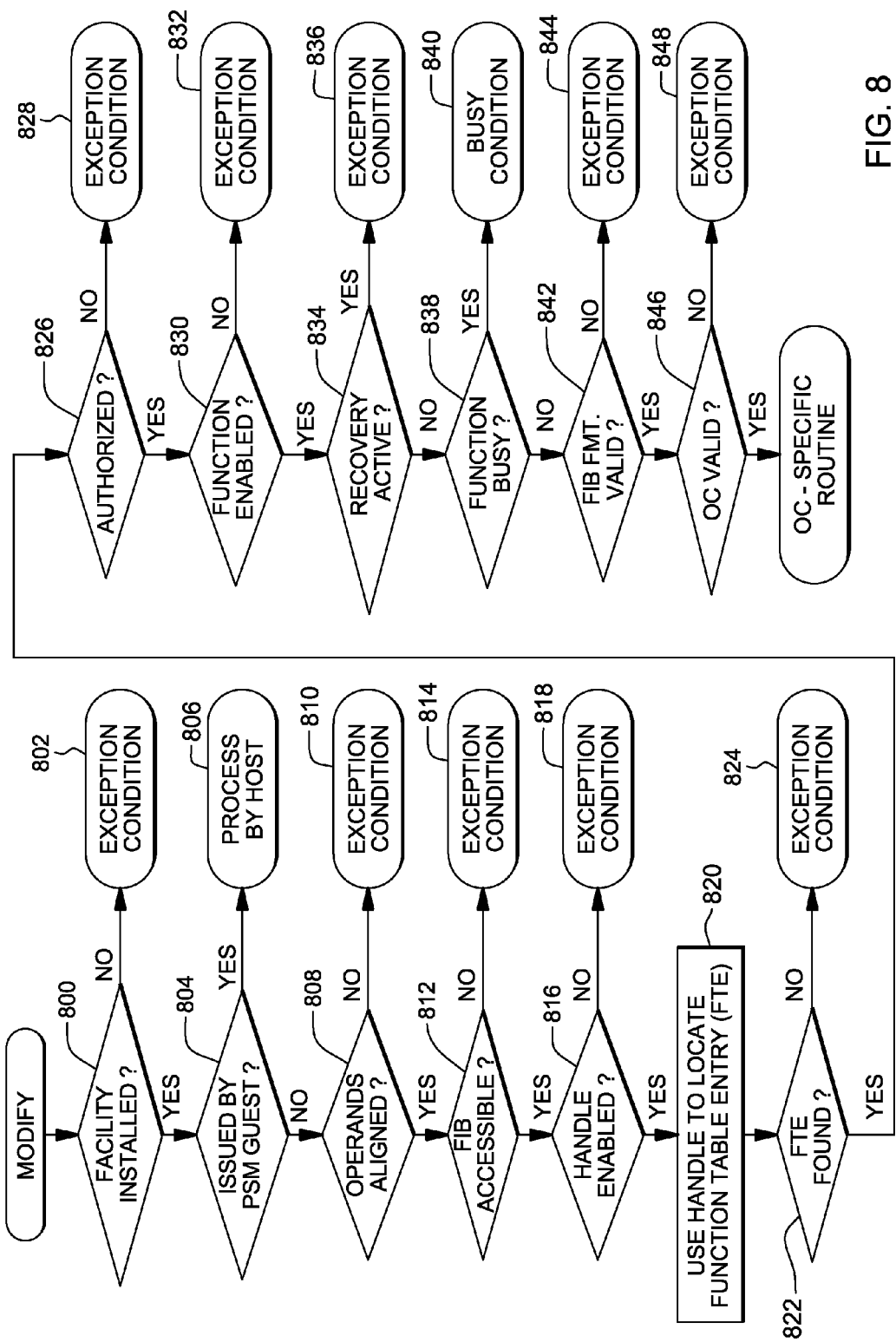
FIG. 8 depicts one embodiment of an overview of the logic of the Modify PCI Function Controls instruction, in accordance with an aspect of the present invention.

Referring to FIG. 8, initially, a determination is made as to whether the facility allowing for a Modify PCI Function Controls instruction is installed, INQUIRY 800. This determination is made by, for instance, checking an indicator stored in, for instance, a control block. If the facility is not installed, an exception condition is provided, STEP 802. Otherwise, a determination is made as to whether the instruction was issued by a pageable storage mode guest (or other guest), INQUIRY 804. If yes, the host operating system will emulate the operation for that guest, STEP 806.

Otherwise, a determination is made as to whether one or more of the operands are aligned, INQUIRY 808. For instance, a determination is made as to whether the address of the function information block is on a double word boundary. In one example, this is optional. If the operands are not aligned, then an exception condition is provided, STEP 810. Otherwise, a determination is made as to whether the function information block is accessible, INQUIRY 812. If not, then an exception condition is provided, STEP 814. Otherwise, a determination is made as to whether the handle provided in the operands of the Modify PCI Function Controls instruction is enabled, INQUIRY 816. In one example, this determination is made by checking an enable indicator in the handle. If the handle is not enabled, then an exception condition is provided, STEP 818.

If the handle is enabled, then the handle is used to locate a function table entry, STEP 820. That is, at least a portion of the handle is used as an index into the function table to locate the function table entry corresponding to the adapter function for which operational parameters are to be established.

A determination is made as to whether the function table entry was found, INQUIRY 822. If not, then an exception condition is provided, STEP 824. Otherwise, a determination is made as to whether the operating system is authorized, INQUIRY 826. In one example, this includes validating the zone number in the FTE to that of the operating system issuing the instruction. If they are not equal, then the operating system is not authorized. If they are equal, then a further determination is made as to whether the configuration issuing the instruction is a guest. If so, then an exception condition (e.g., an interception to the host) is provided, STEP 828. This inquiry may be ignored if the configuration is not a guest or other authorizations may be checked, if designated.

A determination is then made as to whether the function is enabled, INQUIRY 830. In one example, this determination is made by checking an enable indicator in the function table entry. If it is not enabled, then an exception condition is provided, STEP 832.

If the function is enabled, then a determination is made as to whether recovery is active, INQUIRY 834. If recovery is active as determined by a recovery indicator in the function table entry, then an exception condition is provided, 836. However, if recovery is not active, then a further determination is made as to whether the function is busy, 838. This determination is made by checking the busy indicator in the function table entry. If the function is busy, then a busy condition is provided, STEP 840. With the busy condition, the instruction can be retried, instead of dropped.

If the function is not busy, then a further determination is made as to whether the function information block format is valid, INQUIRY 842. For instance, the format field of the FIB is checked to determine if this format is supported by the system. If it is invalid, then an exception condition is provided, STEP 844. If the function information block format is valid, then a further determination is made as to whether the operation control specified in the operands of the instruction is valid, INQUIRY 846. That is, is the operation control one of the specified operation controls for this instruction. If it is invalid, then an exception condition is provided, STEP 848. However, if the operation control is valid, then processing continues with the specific operation control being specified.

Various operations may be specified including, for instance, registering/unregistering address translations; registering/unregistering adapter interruptions; set interception control; reset error state; reset load/store blocked indicator, etc. For each of these operations, the operational parameters related to the operation are copied from the FIB to the DTE and/or FTE (or other location).

Subsequent to initialization, a guest may execute a PCI Load, PCI Store and PCI Store Block instruction, each of which is described below.

Figure 9A:
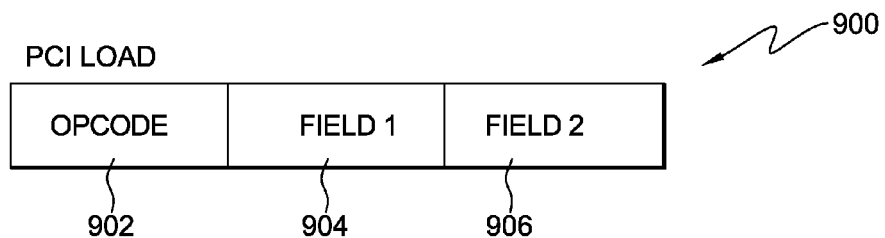
FIG. 9A depicts one embodiment of a PCI Load instruction used in accordance with an aspect of the present invention.

Referring initially to FIG. 9A, one embodiment of a PCI Load instruction is depicted. As shown, a PCI Load instruction 900 includes, for instance, an opcode 902 indicating the PCI Load instruction; a first field 904 specifying a location at which data fetched from an adapter function will be loaded; and a second field 906 specifying a location at which various information is included regarding the adapter function from which data is to be loaded. The contents of the locations designated by Fields 1 and 2 are further described below.

Figure 9B:
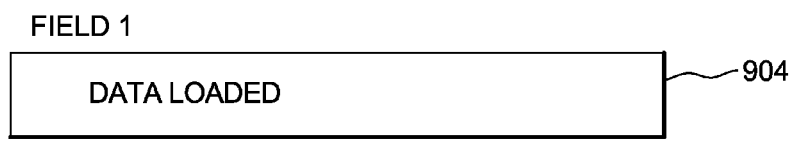
FIG. 9B depicts one embodiment of a field used by the PCI Load instruction of FIG. 9A, in accordance with an aspect of the present invention.

In one example, Field 1 designates a general register, and as depicted in FIG. 9B, the contents 904 of that register include a contiguous range of one or more bytes loaded from the location of the adapter function specified in the instruction. In one example, the data is loaded into the rightmost byte positions of the register.

Figure 9C:
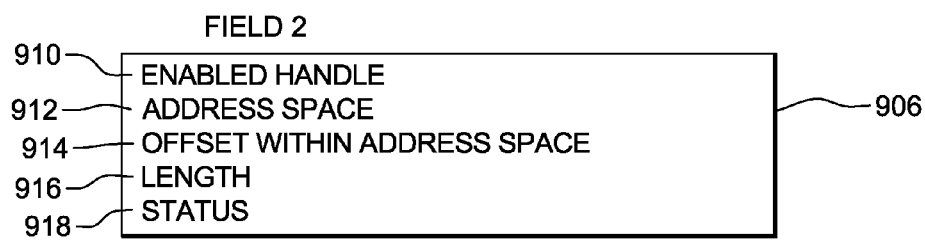
FIG. 9C depicts one embodiment of another field used by the PCI Load instruction of FIG. 9A, in accordance with an aspect of the present invention.

In one embodiment, Field 2 designates a pair of general registers that include various information. As shown in FIG. 9C, the contents of the registers include, for instance:

Enabled Handle 910: This field is an enabled function handle of the adapter function from which the data is to be loaded;

Address Space 912: This field identifies the address space within the adapter function from which the data is to be loaded;

Offset Within Address Space 914: This field specifies the offset within the specified address space from which the data is to be loaded;

Length field 916: This field specifies the length of the load operation (e.g., the number of bytes to be loaded); and Status field 918: This field provides a status code which is applicable when the instruction completes with a predefined condition code.

In one embodiment, the bytes loaded from the adapter function are to be contained within an integral boundary in the adapter function's designated PCI address space. When the address space field designates a memory address space, the integral boundary size is, for instance, a double word. When the address space field designates an I/O address space or a configuration address space, the integral boundary size is, for instance, a word.

One embodiment of the logic associated with a PCI Load instruction is described with reference to FIGS. 10A-10B. In one example, the instruction is issued by an operating system (or other configuration) and executed by the processor (e.g., firmware) executing the operating system. In the examples herein, the instructions and adapter functions are PCI-based. However, in other examples, a different adapter architecture and corresponding instructions may be used.

To issue the instruction, the operating system provides the following operands to the instruction (e.g., in one or more registers designated by the instruction): the PCI function handle, the PCI address space (PCIAS), the offset into the PCI address space, and the length of the data to be loaded. Upon successful completion of the PCI Load instruction, the data is loaded in the location (e.g., register) designated by the instruction.

Figure 10A:
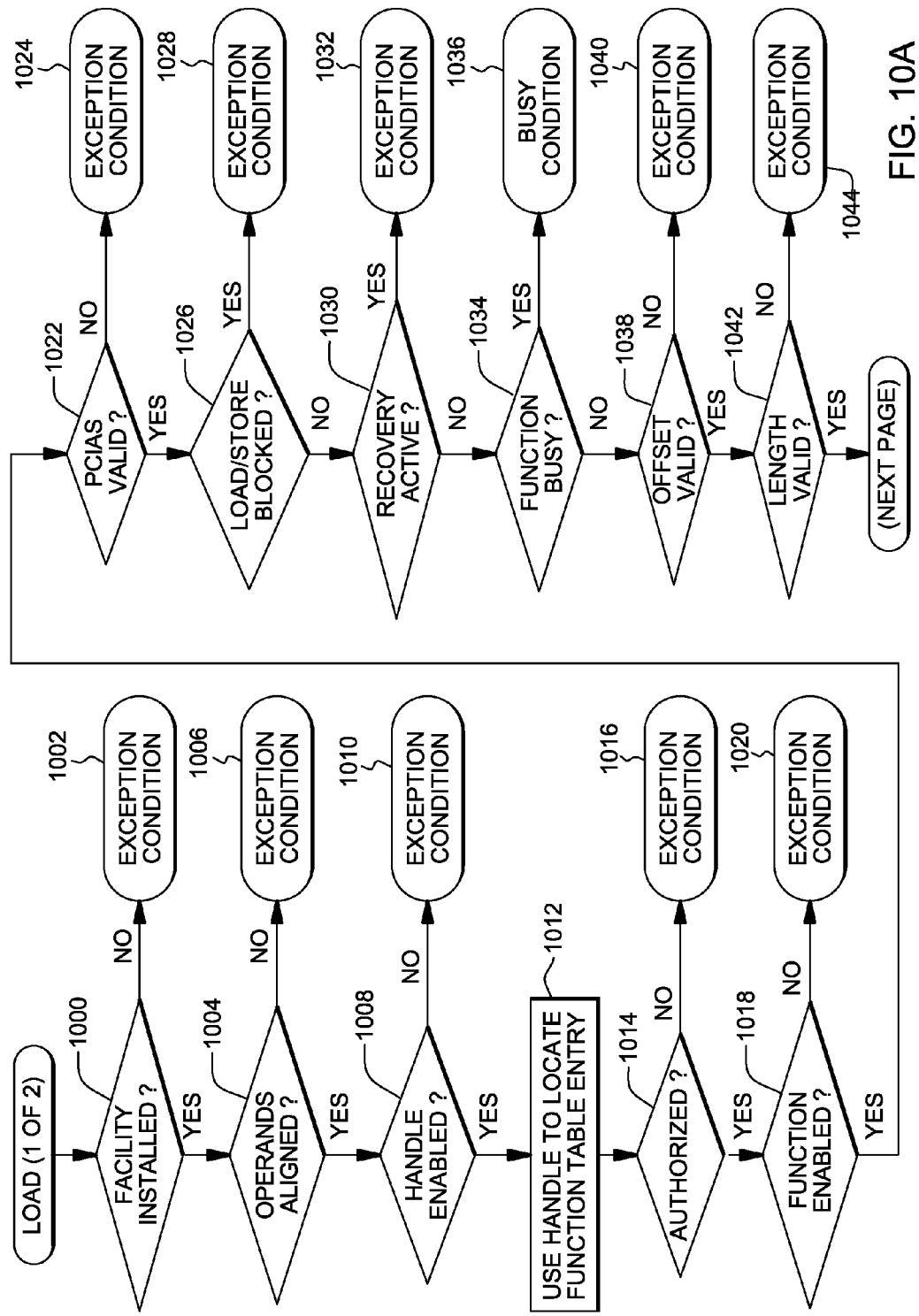
FIGS. 10A-10B depict one embodiment of the logic to perform a PCI Load operation, in accordance with an aspect of the present invention.

Referring to FIG. 10A, initially, a determination is made as to whether the facility allowing for a PCI Load instruction is installed, INQUIRY 1000. This determination is made by, for instance, checking an indicator stored in, for instance, a control block. If the facility is not installed, an exception condition is provided, STEP 1002. Otherwise, a determination is made as to whether the operands are aligned, INQUIRY 1004. For instance, if certain operands need to be in even/odd register pairs, a determination is made as to whether those requirements are met. If the operands are not aligned, then an exception is provided, STEP 1006. Otherwise, if the facility is installed and the operands are aligned, a determination is made as to whether the handle provided in the operands of the PCI Load instruction is enabled, INQUIRY 1008. In one example, this determination is made by checking an enable indicator in the handle. If the handle is not enabled, then an exception condition is provided, STEP 1010.

If the handle is enabled, then the handle is used to locate a function table entry, STEP 1012. That is, at least a portion of the handle is used as an index into the function table to locate the function table entry corresponding to the adapter function from which data is to be loaded.

Thereafter, a determination is made as to whether the operating system is authorized, INQUIRY 1014. In one example, this includes validating the zone number in the FTE to that of the operating system issuing the instruction. If they are not equal, then the operating system is not authorized. If they are equal, then a further determination is made as to whether the configuration issuing the instruction is a guest. If so, then an exception condition is provided, STEP 1016. This inquiry may be ignored if the configuration is not a guest or other authorizations may be checked, if designated.

A determination is then made as to whether the function is enabled, INQUIRY 1018. In one example, this determination is made by checking an enable indicator in the function table entry. If it is not enabled, then an exception condition is provided, STEP 1020.

If the function is enabled, then a determination is made as to whether the address space is valid, INQUIRY 1022. For instance, is the specified address space a designated address space of the adapter function and one that is appropriate for this instruction. If the address space is invalid, then an exception condition is provided, STEP 1024. Otherwise, a determination is made as to whether load/store is blocked, INQUIRY 1026. In one example, this determination is made by checking the status indicator in the function table entry. If load/store is blocked, then an exception condition is provided, STEP 1028.

However, if load/store is not blocked, a determination is made as to whether recovery is active, INQUIRY 1030. In one example, this determination is made by checking the recovery initiated indicator in the function table entry. If recovery is active, then an exception condition is provided, STEP 1032. Otherwise, a determination is made as to whether the function is busy, INQUIRY 1034. This determination is made by checking the busy indicator in the function table entry. If the function is busy, then a busy condition is provided, STEP 1036. With a busy condition, the instruction can be retried, instead of dropped.

If the function is not busy, then a further determination is made as to whether the offset specified in the instruction is valid, INQUIRY 1038. That is, is the offset in combination with the length of the operation within the base and length of the address space, as specified in the function table entry. If not, then an exception condition is provided, STEP 1040. However, if the offset is valid, then a determination is made as to whether the length is valid, INQUIRY 1042. That is, subject to the address space type, offset within the address space, and an integral boundary size is the length valid. If not, then an exception condition is provided, STEP 1044. Otherwise, processing continues with the load instruction. (In one embodiment, the firmware performs the above checks.)

Figure 10B:
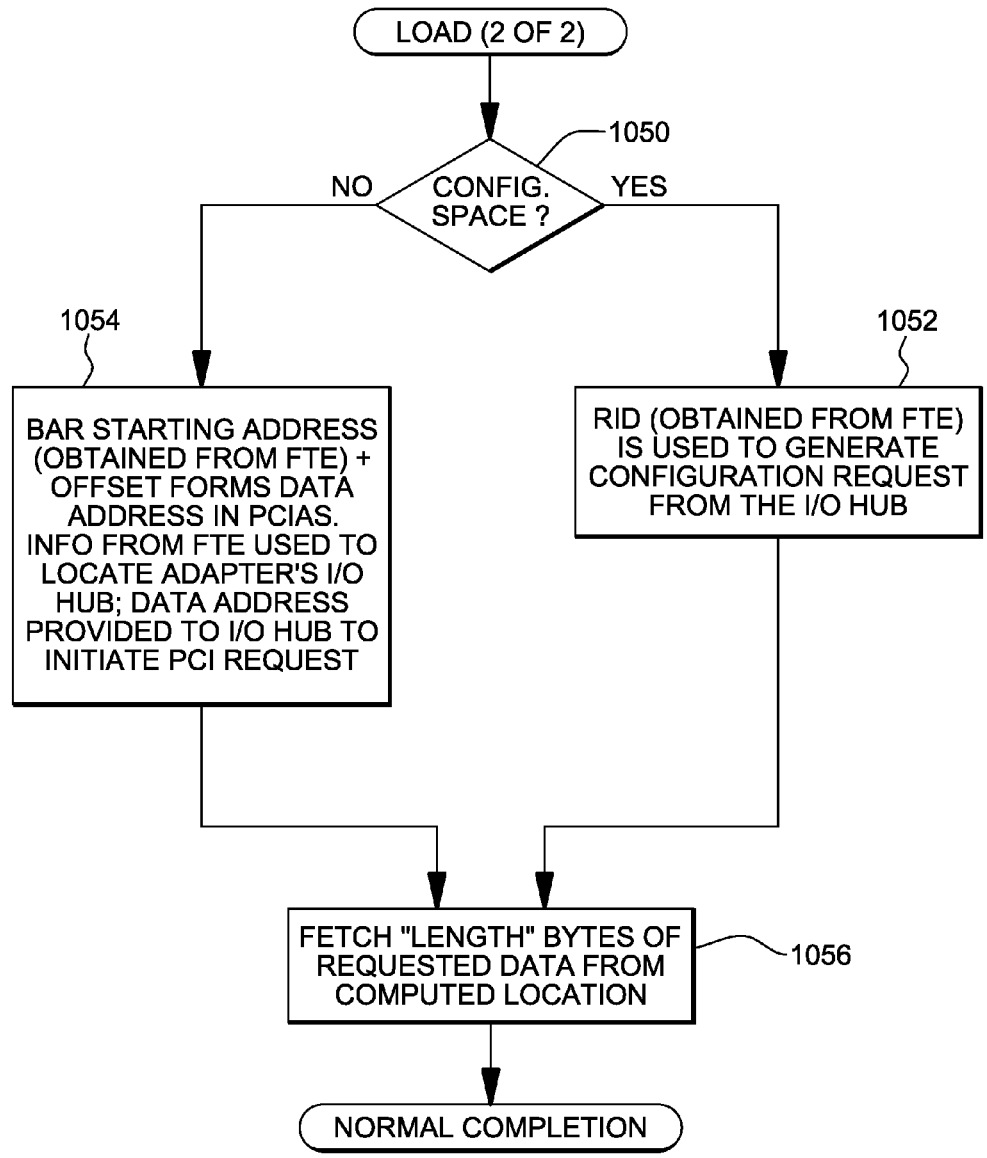

Continuing with FIG. 10B, a determination is made by the firmware as to whether the load is for a configuration address space of the adapter function, INQUIRY 1050. That is, based on the configuration of the adapter function's memory, is the specified address space provided in the instruction a configuration space. If so, then the firmware performs various processing to provide the request to a hub coupled to the adapter function; the hub then routes the request to the function, STEP 1052.

For example, the firmware obtains the requestor ID from the function table entry pointed to by the function handle provided in the instruction operands. Further, the firmware determines based on information in the function table entry (e.g., the internal routing information) the hub to receive this request. That is, an environment may have one or more hubs and the firmware determines the hub coupled to the adapter function. It then forwards the request to the hub. The hub generates a configuration read request packet that flows out on the PCI bus to the adapter function identified by the RID in the function table entry. The configuration read request includes the RID and offset (i.e., data address) that are used to fetch the data, as described below.

Returning to INQUIRY 1050, if the designated address space is not a configuration space, then once again the firmware performs various processing to provide the request to the hub, STEP 1054. The firmware uses the handle to select a function table entry and from that entry it obtains information to locate the appropriate hub. It also calculates a data address to be used in the load operation. This address is calculated by adding the BAR starting address (with the BAR being that associated with the address space identifier provided in the instruction) obtained from the function table entry to the offset provided in the instruction. This calculated data address is provided to the hub. The hub then takes that address and includes it in a request packet, such as a DMA read request packet, that flows out over the PCI bus to the adapter function.

Responsive to receiving the request either via STEP 1052 or STEP 1054, the adapter function fetches the requested data from the specified location (i.e., at the data address) and returns that data in a response to the request, STEP 1056. The response is forwarded from the adapter function to the I/O hub. Responsive to receiving the response, the hub forwards the response to the initiating processor. The initiating processor then takes the data from the response packet and loads it in the designated location specified in the instruction (e.g., field 1). The PCI Load operation concludes with an indication of success (e.g., setting a condition code of zero).

Figure 11A:
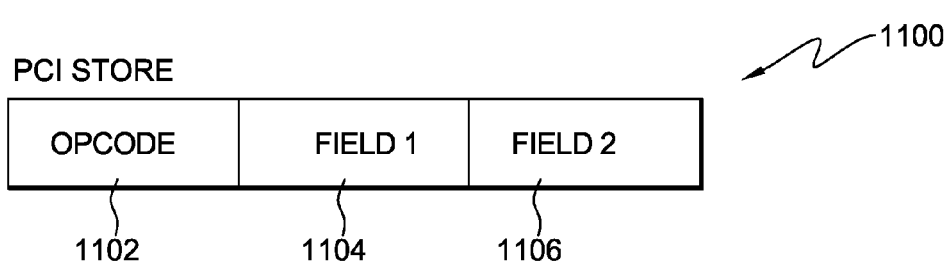
FIG. 11A depicts one embodiment of a PCI Store instruction used in accordance with an aspect of the present invention.

In addition to a load instruction that retrieves data from an adapter function and stores it in a designated location, another instruction that may be executed is a store instruction. The store instruction stores data at a specified location in the adapter function. One embodiment of a PCI Store instruction is described with reference to FIG. 11A. As shown, a PCI Store instruction 1100 includes, for instance, an opcode 1102 indicating the PCI Store instruction; a first field 1104 specifying a location that includes data to be stored in an adapter function; and a second field 1106 specifying a location at which various information is included regarding the adapter function to which data is to be stored. The contents of the locations designated by Fields 1 and 2 are further described below.

Figure 11B:
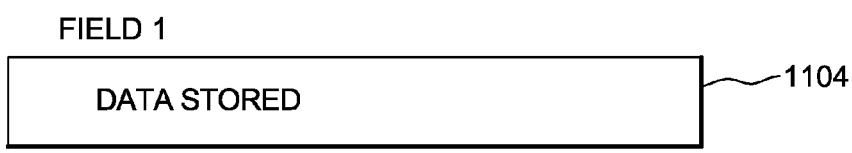
FIG. 11B depicts one embodiment of a field used by the PCI Store instruction of FIG. 11A, in accordance with an aspect of the present invention.
Figure 11C:
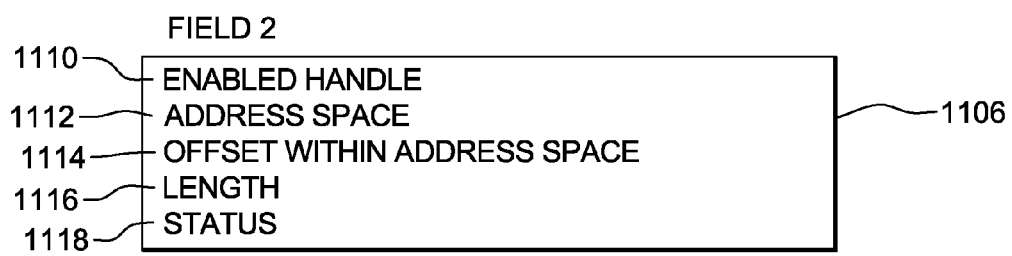
FIG. 11C depicts one embodiment of another field used by the PCI Store instruction of FIG. 11A, in accordance with an aspect of the present invention.

In one example, Field 1 designates a general register, and as depicted in FIG. 11B, the contents 1104 of that register include a contiguous range of one or more bytes of data to be stored into the specified location of an adapter function. In one example, the data in the rightmost byte positions of the register are stored.

In one embodiment, Field 2 designates a pair of general registers that include various information. As shown in FIG. 11B, the contents of the register include, for instance:

Enabled Handle 1110: This field is an enabled function handle of the adapter function to which the data is to be stored;

Address Space 1112: This field identifies the address space within the adapter function to which the data is to be stored;

Offset Within Address Space 1114: This field specifies the offset within the specified address space to which the data is to be stored;

Length field 1116: This field specifies the length of the store operation (e.g., the number of bytes to be stored); and Status field 1118: This field provides a status code which is applicable when the instruction completes with a pre-defined condition code.

On embodiment of the logic associated with a PCI Store instruction is described with reference to FIGS. 12A-12B. In one example, the instruction is issued by an operating system, and executed by the processor (e.g., firmware) executing the operating system.

To issue the instruction, the operating system provides the following operands to the instruction (e.g., in one or more registers designated by the instruction): the PCI function handle, the PCI address space (PCIAS), the offset into the PCI address space, the length of the data to be stored, and a pointer to the data to be stored. Upon successful completion of the PCI Store instruction, the data is stored in the location designated by the instruction.

Figure 12A:
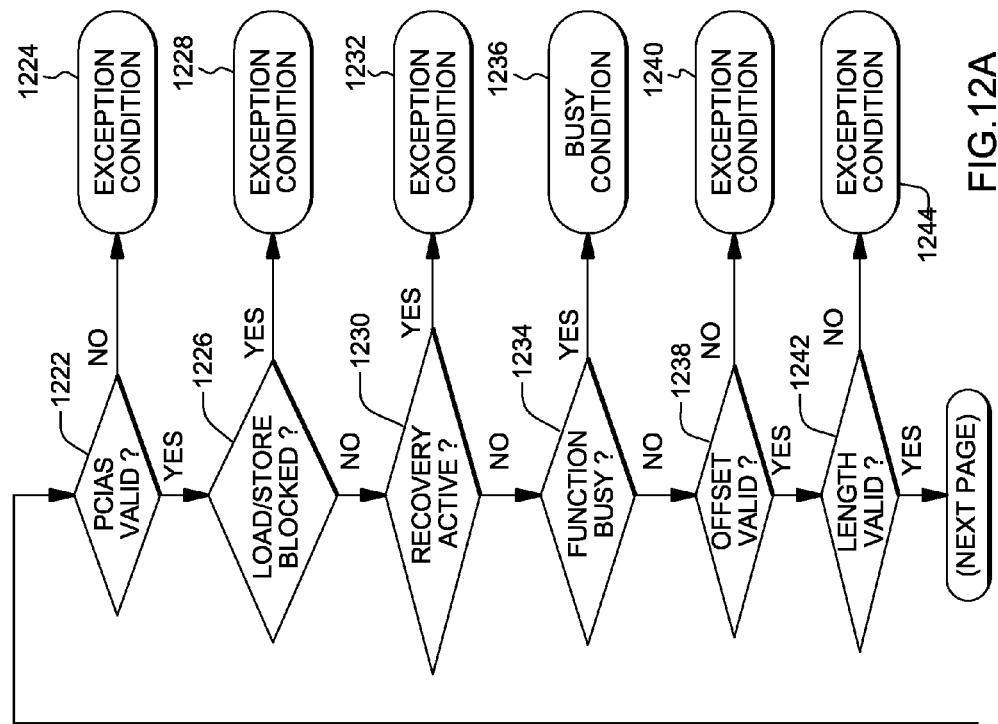
FIGS. 12A-12B depict one embodiment of the logic to perform a PCI Store operation, in accordance with an aspect of the present invention.
Figure 12A:
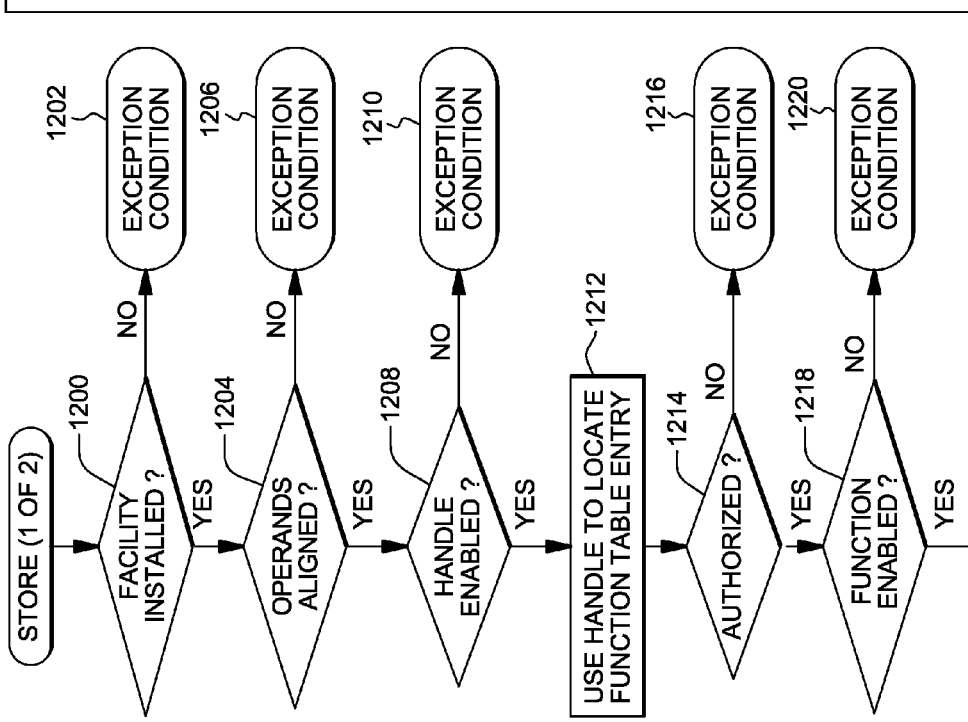

Referring to FIG. 12A, initially, a determination is made as to whether the facility allowing for a PCI Store instruction is installed, INQUIRY 1200. This determination is made by, for instance, checking an indicator stored in, for instance, a control block. If the facility is not installed, an exception condition is provided, STEP 1202. Otherwise, a determination is made as to whether the operands are aligned, INQUIRY 1204. For instance, if certain operands need to be in even/odd register pairs, a determination is made as to whether those requirements are met. If the operands are not aligned, then an exception is provided, STEP 1206. Otherwise, if the facility is installed and the operands are aligned, a determination is made as to whether the handle provided in the operands of the PCI Store instruction is enabled, INQUIRY 1208. In one example, this determination is made by checking an enable indicator in the handle. If the handle is not enabled, then an exception condition is provided, STEP 1210.

If the handle is enabled, then the handle is used to locate a function table entry, STEP 1212. That is, at least a portion of the handle is used as an index into the function table to locate the function table entry corresponding to the adapter function at which data is to be stored.

Thereafter, a determination is made as to whether the operating system is authorized, INQUIRY 1214. In one example, this includes validating the zone number in the FTE to that of the operating system issuing the instruction. If they are not equal, then the operating system is not authorized. If they are equal, then a further determination is made as to whether the configuration issuing the instruction is a guest. If so, then an exception condition is provided, STEP 1216. This inquiry may be ignored if the configuration is not a guest or other authorizations may be checked, if designated.

A determination is then made as to whether the function is enabled, INQUIRY 1218. In one example, this determination is made by checking an enable indicator in the function table entry. If it is not enabled, then an exception condition is provided, STEP 1220.

If the function is enabled, then a determination is made as to whether the address space is valid, INQUIRY 1222. For instance, is the specified address space a designated address space of the adapter function and one that is appropriate for this instruction. If the address space is invalid, then an exception condition is provided, STEP 1224. Otherwise, a determination is made as to whether load/store is blocked, INQUIRY 1226. In one example, this determination is made by checking the status indicator in the function table entry. If load/store is blocked, then an exception condition is provided, STEP 1228.

However, if the load/store is not blocked, a determination is made as to whether recovery is active, INQUIRY 1230. In one example, this determination is made by checking the recovery initiated indicator in the function table entry. If recovery is active, then an exception condition is provided, STEP 1232. Otherwise, a determination is made as to whether the function is busy, INQUIRY 1234. This determination is made by checking the busy indicator in the function table entry. If the function is busy, then a busy condition is provided, STEP 1236. With a busy condition, the instruction can be retried, instead of dropped.

If the function is not busy, then a further determination is made as to whether the offset specified in the instruction is valid, INQUIRY 1238. That is, is the offset in combination with the length of the operation within the base and length of the address space, as specified in the function table entry. If not, then an exception condition is provided, STEP 1240. However, if the offset is valid, then a determination is made as to whether the length is valid, INQUIRY 1242. That is, subject to the address space type, offset within the address space, and an integral boundary size is the length valid. If not, then an exception condition is provided, STEP 1244. Otherwise, processing continues with the store instruction. (In one embodiment, the firmware performs the above checks.)

Figure 12B:
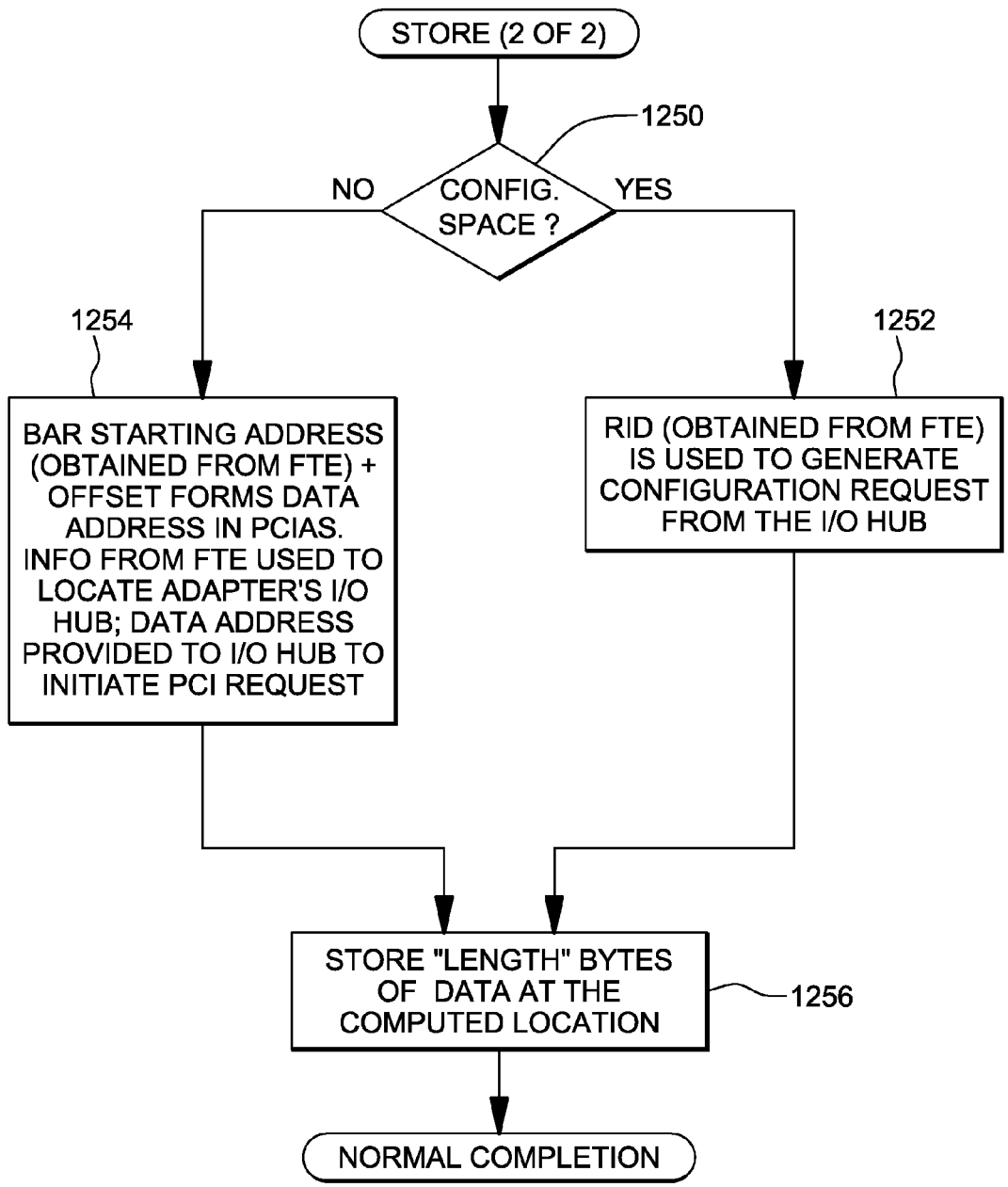

Continuing with FIG. 12B, a determination is made by the firmware as to whether the store is for a configuration address space of the adapter function, INQUIRY 1250. That is, based on the configuration of the adapter function's memory, is the specified address space provided in the instruction a configuration space. If so, then the firmware performs various processing to provide the request to a hub coupled to the adapter function; the hub then routes the request to the function, STEP 1252.

For example, the firmware obtains the requestor id from the function table entry pointed to by the function handle provided in the instruction operands. Further, the firmware determines based on information in the function table entry (e.g., the internal routing information) the hub to receive this request. That is, an environment may have one or more hubs and the firmware determines the hub coupled to the adapter function. It then forwards the request to the hub. The hub generates a configuration write request packet that flows out on the PCI bus to the adapter function identified by the RID in the function table entry. The configuration write request includes the RID and offset (i.e., data address) that are used to store the data, as described below.

Returning to INQUIRY 1250, if the designated address space is not a configuration space, then once again the firmware performs various processing to provide the request to the hub, STEP 1254. The firmware uses the handle to select a function table entry and from that entry it obtains information to locate the appropriate hub. It also calculates a data address to be used in the store operation. This address is calculated by adding the BAR starting address obtained from the function table entry to the offset provided in the instruction. This calculated data address is provided to the hub. The hub then takes that address and includes it in a request packet, such as a DMA write request packet, that flows out over the PCI bus to the adapter function.

Responsive to receiving the request either via STEP 1252 or STEP 1254, the adapter function stores the requested data at the specified location (i.e., at the data address), STEP 1256. The PCI Store operation concludes with an indication of success (e.g., setting a condition code of zero).

In addition to the load and store instructions, which typically load or store a maximum of, e.g., 8 bytes, another instruction that may be executed is a store block instruction. The store block instruction stores larger blocks of data (e.g., 16, 32, 64, 128 or 256 bytes) at a specified location in the adapter function; the block sizes are not necessarily limited to powers of two in size. In one example, the specified location is in a memory space of the adapter function (not an I/O or configuration space).

Figure 13A:
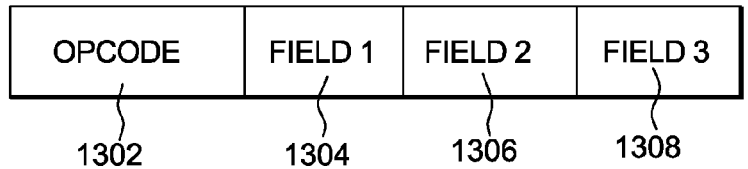
FIG. 13A depicts one embodiment of a PCI Store Block instruction used in accordance with an aspect of the present invention.

One embodiment of a PCI Store Block instruction is described with reference to FIG. 13A. As shown, a PCI Store Block instruction 1300 includes, for instance, an opcode 1302 indicating the PCI Store Block instruction; a first field 804 specifying a location at which various information is included regarding the adapter function to which data is to be stored; a second field 1306 specifying a location that includes an offset within the specified address space into which the data is to be stored; and a third field 1308 specifying a location that includes a system memory address of data to be stored in the adapter function. The contents of the locations designated by Fields 1, 2 and 3 are further described below.

Figure 13B:
FIG. 13B depicts one embodiment of a field used by the PCI Store Block instruction of FIG. 13A, in accordance with an aspect of the present invention.

In one embodiment, Field 1 designates a general register that includes various information. As shown in FIG. 13B, the contents of the register include, for instance:

Enabled Handle 1310: This field is an enabled function handle of the adapter function to which the data is to be stored;

Address Space 1312: This field identifies the address space within the adapter function to which the data is to be stored;

Length field 1314: This field specifies the length of the store operation (e.g., the number of bytes to be stored); and Status field 1316: This field provides a status code which is applicable when the instruction completes with a predefined condition code.

Figure 13C:
FIG. 13C depicts one embodiment of another field used by the PCI Store Block instruction of FIG. 13A, in accordance with an aspect of the present invention.

In one example, Field 2 designates a general register, and as depicted in FIG. 13C, the contents of the register include a value (e.g., 64-bit unsigned integer) that specifies the offset within the specified address space into which the data is to be stored.

Figure 13D:
FIG. 13D depicts one embodiment of yet another field used by the PCI Store Block instruction of FIG. 13A, in accordance with an aspect of the present invention.

In one example, Field 3, as depicted in FIG. 13D, includes the logical address of the first byte of data in system memory 1322 to be stored in the adapter function.

One embodiment of the logic associated with a PCI Store Block instruction is described with reference to FIGS. 14A-14B. In one example, the instruction is issued by an operating system, and executed by the processor (e.g., firmware) executing the operating system.

To issue the instruction, the operating system provides the following operands to the instruction (e.g., in one or more registers designated by the instruction): the PCI function handle, the PCI address space (PCIAS), the offset into the PCI address space, the length of the data to be stored, and a pointer to the data to be stored. The pointer operand may comprise both a register and a signed or unsigned displacement. Upon successful completion of the PCI Store Block instruction, the data is stored in the location in the adapter designated by the instruction.

Figure 14A:
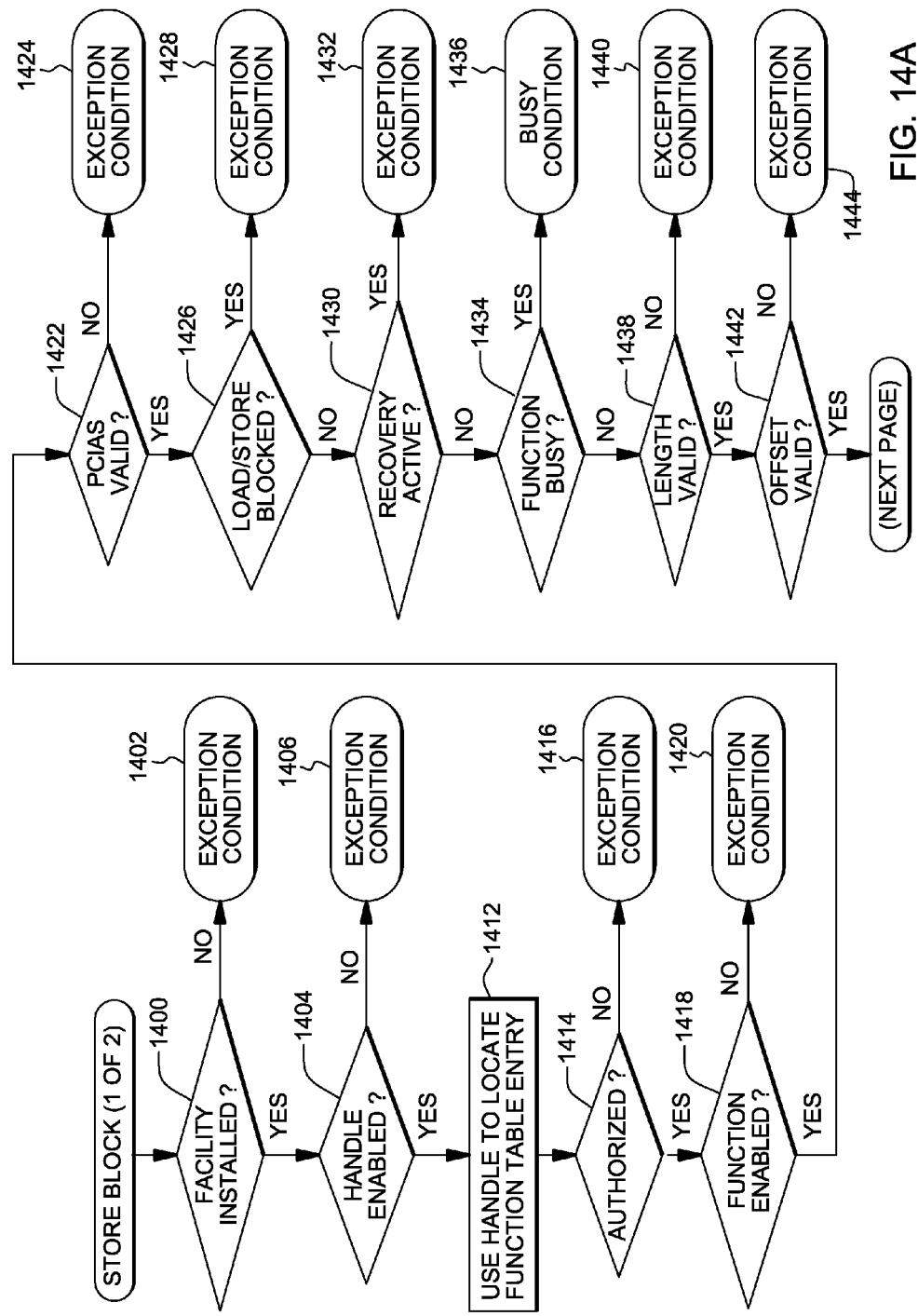
FIGS. 14A-14B depict one embodiment of the logic to perform a PCI Store Block operation, in accordance with an aspect of the present invention.

Referring to FIG. 14A, initially, a determination is made as to whether the facility allowing for a PCI Store Block instruction is installed, INQUIRY 1400. This determination is made by, for instance, checking an indicator stored in, for instance, a control block. If the facility is not installed, an exception condition is provided, STEP 1402. Otherwise, if the facility is installed, a determination is made as to whether the handle provided in the operands of the PCI Store Block instruction is enabled, INQUIRY 1404. In one example, this determination is made by checking an enable indicator in the handle. If the handle is not enabled, then an exception condition is provided, STEP 1406.

If the handle is enabled, then the handle is used to locate a function table entry, STEP 1412. That is, at least a portion of the handle is used as an index into the function table to locate the function table entry corresponding to the adapter function at which data is to be stored.

Thereafter, a determination is made as to whether the operating system is authorized, INQUIRY 1414. In one example, this includes validating the zone number in the FTE to that of the operating system issuing the instruction. If they are not equal, then the operating system is not authorized. If they are equal, then a further determination is made as to whether the configuration issuing the instruction is a guest. If so, then an exception condition is provided, STEP 1416. This inquiry may be ignored if the configuration is not a guest or other authorizations may be checked, if designated.

A determination is then made as to whether the function is enabled, INQUIRY 1418. In one example, this determination is made by checking an enable indicator in the function table entry. If it is not enabled, then an exception condition is provided, STEP 1420.

If the function is enabled, then a determination is made as to whether the address space is valid, INQUIRY 1422. For instance, is the specified address space a designated address space of the adapter function and one that is appropriate for this instruction (i.e., a memory space). If the address space is invalid, then an exception condition is provided, STEP 1424. Otherwise, a determination is made as to whether load/store is blocked, INQUIRY 1426. In one example, this determination is made by checking the status indicator in the function table entry. If load/store is blocked, then an exception condition is provided, STEP 1428.

However, if the load/store is not blocked, a determination is made as to whether recovery is active, INQUIRY 1430. In one example, this determination is made by checking the recovery initiated indicator in the function table entry. If recovery is active, then an exception condition is provided, STEP 1432. Otherwise, a determination is made as to whether the function is busy, INQUIRY 1434. This determination is made by checking the busy indicator in the function table entry. If the function is busy, then a busy condition is provided, STEP 1436. With a busy condition, the instruction can be retried, instead of dropped.

If the function is not busy, then a further determination is made as to whether the offset specified in the instruction is valid, INQUIRY 1438. That is, is the offset in combination with the length of the operation within the base and length of the address space, as specified in the function table entry. If not, then an exception condition is provided, STEP 1440. However, if the offset is valid, then a determination is made as to whether the length is valid, INQUIRY 1442. That is, subject to the address space type, offset within the address space, and an integral boundary size is the length valid. If not, then an exception condition is provided, STEP 1444. Otherwise, processing continues with the store block instruction. (In one embodiment, the firmware performs the above checks.)

Figure 14B:
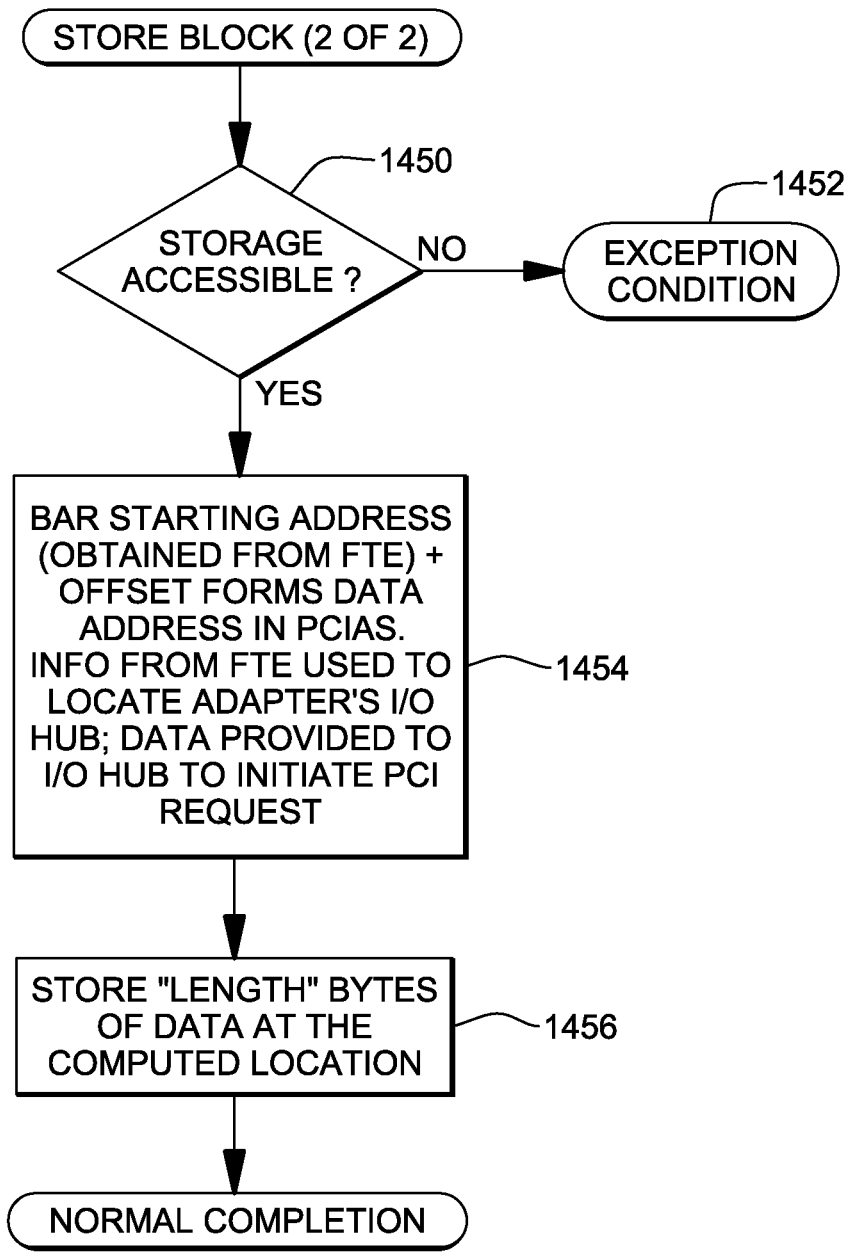

Continuing with FIG. 14B, a determination is made by the firmware as to whether the storage that includes the data to be stored is accessible, INQUIRY 1450. If not, an exception condition is provided, STEP 1452. If so, then the firmware performs various processing to provide the request to a hub coupled to the adapter function; the hub then routes the request to the function, STEP 1454.

For example, the firmware uses the handle to select a function table entry and from that entry it obtains information to locate the appropriate hub. It also calculates a data address to be used in the store block operation. This address is calculated by adding the BAR starting address (with the BAR being identified by the address space identifier) obtained from the function table entry to the offset provided in the instruction. This calculated data address is provided to the hub. In addition, the data referenced by the address provided in the instruction is fetched from system memory and provided to the I/O hub. The hub then takes that address and data and includes it in a request packet, such as a DMA write request packet, that flows out over the PCI bus to the adapter function.

Responsive to receiving the request, the adapter function stores the requested data at the specified location (i.e., at the data address), STEP 1456. The PCI Store Block operation concludes with an indication of success (e.g., setting a condition code of zero).

Described in detail above is a capability for controlling access by a configuration to a particular adapter function. Each adapter function has a function table entry associated therewith and located within the function table entry is an indication of which configurations (e.g., operating systems, logical partitions, guests, etc.) are allowed access to the adapter function corresponding to the table entry. This is determined by policy, which is reconfigurable. Policy is enforced by firmware when the configuration issues instructions to the adapter function. Instruction execution is modified (e.g., by an indication) when the adapter function is under control of privileged firmware (e.g., in recovery). Access is prevented while the adapter is undergoing system maintenance or for other designated reasons.

A configuration is provided direct access to the adapter and does not require the use of separate I/O partitions. Strict isolation between partitions is provided, while providing extremely low latency access to the adapters. No communication between the partitions is needed to control access to the adapters. It provides control without using page tables for adapter specific instructions.

In the embodiments described herein, the adapters are PCI adapters. PCI, as used herein, refers to any adapters implemented according to a PCI-based specification as defined by the Peripheral Component Interconnect Special Interest Group (PCI-SIG), including but not limited to, PCI or PCIe. In one particular example, the Peripheral Component Interconnect Express (PCIe) is a component level interconnect standard that defines a bi-directional communication protocol for transactions between I/O adapters and host systems. PCIe communications are encapsulated in packets according to the PCIe standard for transmission on a PCIe bus. Transactions originating at I/O adapters and ending at host systems are referred to as upbound transactions. Transactions originating at host systems and terminating at I/O adapters are referred to as downbound transactions. The PCIe topology is based on point-to-point unidirectional links that are paired (e.g., one upbound link, one downbound link) to form the PCIe bus. The PCIe standard is maintained and published by the PCI-SIG.

Other applications filed on the same day include: U.S. Ser. No. 12/821,170, filed Jun. 23, 2010, entitled "Translation Of Input/Output Addresses To Memory Addresses," Craddock et al., U.S. Ser. No. 12/821,171, filed Jun. 23, 2010, entitled "Runtime Determination Of Translation Formats For Adapter Functions," Craddock et al., U.S. Ser. No. 12/821,172, filed Jun. 23, 2010, entitled "Resizing Address Spaces Concurrent To Accessing The Address Spaces," Craddock et al., U.S. Ser. No. 12/821,174, filed Jun. 23, 2010, entitled "Multiple Address Spaces Per Adapter," Craddock et al., U.S. Ser. No. 12/821,175, filed Jun. 23, 2010, entitled "Converting A Message Signaled Interruption Into An I/O Adapter Event Notification," Craddock et al., U.S. Ser. No. 12/821,177, filed Jun. 23, 2010, entitled "Converting A Message Signaled Interruption Into An I/O Adapter Event Notification To A Guest Operating System," Brice et al., U.S. Ser. No. 12/821,178, filed Jun. 23, 2010, entitled "Identification Of Types Of Sources Of Adapter Interruptions," Craddock et al., U.S. Ser. No. 12/821,179, filed Jun. 23, 2010, entitled "Controlling A Rate At Which Adapter Interruption Requests Are Processed," Belmar et al., U.S. Ser. No. 12/821,181, filed Jun. 23, 2010, entitled "Controlling The Selectively Setting Of Operational Parameters For An Adapter," Craddock et al., U.S. Ser. No. 12/821,182, filed Jun. 23, 2010, entitled "Load Instruction for Communicating with Adapters," Craddock et al., U.S. Ser. No. 12/821,185, filed Jun. 23, 2010, entitled "Discovery By Operating System Of Information Relating To Adapter Functions Accessible To The Operating System," Coneski et al., U.S. Ser. No. 12/821,187, filed Jun. 23, 2010, entitled "Enable/Disable Adapters Of A Computing Environment," Coneski et al., U.S. Ser. No. 12/821,190, filed Jun. 23, 2010, entitled "Guest Access To Address Spaces Of Adapter," Craddock et al., U.S. Ser. No. 12/821,191, filed Jun. 23, 2010, entitled "Managing Processing Associated With Hardware Events," Coneski et al., U.S. Ser. No. 12/821,192, filed Jun. 23, 2010, entitled "Operating System Notification Of Actions To Be Taken Responsive To Adapter Events," Craddock et al., U.S. Ser. No. 12/821,193, filed Jun. 23, 2010, entitled "Measurement Facility For Adapter Functions," Brice et al., U.S. Ser. No. 12/821,194, filed Jun. 23, 2010, entitled "Store/Store Block Instructions for Communicating with Adapters," Craddock et al., U.S. Ser. No. 12/821,224, filed Jun. 21, 2010, entitled "Associating Input/Output Device Requests With Memory Associated With A Logical Partition," Craddock et al., U.S. Ser. No. 12/821,247, filed Jun. 23, 2010, entitled "Scalable I/O Adapter Function Level Error Detection, Isolation, And Reporting," Craddock et al., U.S. Ser. No. 12/821,256, filed Jun. 23, 2010 entitled "Switch Failover Control In A Multiprocessor Computer System," Bayer et al., U.S. Ser. No. 12/821,242, filed Jun. 23, 2010, entitled "A System And Method For Downbound I/O Expansion Request And Response Processing In A PCIe Architecture," Gregg et al., U.S. Ser. No. 12/821,243, filed Jun. 23, 2010, entitled "Upbound Input/Output Expansion Request And Response Processing In A PCIe Architecture," Gregg et al., U.S. Ser. No. 12/821,245, filed Jun. 23, 2010, entitled "A System And Method For Routing I/O Expansion Requests And Responses In A PCIe Architecture," Lais et al.; U.S. Ser. No. 12/821,239, filed Jun. 23, 2010, entitled "Input/Output (I/O) Expansion Response Processing In A Peripheral Component Interconnect Express (PCIe) Environment," Gregg et al., U.S. Ser. No. 12/821,271, filed Jun. 23, 2010 entitled "Memory Error Isolation And Recovery In A Multiprocessor Computer System," Check et al., U.S. Ser. No. 12/821,248, filed Jun. 23, 2010, entitled "Connected Input/Output Hub Management," Bayer et al., each of which is hereby incorporated herein by reference in its entirety.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 15:
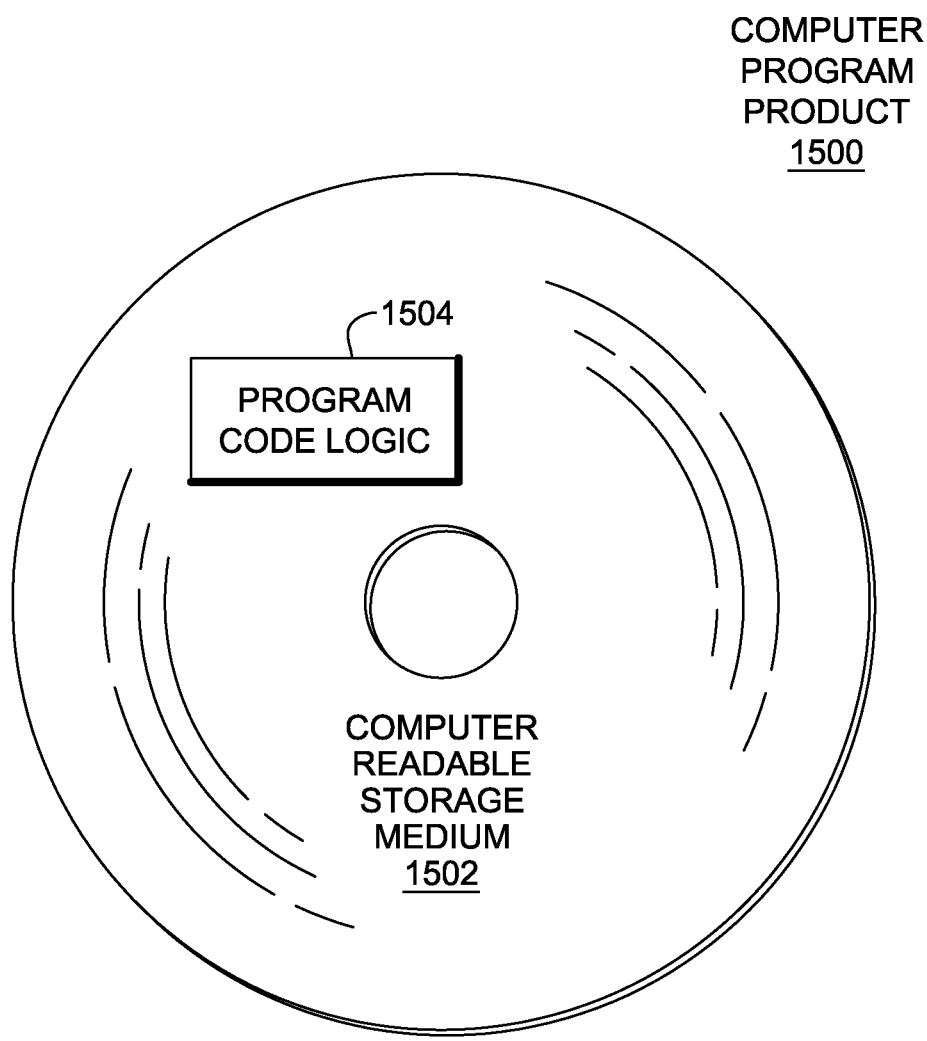
FIG. 15 depicts one embodiment of a computer program product incorporating one or more aspects of the present invention.

Referring now to FIG. 15, in one example, a computer program product 1500 includes, for instance, one or more computer readable storage media 1502 to store computer readable program code means or logic 1504 thereon to provide and facilitate one or more aspects of the present invention.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language, such as Java, Smalltalk, C++ or the like, and conventional procedural programming languages, such as the "C" programming language, assembler or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Although various embodiments are described above, these are only examples. For example, computing environments of other architectures can incorporate and use one or more aspects of the present invention. As examples, servers other than System z® servers, such as Power Systems servers or other servers offered by International Business Machines Corporation, or servers of other companies can include, use and/or benefit from one or more aspects of the present invention. Further, although in the example herein, the adapters and PCI hub are considered a part of the server, in other embodiments, they do not have to necessarily be considered a part of the server, but can simply be considered as being coupled to system memory and/or other components of a computing environment. The computing environment need not be a server. Although the adapters are PCI based, one or more aspects of the present invention are usable with other adapters or other I/O components. Adapter and PCI adapter are just examples. Moreover, more, less or different information may be included in the function table entries, device table entries, and/or function handle without departing from the spirit of the present invention. Further, although tables are described, any data structure can be used and the term table is to include all such data structures. Yet further, other instructions may be controlled by one or more aspects of the present invention. Many other variations are possible.

Further, other types of computing environments can benefit from one or more aspects of the present invention. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

Figure 16:
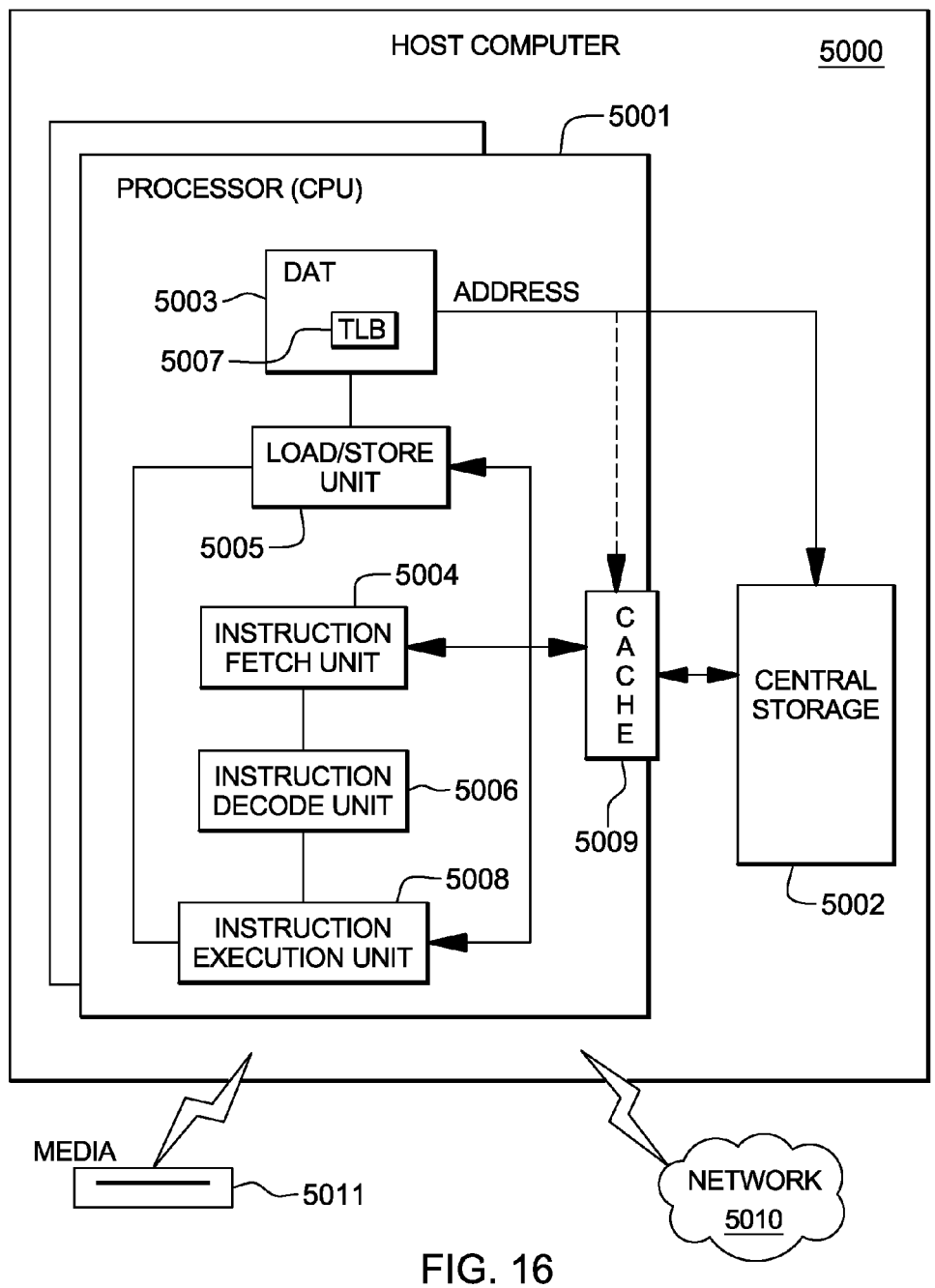
FIG. 16 depicts one embodiment of a host computer system to incorporate and use one or more aspects of the present invention.

Referring to FIG. 16, representative components of a Host Computer system 5000 to implement one or more aspects of the present invention are portrayed. The representative host computer 5000 comprises one or more CPUs 5001 in communication with computer memory (i.e., central storage) 5002, as well as I/O interfaces to storage media devices 5011 and networks 5010 for communicating with other computers or SANs and the like. The CPU 5001 is compliant with an architecture having an architected instruction set and architected functionality. The CPU 5001 may have dynamic address translation (DAT) 5003 for transforming program addresses (virtual addresses) into real addresses of memory. A DAT typically includes a translation lookaside buffer (TLB) 5007 for caching translations so that later accesses to the block of computer memory 5002 do not require the delay of address translation. Typically, a cache 5009 is employed between computer memory 5002 and the processor 5001. The cache 5009 may be hierarchical having a large cache available to more than one CPU and smaller, faster (lower level) caches between the large cache and each CPU. In some implementations, the lower level caches are split to provide separate low level caches for instruction fetching and data accesses. In one embodiment, an instruction is fetched from memory 5002 by an instruction fetch unit 5004 via a cache 5009. The instruction is decoded in an instruction decode unit 5006 and dispatched (with other instructions in some embodiments) to instruction execution unit or units 5008. Typically several execution units 5008 are employed, for example an arithmetic execution unit, a floating point execution unit and a branch instruction execution unit. The instruction is executed by the execution unit, accessing operands from instruction specified registers or memory as needed. If an operand is to be accessed (loaded or stored) from memory 5002, a load/store unit 5005 typically handles the access under control of the instruction being executed. Instructions may be executed in hardware circuits or in internal microcode (firmware) or by a combination of both.

As noted, a computer system includes information in local (or main) storage, as well as addressing, protection, and reference and change recording. Some aspects of addressing include the format of addresses, the concept of address spaces, the various types of addresses, and the manner in which one type of address is translated to another type of address. Some of main storage includes permanently assigned storage locations. Main storage provides the system with directly addressable fast-access storage of data. Both data and programs are to be loaded into main storage (from input devices) before they can be processed.

Main storage may include one or more smaller, faster-access buffer storages, sometimes called caches. A cache is typically physically associated with a CPU or an I/O processor. The effects, except on performance, of the physical construction and use of distinct storage media are generally not observable by the program.

Separate caches may be maintained for instructions and for data operands. Information within a cache is maintained in contiguous bytes on an integral boundary called a cache block or cache line (or line, for short). A model may provide an EXTRACT CACHE ATTRIBUTE instruction which returns the size of a cache line in bytes. A model may also provide PREFETCH DATA and PREFETCH DATA RELATIVE LONG instructions which effects the prefetching of storage into the data or instruction cache or the releasing of data from the cache.

Storage is viewed as a long horizontal string of bits. For most operations, accesses to storage proceed in a left-to-right sequence. The string of bits is subdivided into units of eight bits. An eight-bit unit is called a byte, which is the basic building block of all information formats. Each byte location in storage is identified by a unique nonnegative integer, which is the address of that byte location or, simply, the byte address. Adjacent byte locations have consecutive addresses, starting with 0 on the left and proceeding in a left-to-right sequence. Addresses are unsigned binary integers and are 24, 31, or 64 bits.

Information is transmitted between storage and a CPU or a channel subsystem one byte, or a group of bytes, at a time. Unless otherwise specified, in, for instance, the z/Architecture®, a group of bytes in storage is addressed by the leftmost byte of the group. The number of bytes in the group is either implied or explicitly specified by the operation to be performed. When used in a CPU operation, a group of bytes is called a field. Within each group of bytes, in, for instance, the z/Architecture®, bits are numbered in a left-to-right sequence. In the z/Architecture®, the leftmost bits are sometimes referred to as the "high-order" bits and the rightmost bits as the "low-order" bits. Bit numbers are not storage addresses, however. Only bytes can be addressed. To operate on individual bits of a byte in storage, the entire byte is accessed. The bits in a byte are numbered 0 through 7, from left to right (in, e.g., the z/Architecture). The bits in an address may be numbered 8-31 or 40-63 for 24-bit addresses, or 1-31 or 33-63 for 31-bit addresses; they are numbered 0-63 for 64-bit addresses. Within any other fixed-length format of multiple bytes, the bits making up the format are consecutively numbered starting from 0. For purposes of error detection, and in preferably for correction, one or more check bits may be transmitted with each byte or with a group of bytes. Such check bits are generated automatically by the machine and cannot be directly controlled by the program. Storage capacities are expressed in number of bytes. When the length of a storage-operand field is implied by the operation code of an instruction, the field is said to have a fixed length, which can be one, two, four, eight, or sixteen bytes. Larger fields may be implied for some instructions. When the length of a storage-operand field is not implied but is stated explicitly, the field is said to have a variable length. Variable-length operands can vary in length by increments of one byte (or with some instructions, in multiples of two bytes or other multiples). When information is placed in storage, the contents of only those byte locations are replaced that are included in the designated field, even though the width of the physical path to storage may be greater than the length of the field being stored.

Certain units of information are to be on an integral boundary in storage. A boundary is called integral for a unit of information when its storage address is a multiple of the length of the unit in bytes. Special names are given to fields of 2, 4, 8, and 16 bytes on an integral boundary. A halfword is a group of two consecutive bytes on a two-byte boundary and is the basic building block of instructions. A word is a group of four consecutive bytes on a four-byte boundary. A doubleword is a group of eight consecutive bytes on an eight-byte boundary. A quadword is a group of 16 consecutive bytes on a 16-byte boundary. When storage addresses designate halfwords, words, doublewords, and quadwords, the binary representation of the address contains one, two, three, or four rightmost zero bits, respectively. Instructions are to be on two-byte integral boundaries. The storage operands of most instructions do not have boundary-alignment requirements.

On devices that implement separate caches for instructions and data operands, a significant delay may be experienced if the program stores into a cache line from which instructions are subsequently fetched, regardless of whether the store alters the instructions that are subsequently fetched.

In one embodiment, the invention may be practiced by software (sometimes referred to licensed internal code, firmware, micro-code, milli-code, pico-code and the like, any of which would be consistent with the present invention). Referring to FIG. 16, software program code which embodies the present invention is typically accessed by processor 5001 of the host system 5000 from long-term storage media devices 5011, such as a CD-ROM drive, tape drive or hard drive. The software program code may be embodied on any of a variety of known media for use with a data processing system, such as a diskette, hard drive, or CD-ROM. The code may be distributed on such media, or may be distributed to users from computer memory 5002 or storage of one computer system over a network 5010 to other computer systems for use by users of such other systems.

The software program code includes an operating system which controls the function and interaction of the various computer components and one or more application programs. Program code is normally paged from storage media device 5011 to the relatively higher-speed computer storage 5002 where it is available for processing by processor 5001. The techniques and methods for embodying software program code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

Figure 17:
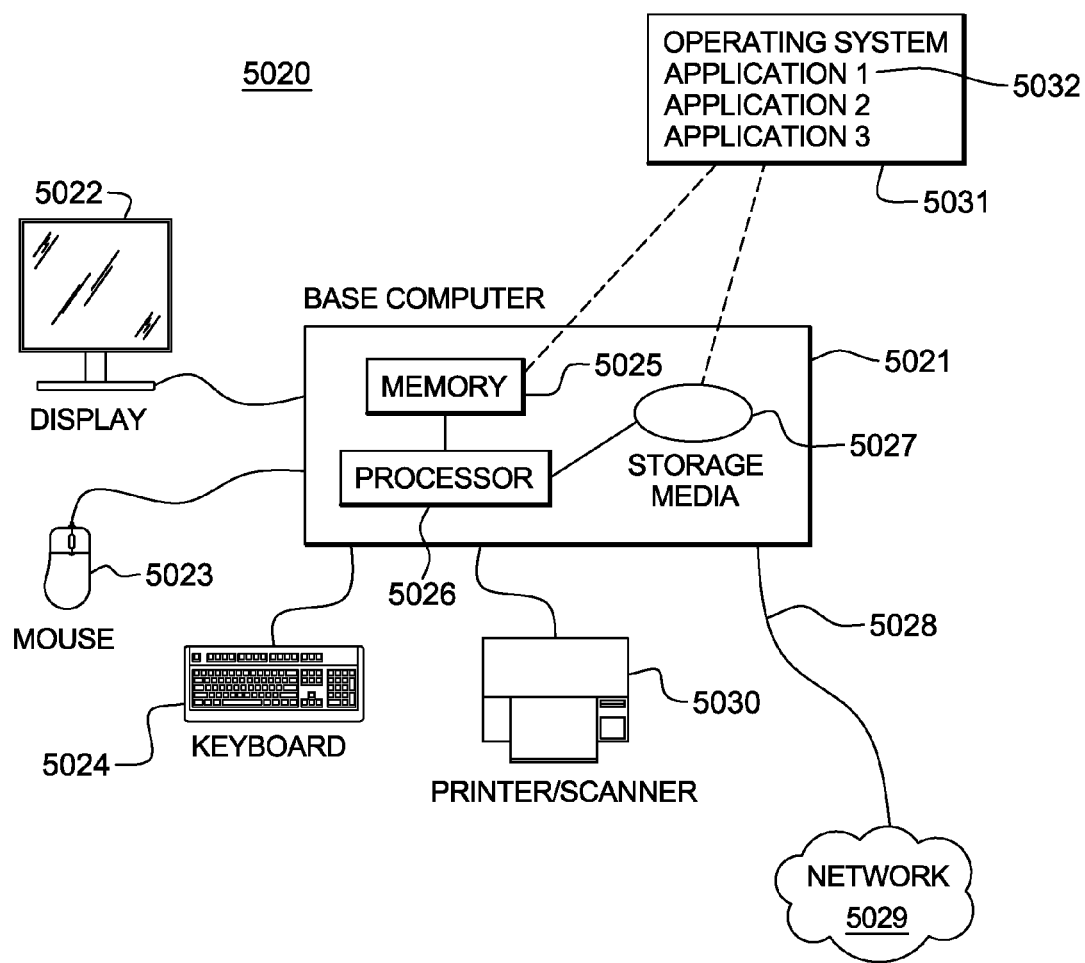
FIG. 17 depicts a further example of a computer system to incorporate and use one or more aspects of the present invention.

FIG. 17 illustrates a representative workstation or server hardware system in which the present invention may be practiced. The system 5020 of FIG. 17 comprises a representative base computer system 5021, such as a personal computer, a workstation or a server, including optional peripheral devices. The base computer system 5021 includes one or more processors 5026 and a bus employed to connect and enable communication between the processor(s) 5026 and the other components of the system 5021 in accordance with known techniques. The bus connects the processor 5026 to memory 5025 and long-term storage 5027 which can include a hard drive (including any of magnetic media, CD, DVD and Flash Memory for example) or a tape drive for example. The system 5021 might also include a user interface adapter, which connects the microprocessor 5026 via the bus to one or more interface devices, such as a keyboard 5024, a mouse 5023, a printer/scanner 5030 and/or other interface devices, which can be any user interface device, such as a touch sensitive screen, digitized entry pad, etc. The bus also connects a display device 5022, such as an LCD screen or monitor, to the microprocessor 5026 via a display adapter.

The system 5021 may communicate with other computers or networks of computers by way of a network adapter capable of communicating 5028 with a network 5029. Example network adapters are communications channels, token ring, Ethernet or modems. Alternatively, the system 5021 may communicate using a wireless interface, such as a CDPD (cellular digital packet data) card. The system 5021 may be associated with such other computers in a Local Area Network (LAN) or a Wide Area Network (WAN), or the system 5021 can be a client in a client/server arrangement with another computer, etc. All of these configurations, as well as the appropriate communications hardware and software, are known in the art.

Figure 18:
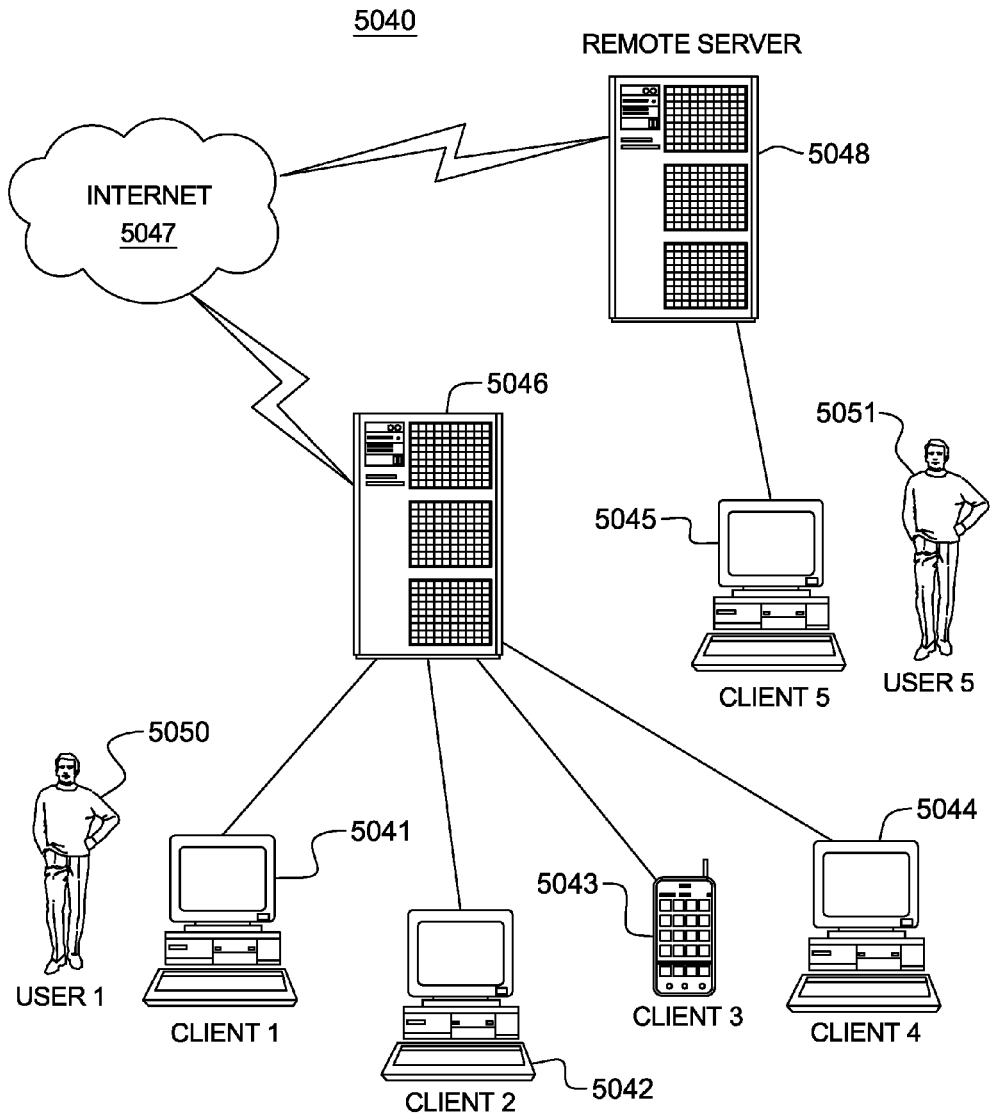
FIG. 18 depicts another example of a computer system comprising a computer network to incorporate and use one or more aspects of the present invention.

FIG. 18 illustrates a data processing network 5040 in which the present invention may be practiced. The data processing network 5040 may include a plurality of individual networks, such as a wireless network and a wired network, each of which may include a plurality of individual workstations 5041, 5042, 5043, 5044. Additionally, as those skilled in the art will appreciate, one or more LANs may be included, where a LAN may comprise a plurality of intelligent workstations coupled to a host processor.

Still referring to FIG. 18, the networks may also include mainframe computers or servers, such as a gateway computer (client server 5046) or application server (remote server 5048 which may access a data repository and may also be accessed directly from a workstation 5045). A gateway computer 5046 serves as a point of entry into each individual network. A gateway is needed when connecting one networking protocol to another. The gateway 5046 may be preferably coupled to another network (the Internet 5047 for example) by means of a communications link. The gateway 5046 may also be directly coupled to one or more workstations 5041, 5042, 5043, 5044 using a communications link. The gateway computer may be implemented utilizing an IBM eServer™ System z® server available from International Business Machines Corporation.

Referring concurrently to FIG. 17 and FIG. 18, software programming code which may embody the present invention may be accessed by the processor 5026 of the system 5020 from long-term storage media 5027, such as a CD-ROM drive or hard drive. The software programming code may be embodied on any of a variety of known media for use with a data processing system, such as a diskette, hard drive, or CD-ROM. The code may be distributed on such media, or may be distributed to users 5050, 5051 from the memory or storage of one computer system over a network to other computer systems for use by users of such other systems.

Alternatively, the programming code may be embodied in the memory 5025, and accessed by the processor 5026 using the processor bus. Such programming code includes an operating system which controls the function and interaction of the various computer components and one or more application programs 5032. Program code is normally paged from storage media 5027 to high-speed memory 5025 where it is available for processing by the processor 5026. The techniques and methods for embodying software programming code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

The cache that is most readily available to the processor (normally faster and smaller than other caches of the processor) is the lowest (L1 or level one) cache and main store (main memory) is the highest level cache (L3 if there are 3 levels). The lowest level cache is often divided into an instruction cache (I-Cache) holding machine instructions to be executed and a data cache (D-Cache) holding data operands.

Figure 19:
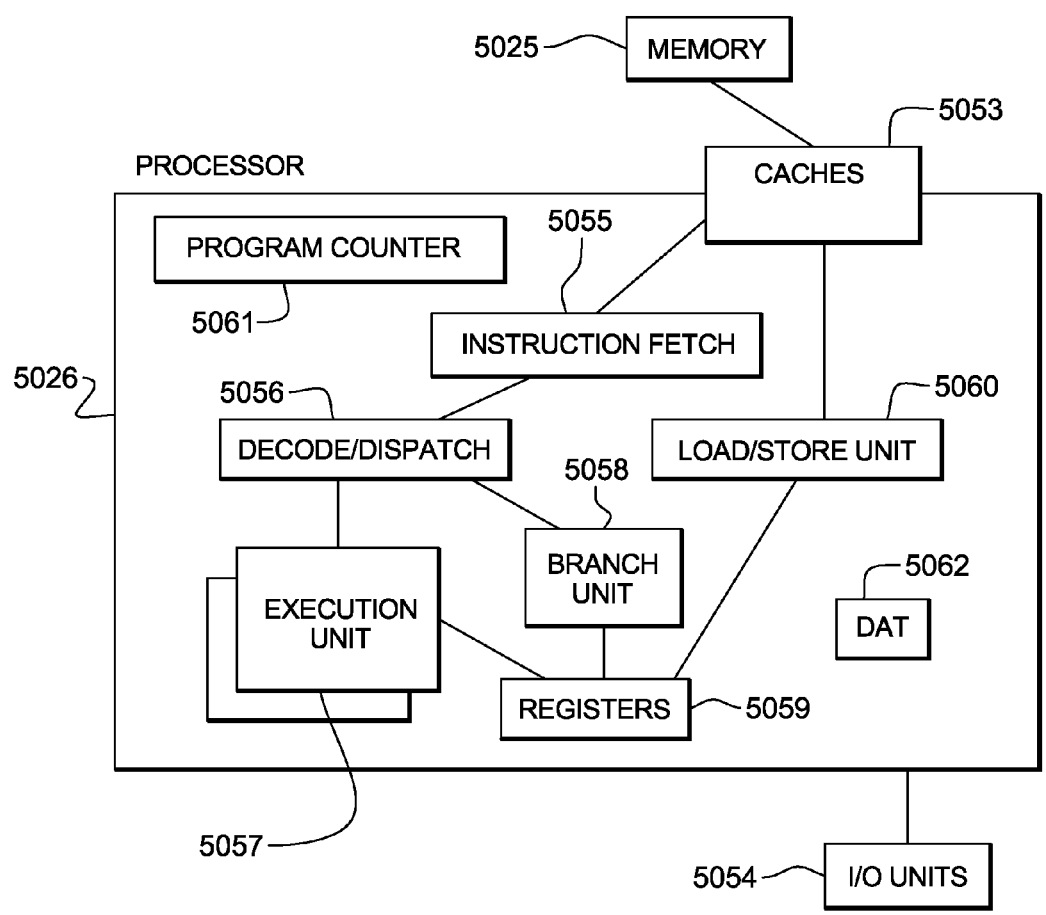
FIG. 19 depicts one embodiment of various elements of a computer system to incorporate and use one or more aspects of the present invention.

Referring to FIG. 19, an exemplary processor embodiment is depicted for processor 5026. Typically one or more levels of cache 5053 are employed to buffer memory blocks in order to improve processor performance. The cache 5053 is a high speed buffer holding cache lines of memory data that are likely to be used. Typical cache lines are 64, 128 or 256 bytes of memory data. Separate caches are often employed for caching instructions than for caching data. Cache coherence (synchronization of copies of lines in memory and the caches) is often provided by various "snoop" algorithms well known in the art. Main memory storage 5025 of a processor system is often referred to as a cache. In a processor system having 4 levels of cache 5053, main storage 5025 is sometimes referred to as the level 5 (L5) cache since it is typically faster and only holds a portion of the non-volatile storage (DASD, tape etc) that is available to a computer system. Main storage 5025 "caches" pages of data paged in and out of the main storage 5025 by the operating system.

A program counter (instruction counter) 5061 keeps track of the address of the current instruction to be executed. A program counter in a z/Architecture® processor is 64 bits and can be truncated to 31 or 24 bits to support prior addressing limits. A program counter is typically embodied in a PSW (program status word) of a computer such that it persists during context switching. Thus, a program in progress, having a program counter value, may be interrupted by, for example, the operating system (context switch from the program environment to the operating system environment). The PSW of the program maintains the program counter value while the program is not active, and the program counter (in the PSW) of the operating system is used while the operating system is executing. Typically, the program counter is incremented by an amount equal to the number of bytes of the current instruction. RISC (Reduced Instruction Set Computing) instructions are typically fixed length while CISC (Complex Instruction Set Computing) instructions are typically variable length. Instructions of the IBM z/Architecture® are CISC instructions having a length of 2, 4 or 6 bytes. The Program counter 5061 is modified by either a context switch operation or a branch taken operation of a branch instruction for example. In a context switch operation, the current program counter value is saved in the program status word along with other state information about the program being executed (such as condition codes), and a new program counter value is loaded pointing to an instruction of a new program module to be executed. A branch taken operation is performed in order to permit the program to make decisions or loop within the program by loading the result of the branch instruction into the program counter 5061.

Typically an instruction fetch unit 5055 is employed to fetch instructions on behalf of the processor 5026. The fetch unit either fetches "next sequential instructions", target instructions of branch taken instructions, or first instructions of a program following a context switch. Modern Instruction fetch units often employ prefetch techniques to speculatively prefetch instructions based on the likelihood that the prefetched instructions might be used. For example, a fetch unit may fetch 16 bytes of instruction that includes the next sequential instruction and additional bytes of further sequential instructions.

The fetched instructions are then executed by the processor 5026. In an embodiment, the fetched instruction(s) are passed to a dispatch unit 5056 of the fetch unit. The dispatch unit decodes the instruction(s) and forwards information about the decoded instruction(s) to appropriate units 5057, 5058, 5060. An execution unit 5057 will typically receive information about decoded arithmetic instructions from the instruction fetch unit 5055 and will perform arithmetic operations on operands according to the opcode of the instruction. Operands are provided to the execution unit 5057 preferably either from memory 5025, architected registers 5059 or from an immediate field of the instruction being executed. Results of the execution, when stored, are stored either in memory 5025, registers 5059 or in other machine hardware (such as control registers, PSW registers and the like).

Figure 20A:
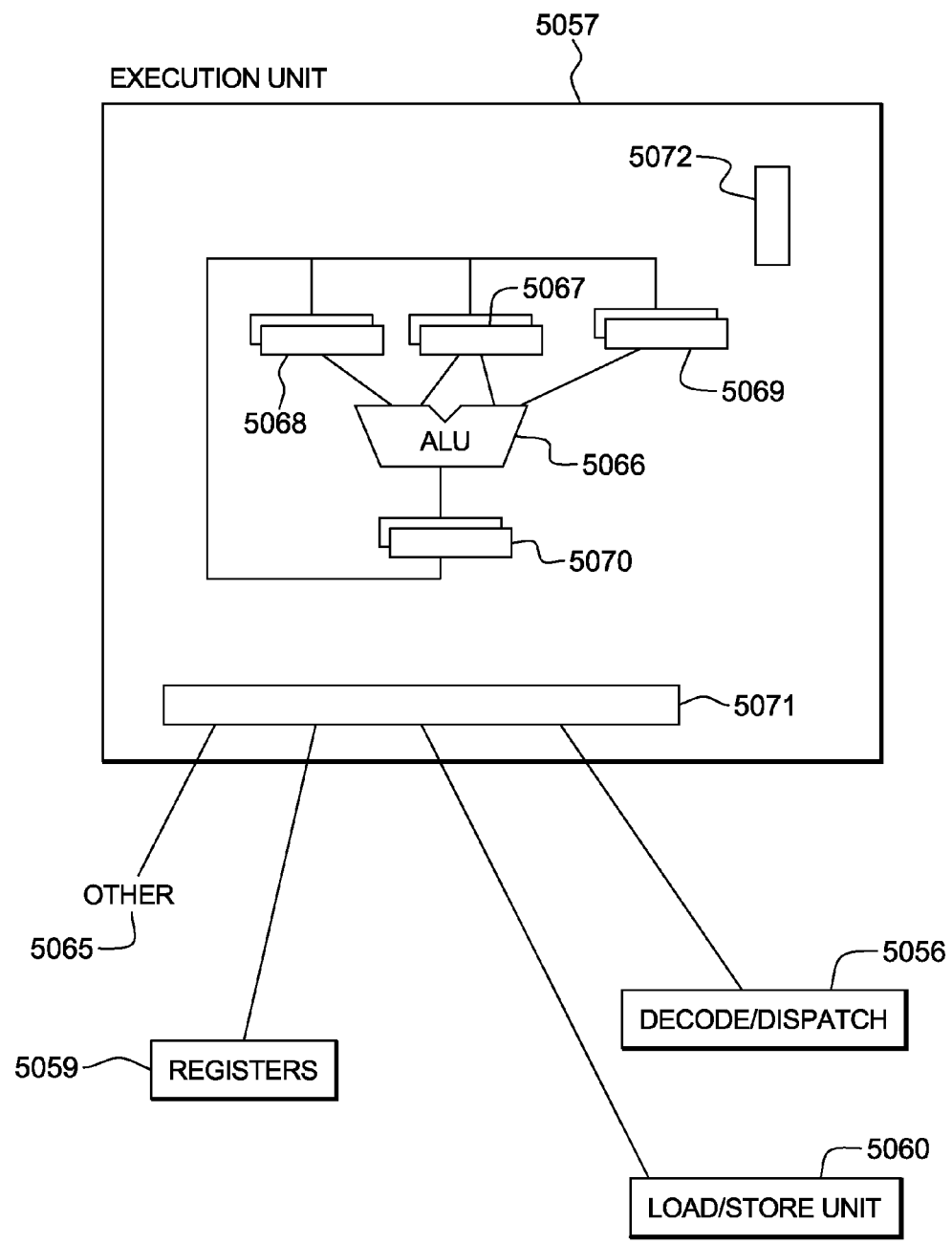
FIG. 20A depicts one embodiment of the execution unit of the computer system of FIG. 19 to incorporate and use one or more aspects of the present invention.

A processor 5026 typically has one or more units 5057, 5058, 5060 for executing the function of the instruction. Referring to FIG. 20A, an execution unit 5057 may communicate with architected general registers 5059, a decode/dispatch unit 5056, a load store unit 5060, and other 5065 processor units by way of interfacing logic 5071. An execution unit 5057 may employ several register circuits 5067, 5068, 5069 to hold information that the arithmetic logic unit (ALU) 5066 will operate on. The ALU performs arithmetic operations such as add, subtract, multiply and divide as well as logical function such as and, or and exclusive-or (XOR), rotate and shift. Preferably the ALU supports specialized operations that are design dependent. Other circuits may provide other architected facilities 5072 including condition codes and recovery support logic for example. Typically the result of an ALU operation is held in an output register circuit 5070 which can forward the result to a variety of other processing functions. There are many arrangements of processor units, the present description is only intended to provide a representative understanding of one embodiment.

An ADD instruction for example would be executed in an execution unit 5057 having arithmetic and logical functionality while a floating point instruction for example would be executed in a floating point execution having specialized floating point capability. Preferably, an execution unit operates on operands identified by an instruction by performing an opcode defined function on the operands. For example, an ADD instruction may be executed by an execution unit 5057 on operands found in two registers 5059 identified by register fields of the instruction.

The execution unit 5057 performs the arithmetic addition on two operands and stores the result in a third operand where the third operand may be a third register or one of the two source registers. The execution unit preferably utilizes an Arithmetic Logic Unit (ALU) 5066 that is capable of performing a variety of logical functions such as Shift, Rotate, And, Or and XOR as well as a variety of algebraic functions including any of add, subtract, multiply, divide. Some ALUs 5066 are designed for scalar operations and some for floating point. Data may be Big Endian (where the least significant byte is at the highest byte address) or Little Endian (where the least significant byte is at the lowest byte address) depending on architecture. The IBM z/Architecture® is Big Endian. Signed fields may be sign and magnitude, 1's complement or 2's complement depending on architecture. A 2's complement number is advantageous in that the ALU does not need to design a subtract capability since either a negative value or a positive value in 2's complement requires only an addition within the ALU. Numbers are commonly described in shorthand, where a 12 bit field defines an address of a 4,096 byte block and is commonly described as a 4 Kbyte (Kilo-byte) block, for example.

Figure 20B:
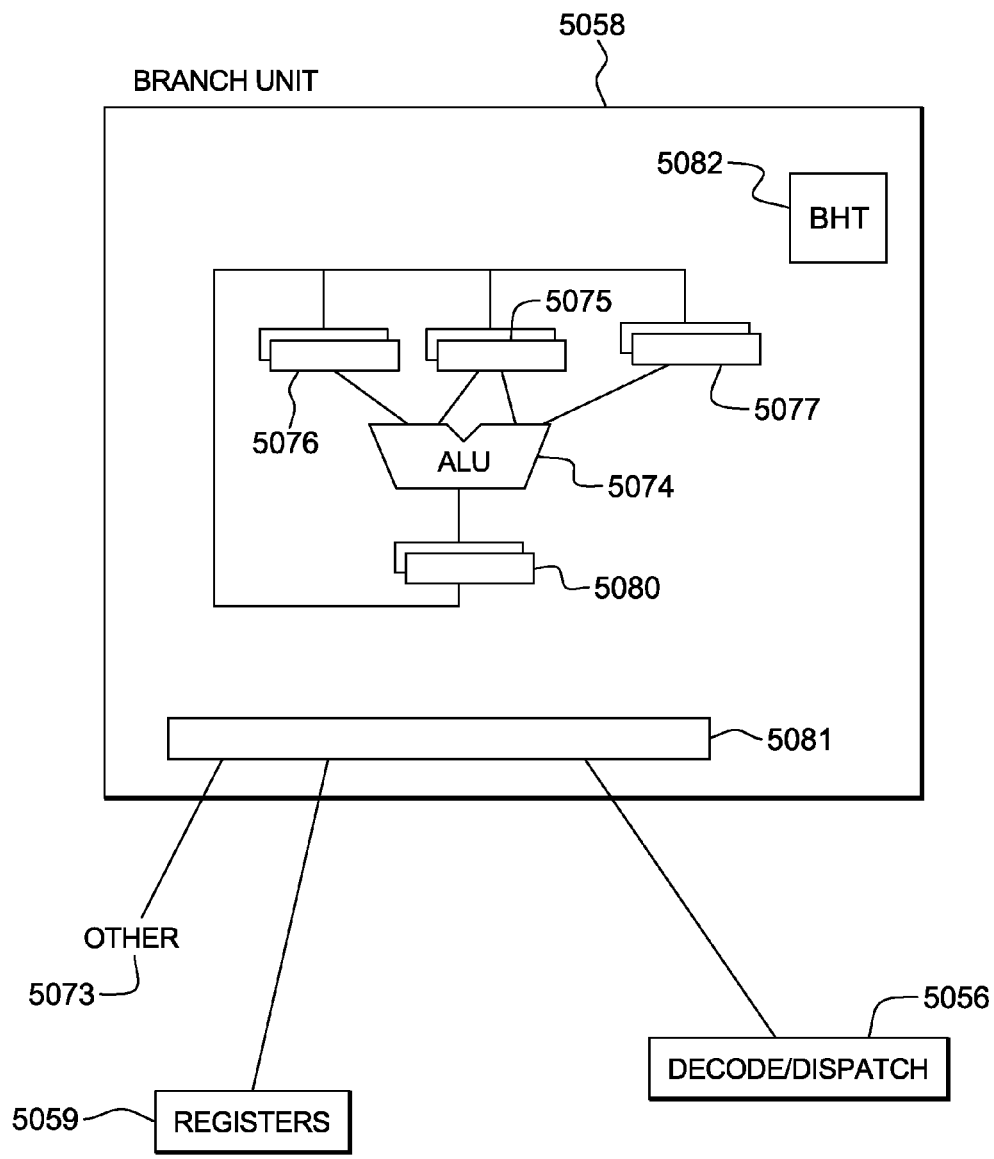
FIG. 20B depicts one embodiment of the branch unit of the computer system of FIG. 19 to incorporate and use one or more aspects of the present invention.

Referring to FIG. 20B, branch instruction information for executing a branch instruction is typically sent to a branch unit 5058 which often employs a branch prediction algorithm such as a branch history table 5082 to predict the outcome of the branch before other conditional operations are complete. The target of the current branch instruction will be fetched and speculatively executed before the conditional operations are complete. When the conditional operations are completed the speculatively executed branch instructions are either completed or discarded based on the conditions of the conditional operation and the speculated outcome. A typical branch instruction may test condition codes and branch to a target address if the condition codes meet the branch requirement of the branch instruction, a target address may be calculated based on several numbers including ones found in register fields or an immediate field of the instruction for example. The branch unit 5058 may employ an ALU 5074 having a plurality of input register circuits 5075, 5076, 5077 and an output register circuit 5080. The branch unit 5058 may communicate with general registers 5059, decode dispatch unit 5056 or other circuits 5073, for example.

The execution of a group of instructions can be interrupted for a variety of reasons including a context switch initiated by an operating system, a program exception or error causing a context switch, an I/O interruption signal causing a context switch or multi-threading activity of a plurality of programs (in a multi-threaded environment), for example. Preferably a context switch action saves state information about a currently executing program and then loads state information about another program being invoked. State information may be saved in hardware registers or in memory for example. State information preferably comprises a program counter value pointing to a next instruction to be executed, condition codes, memory translation information and architected register content. A context switch activity can be exercised by hardware circuits, application programs, operating system programs or firmware code (microcode, pico-code or licensed internal code (LIC)) alone or in combination.

A processor accesses operands according to instruction defined methods. The instruction may provide an immediate operand using the value of a portion of the instruction, may provide one or more register fields explicitly pointing to either general purpose registers or special purpose registers (floating point registers for example). The instruction may utilize implied registers identified by an opcode field as operands. The instruction may utilize memory locations for operands. A memory location of an operand may be provided by a register, an immediate field, or a combination of registers and immediate field as exemplified by the z/Architecture® long displacement facility wherein the instruction defines a base register, an index register and an immediate field (displacement field) that are added together to provide the address of the operand in memory for example. Location herein typically implies a location in main memory (main storage) unless otherwise indicated.

Figure 20C:
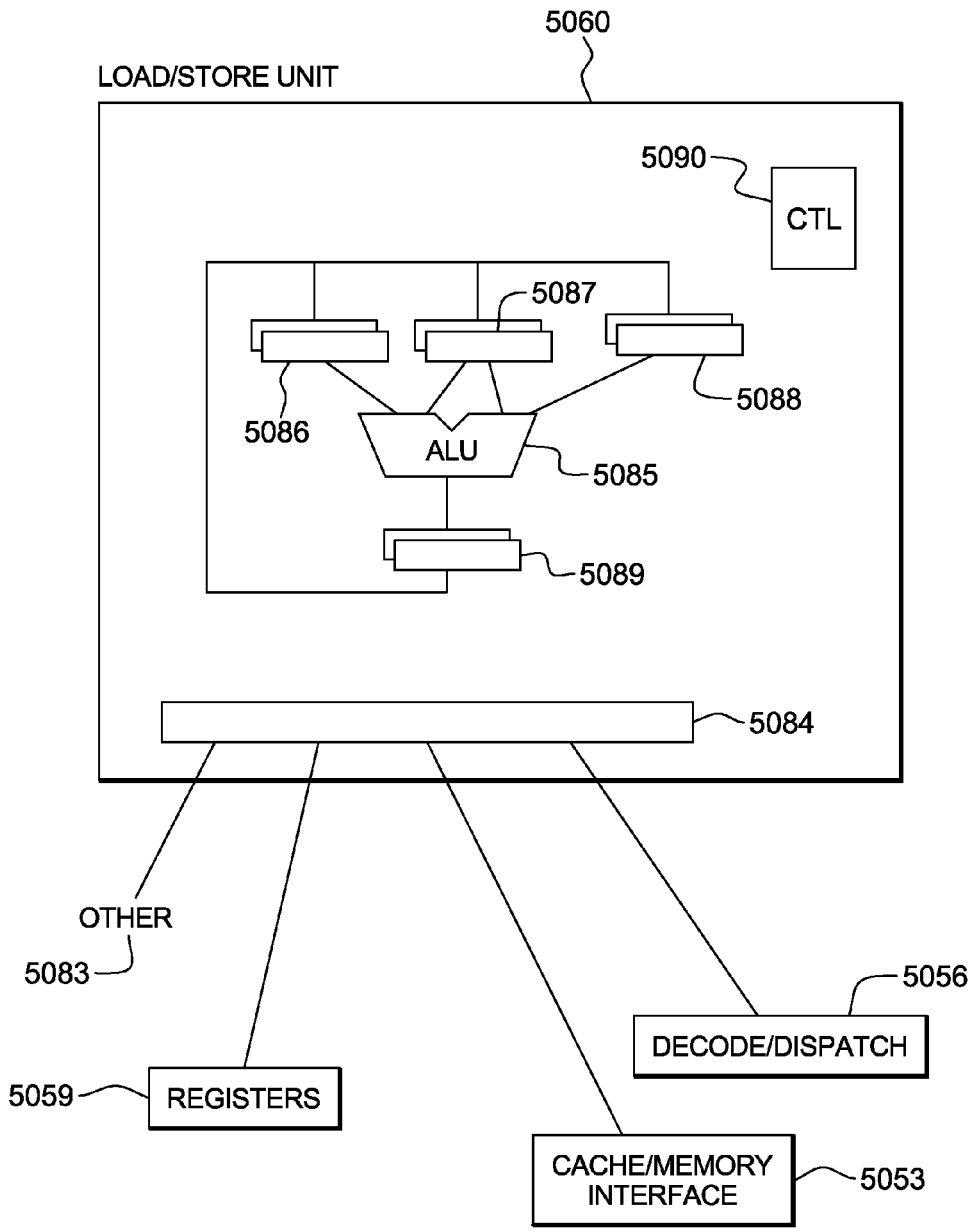
FIG. 20C depicts one embodiment of the load/store unit of the computer system of FIG. 19 to incorporate and use one or more aspects of the present invention.

Referring to FIG. 20C, a processor accesses storage using a load/store unit 5060. The load/store unit 5060 may perform a load operation by obtaining the address of the target operand in memory 5053 and loading the operand in a register 5059 or another memory 5053 location, or may perform a store operation by obtaining the address of the target operand in memory 5053 and storing data obtained from a register 5059 or another memory 5053 location in the target operand location in memory 5053. The load/store unit 5060 may be speculative and may access memory in a sequence that is out-of-order relative to instruction sequence, however the load/store unit 5060 is to maintain the appearance to programs that instructions were executed in order. A load/store unit 5060 may communicate with general registers 5059, decode/dispatch unit 5056, cache/memory interface 5053 or other elements 5083 and comprises various register circuits, ALUs 5080 and control logic 5085 to calculate storage addresses and to provide pipeline sequencing to keep operations in-order. Some operations may be out of order but the load/store unit provides functionality to make the out of order operations to appear to the program as having been performed in order, as is well known in the art.

Preferably addresses that an application program "sees" are often referred to as virtual addresses. Virtual addresses are sometimes referred to as "logical addresses" and "effective addresses". These virtual addresses are virtual in that they are redirected to physical memory location by one of a variety of dynamic address translation (DAT) technologies including, but not limited to, simply prefixing a virtual address with an offset value, translating the virtual address via one or more translation tables, the translation tables preferably comprising at least a segment table and a page table alone or in combination, preferably, the segment table having an entry pointing to the page table. In the z/Architecture®, a hierarchy of translation is provided including a region first table, a region second table, a region third table, a segment table and an optional page table. The performance of the address translation is often improved by utilizing a translation lookaside buffer (TLB) which comprises entries mapping a virtual address to an associated physical memory location. The entries are created when the DAT translates a virtual address using the translation tables. Subsequent use of the virtual address can then utilize the entry of the fast TLB rather than the slow sequential translation table accesses. TLB content may be managed by a variety of replacement algorithms including LRU (Least Recently used).

In the case where the processor is a processor of a multi-processor system, each processor has responsibility to keep shared resources, such as I/O, caches, TLBs and memory, interlocked for coherency. Typically, "snoop" technologies will be utilized in maintaining cache coherency. In a snoop environment, each cache line may be marked as being in any one of a shared state, an exclusive state, a changed state, an invalid state and the like in order to facilitate sharing.

I/O units 5054 (FIG. 19) provide the processor with means for attaching to peripheral devices including tape, disc, printers, displays, and networks for example. I/O units are often presented to the computer program by software drivers. In mainframes, such as the System z® from IBM®, channel adapters and open system adapters are I/O units of the mainframe that provide the communications between the operating system and peripheral devices.

Further, other types of computing environments can benefit from one or more aspects of the present invention. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

More particularly, in a mainframe, architected machine instructions are used by programmers, usually today "C" programmers, often by way of a compiler application. These instructions stored in the storage medium may be executed natively in a z/Architecture® IBM® Server, or alternatively in machines executing other architectures. They can be emulated in the existing and in future IBM® mainframe servers and on other machines of IBM® (e.g., Power Systems servers and System x® Servers). They can be executed in machines running Linux on a wide variety of machines using hardware manufactured by IBM®, Intel®, AMD™, and others. Besides execution on that hardware under a z/Architecture®, Linux can be used as well as machines which use emulation by Hercules, UMX, or FSI (Fundamental Software, Inc), where generally execution is in an emulation mode. In emulation mode, emulation software is executed by a native processor to emulate the architecture of an emulated processor.

The native processor typically executes emulation software comprising either firmware or a native operating system to perform emulation of the emulated processor. The emulation software is responsible for fetching and executing instructions of the emulated processor architecture. The emulation software maintains an emulated program counter to keep track of instruction boundaries. The emulation software may fetch one or more emulated machine instructions at a time and convert the one or more emulated machine instructions to a corresponding group of native machine instructions for execution by the native processor. These converted instructions may be cached such that a faster conversion can be accomplished. Notwithstanding, the emulation software is to maintain the architecture rules of the emulated processor architecture so as to assure operating systems and applications written for the emulated processor operate correctly. Furthermore, the emulation software is to provide resources identified by the emulated processor architecture including, but not limited to, control registers, general purpose registers, floating point registers, dynamic address translation function including segment tables and page tables for example, interrupt mechanisms, context switch mechanisms, Time of Day (TOD) clocks and architected interfaces to I/O subsystems such that an operating system or an application program designed to run on the emulated processor, can be run on the native processor having the emulation software.

A specific instruction being emulated is decoded, and a subroutine is called to perform the function of the individual instruction. An emulation software function emulating a function of an emulated processor is implemented, for example, in a "C" subroutine or driver, or some other method of providing a driver for the specific hardware as will be within the skill of those in the art after understanding the description of the preferred embodiment. Various software and hardware emulation patents including, but not limited to U.S. Pat. No. 5,551,011, entitled "Multiprocessor for Hardware Emulation", by Beausoleil et al.; and U.S. Pat. No. 6,009,261, entitled "Preprocessing of Stored Target Routines for Emulating Incompatible Instructions on a Target Processor", by Scalzi et al; and U.S. Pat. No. 5,574,873, entitled "Decoding Guest Instruction to Directly Access Emulation Routines that Emulate the Guest Instructions", by Davidian et al; and U.S. Pat. No. 6,308,255, entitled "Symmetrical Multiprocessing Bus and Chipset Used for Coprocessor Support Allowing Non-Native Code to Run in a System", by Gorishek et al; and U.S. Pat. No. 6,463,582, entitled "Dynamic Optimizing Object Code Translator for Architecture Emulation and Dynamic Optimizing Object Code Translation Method", by Lethin et al; and U.S. Pat. No. 5,790,825, entitled "Method for Emulating Guest Instructions on a Host Computer Through Dynamic Recompilation of Host Instructions", by Eric Traut, each of which is hereby incorporated herein by reference in its entirety; and many others, illustrate a variety of known ways to achieve emulation of an instruction format architected for a different machine for a target machine available to those skilled in the art.

Figure 21:
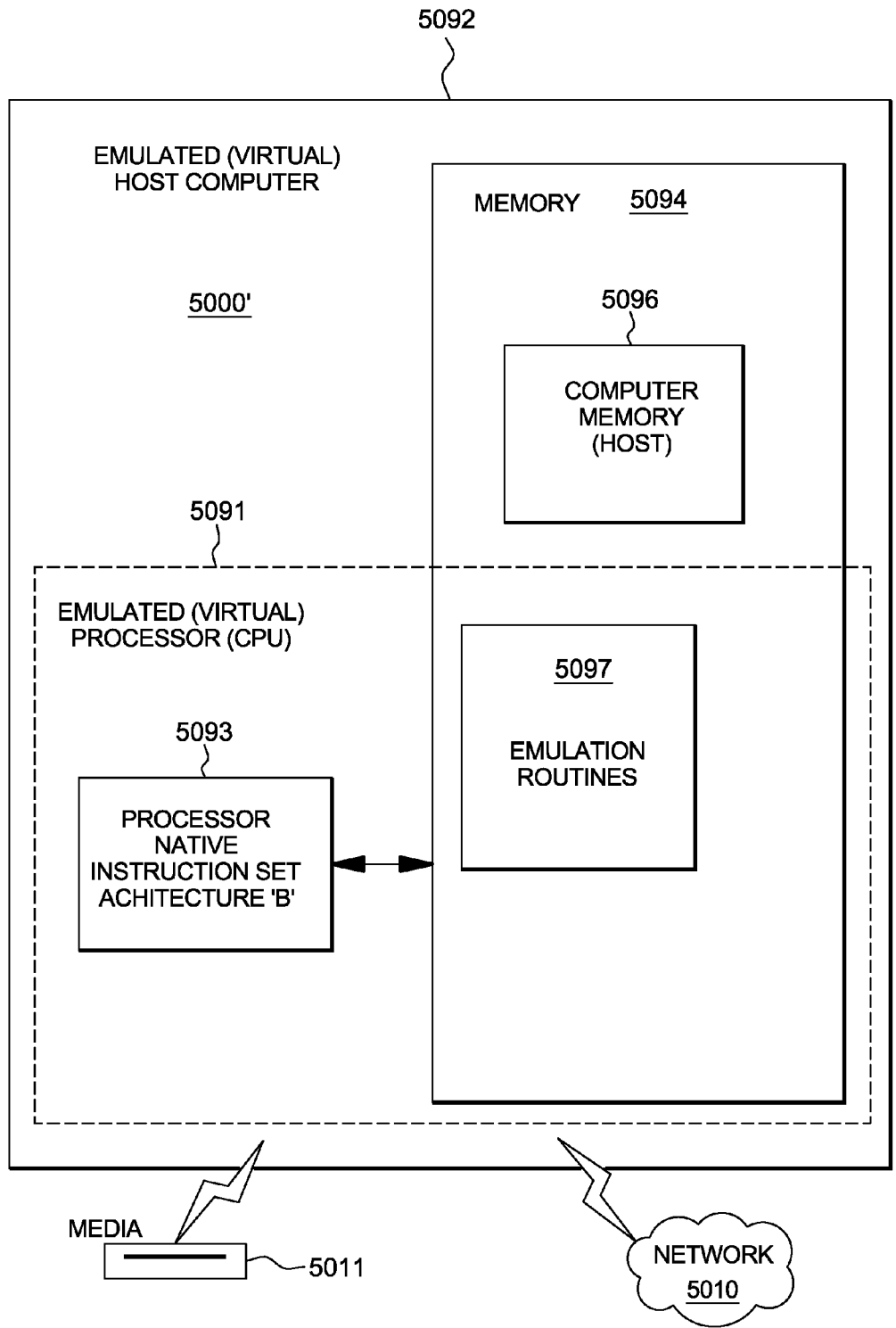
FIG. 21 depicts one embodiment of an emulated host computer system to incorporate and use one or more aspects of the present invention.

In FIG. 21, an example of an emulated host computer system 5092 is provided that emulates a host computer system 5000' of a host architecture. In the emulated host computer system 5092, the host processor (CPU) 5091 is an emulated host processor (or virtual host processor) and comprises an emulation processor 5093 having a different native instruction set architecture than that of the processor 5091 of the host computer 5000'. The emulated host computer system 5092 has memory 5094 accessible to the emulation processor 5093. In the example embodiment, the memory 5094 is partitioned into a host computer memory 5096 portion and an emulation routines 5097 portion. The host computer memory 5096 is available to programs of the emulated host computer 5092 according to host computer architecture. The emulation processor 5093 executes native instructions of an architected instruction set of an architecture other than that of the emulated processor 5091, the native instructions obtained from emulation routines memory 5097, and may access a host instruction for execution from a program in host computer memory 5096 by employing one or more instruction(s) obtained in a sequence & access/decode routine which may decode the host instruction(s) accessed to determine a native instruction execution routine for emulating the function of the host instruction accessed. Other facilities that are defined for the host computer system 5000' architecture may be emulated by architected facilities routines, including such facilities as general purpose registers, control registers, dynamic address translation and I/O subsystem support and processor cache, for example. The emulation routines may also take advantage of functions available in the emulation processor 5093 (such as general registers and dynamic translation of virtual addresses) to improve performance of the emulation routines.

Special hardware and off-load engines may also be provided to assist the processor 5093 in emulating the function of the host computer 5000'.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

What is claimed is:

1. A computer program product for controlling access to adapters in a computing environment, said computer program product comprising:
    a non-transitory computer readable storage medium readable by a processing circuit and storing instructions for execution by the processing circuit for performing a method comprising:
        executing, by a processor coupled to an adapter, an instruction, the instruction comprising a request by a configuration to access the adapter, the adapter identified by a function handle provided with the request, the executing comprising:
            using the function handle to select from a function table a function table entry particular to the adapter specified by the function the function table entry stored in memory associated with the processor and including information associated with the adapter including information to determine whether the configuration is authorized to access the adapter;
        determining, by the processor, based on information in the function table entry whether the configuration is authorized to access the adapter, wherein the determining comprises comparing one or more attributes of the configuration requesting access to the adapter to one or more selected attributes of the function table entry to determine whether the configuration has permission to access the adapter; and
        allowing access to the adapter, based on determining that the configuration is authorized to access the adapter.

2. The computer program product of claim 1, wherein the method further comprises based on determining that the configuration is not authorized access to the adapter, denying access to the adapter.

3. The computer program product of claim 1, wherein the determining comprises comparing a zone number in the function table entry with a zone number of the configuration, wherein the configuration is authorized access based on the comparing indicating equality.

4. The computer program product of claim 1, wherein the configuration comprises a guest, and wherein the determining comprises checking in the function table entry for an identifier of the guest, wherein the guest is authorized access, based on the identifier being in the function table entry.

5. The computer program product of claim 1, wherein the method further comprises determining whether access is to be blocked for one or more reasons different than authorization checking, the determining using state information of the function table entry, wherein access is allowed based on determining that it is not to be blocked.

6. The computer program product of claim 5, wherein it is determined that access is to be blocked, and said method further comprises:
    deciding whether access is to be blocked temporarily; and
    providing a busy indicator to the configuration, based on determining that access is to be blocked temporarily.

7. The computer program product of claim 6, wherein the method further comprises denying access, based on deciding access is to be blocked, but not blocked temporarily.

8. The computer program product of claim 1, wherein the method further comprises:
    determining a plurality of adapters available to the computing environment; and
    creating a function table entry for each adapter of the plurality of adapters.

9. The computer program product of claim 8, wherein the method further comprises:
    determining which adapters of the plurality of adapters are accessible to the configuration; and
    indicating in the function table entry of each adapter that is accessible to the configuration information regarding the configuration.

10. The computer program product of claim 9, wherein the determining which adapters are accessible to the configuration is based on policy, the policy being reconfigurable.

11. The computer program product of claim 1, wherein the instruction is based on an architecture of the adapter.

12. A computer system for controlling access to adapters in a computing environment, said computer system comprising:
    a memory; and
    a processor in communications with the memory, wherein the computer system is configured to perform a method, said method comprising:
        executing, by a processor coupled to an adapter, an instruction, the instruction comprising a request by a configuration to access the adapter, the adapter identified by a function handle provided with the request, the executing comprising:
            using the function handle to select from a function table a function table entry particular to the adapter specified by the function handle, the function table entry stored in memory associated with the processor and including information associated with the adapter including information to determine whether the configuration is authorized to access the adapter;
        determining, by the processor, based on information in the function table entry whether the configuration is authorized to access the adapter, wherein the determining comprises comparing one or more attributes of the configuration requesting access to the adapter to one or more selected attributes of the function table entry to determine whether the configuration has permission to access the adapter; and
allowing access to the adapter, based on determining that the configuration is authorized to access the adapter.

13. The computer system of claim 12, wherein the determining comprises comparing a zone number in the function table entry with a zone number of the configuration, wherein the configuration is authorized access based on the comparing indicating equality.

14. The computer system of claim 12, wherein the configuration comprises a guest, and wherein the determining comprises checking in the function table entry for an identifier of the guest, wherein the guest is authorized access, based on the identifier being in the function table entry.

15. The computer system of claim 12, wherein the method further comprises determining whether access is to be blocked for one or more reasons different than authorization checking, the determining using state information of the function table entry, wherein access is allowed based on determining that it is not to be blocked.

16. The computer system of claim 15, wherein it is determined that access is to be blocked, and said method further comprises:
   deciding whether access is to be blocked temporarily; and
   providing a busy indicator to the configuration, based on determining that access is to be blocked temporarily.

17. The computer system of claim 12, wherein the method further comprises:
   determining a plurality of adapters available to the computing environment;
   creating a function table entry for each adapter of the plurality of adapters;
   determining which adapters of the plurality of adapters are accessible to the configuration; and
   indicating in the function table entry of each adapter that is accessible to the configuration information regarding the configuration.

18. The computer system of claim 12, wherein the instruction is based on an architecture of the adapter.

19. A method of controlling access to adapters in a computing environment, said method comprising:
   executing, by a processor coupled to an adapter, an instruction, the instruction comprising a request by a configuration to access the adapter, the adapter identified by a function handle provided with the request, the executing comprising:
      using the function handle to select from a function table a function table entry particular to the adapter specified by the function handle, the function table entry stored in memory associated with the processor and including information associated with the adapter including information to determine whether the configuration is authorized to access the adapter;
      determining, by the processor, based on information in the function table entry whether the configuration is authorized to access the adapter, wherein the determining comprises comparing one or more attributes of the configuration requesting access to the adapter to one or more selected attributes of the function table entry to determine whether the configuration has permission to access the adapter; and
      allowing access to the adapter, based on determining that the configuration is authorized to access the adapter.

20. The method of claim 19, wherein the determining comprises comparing a zone number in the function table entry with a zone number of the configuration, wherein the configuration is authorized access based on the comparing indicating equality.

21. The method of claim 19, further comprising determining whether access is to be blocked for one or more reasons different than authorization checking, the determining using state information of the function table entry, wherein access is allowed based on determining that it is not to be blocked.

* * * * *